United States Patent
Sasaki et al.

(10) Patent No.: US 10,283,748 B2
(45) Date of Patent: *May 7, 2019

(54) POROUS FILM COMPOSITION FOR LITHIUM ION SECONDARY BATTERIES, SEPARATOR FOR LITHIUM ION SECONDARY BATTERIES, ELECTRODE FOR LITHIUM ION SECONDARY BATTERIES, AND LITHIUM ION SECONDARY BATTERY

(71) Applicant: ZEON CORPORATION, Tokyo (JP)

(72) Inventors: Tomokazu Sasaki, Tokyo (JP); Junnosuke Akiike, Tokyo (JP); Yasuhiro Wakizaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 553 days.

This patent is subject to a terminal disclaimer.

(21) Appl. No.: 14/900,751

(22) PCT Filed: Jun. 27, 2014

(86) PCT No.: PCT/JP2014/067275
§ 371 (c)(1),
(2) Date: Dec. 22, 2015

(87) PCT Pub. No.: WO2015/005151
PCT Pub. Date: Jan. 15, 2015

(65) Prior Publication Data
US 2016/0141575 A1    May 19, 2016

(30) Foreign Application Priority Data

Jul. 10, 2013  (JP) .................................. 2013-145001
Aug. 16, 2013  (JP) .................................. 2013-169193
Nov. 28, 2013  (JP) .................................. 2013-246573

(51) Int. Cl.
*H01M 2/16* (2006.01)
*B32B 27/04* (2006.01)
(Continued)

(52) U.S. Cl.
CPC .......... *H01M 2/1653* (2013.01); *B32B 27/00* (2013.01); *B32B 27/04* (2013.01); *B32B 27/06* (2013.01);
(Continued)

(58) Field of Classification Search
CPC ............. H01M 2/1653; H01M 2/1686; H01M 2/1673; H01M 10/0525; H01M 2220/30;
(Continued)

(56) References Cited

U.S. PATENT DOCUMENTS 8,211,574 B2  7/2012 Suzuki et al.
8,852,788 B2  10/2014 Wakizaka et al.
(Continued)

FOREIGN PATENT DOCUMENTS

CN  1884327 A  12/2006
JP  H11-149929 A  6/1999
(Continued)

OTHER PUBLICATIONS

Translation of the Written Opinion of the International Searching Authority; PCT/JP2014/067275; dated Jan. 10, 2016.
(Continued)

*Primary Examiner* — Laura Weiner
(74) *Attorney, Agent, or Firm* — Studebaker & Brackett PC

(57) ABSTRACT

A porous membrane composition for a lithium ion secondary battery, including a first particulate polymer, wherein the first particulate polymer has a core-shell structure including a core portion and a shell portion that partially covers an outer surface of the core portion, the core portion is formed
(Continued)

from a polymer having a swelling degree in an electrolytic solution of 5 times or more and 30 times or less, and the shell portion is formed from a polymer having a swelling degree in the electrolytic solution of 1 time or more and 4 times or less.

9 Claims, 1 Drawing Sheet

(51) Int. Cl.
    *B32B 27/24*     (2006.01)
    *B32B 27/00*     (2006.01)
    *B32B 27/06*     (2006.01)
    *B32B 27/08*     (2006.01)
    *H01M 10/0525*     (2010.01)

(52) U.S. Cl.
    CPC .............. *B32B 27/08* (2013.01); *B32B 27/24* (2013.01); *H01M 2/1673* (2013.01); *H01M 2/1686* (2013.01); *B32B 2307/50* (2013.01); *B32B 2307/724* (2013.01); *B32B 2457/00* (2013.01); *B32B 2457/10* (2013.01); *H01M 10/0525* (2013.01); *H01M 2220/30* (2013.01)

(58) Field of Classification Search
    CPC .......... B32B 2307/50; B32B 2307/724; B32B 2457/10
    See application file for complete search history.

(56) References Cited

U.S. PATENT DOCUMENTS

| | | |
|---|---|---|
| 2009/0239147 A1 | 9/2009 | Itou et al. |
| 2010/0173196 A1 | 7/2010 | Itou et al. |
| 2014/0248537 A1 | 9/2014 | Hayashi et al. |
| 2015/0333310 A1* | 11/2015 | Choi .................. H01M 2/1686 429/145 |

FOREIGN PATENT DOCUMENTS

| | | |
|---|---|---|
| JP | 2002-050405 A | 2/2002 |
| JP | 2005-011822 A | 1/2005 |
| JP | 2006-092847 A | 4/2006 |
| JP | 2007-059271 A | 3/2007 |
| JP | 2010-146871 A | 7/2010 |
| JP | 2010-219335 A | 9/2010 |
| JP | 2012-104406 A | 5/2012 |
| JP | 2013-012357 A | 1/2013 |
| WO | 2005/029614 A1 | 3/2005 |
| WO | 2007/088979 A1 | 8/2007 |
| WO | 2011/001848 A1 | 1/2011 |
| WO | 2011/040474 A1 | 4/2011 |
| WO | 2011/068215 A1 | 6/2011 |
| WO | 2013/042720 A1 | 3/2013 |
| WO | 2013/080946 A1 | 6/2013 |

OTHER PUBLICATIONS

The extended European search report issued by the European Patent Office dated Dec. 12, 2016, which corresponds to European Patent Application No. 14822437.1-1360 and is related to U.S. Appl. No. 14/900,751.

International Search Report—PCT/JP2014/067275 dated Aug. 12, 2014.

Submission of publication or the like in corresponding Japanese Patent Application No. 2015-526263 (dated Jun. 19, 2018) with the brief description of relevancy thereof.

\* cited by examiner

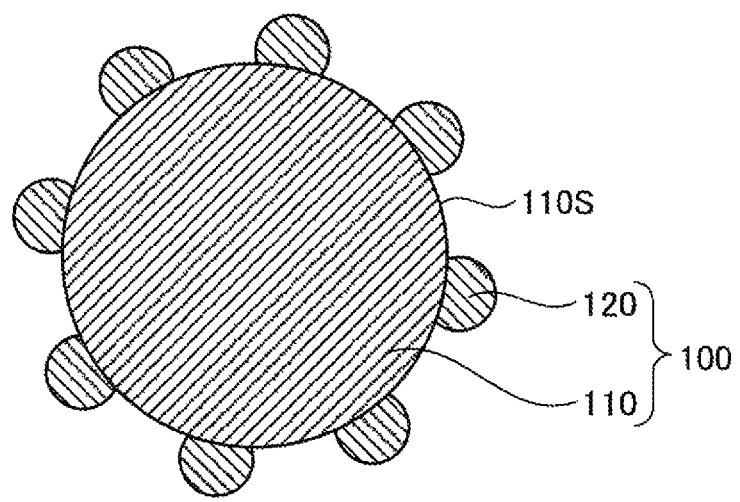

POROUS FILM COMPOSITION FOR LITHIUM ION SECONDARY BATTERIES, SEPARATOR FOR LITHIUM ION SECONDARY BATTERIES, ELECTRODE FOR LITHIUM ION SECONDARY BATTERIES, AND LITHIUM ION SECONDARY BATTERY

FIELD

The present invention relates to a porous membrane composition for a lithium ion secondary battery, as well as a separator for a lithium ion secondary battery, an electrode for a lithium ion secondary battery, and a lithium ion secondary battery, each produced using the porous membrane composition for a lithium ion secondary battery.

BACKGROUND

In recent years, mobile terminals such as notebook computers, cellular phones, and personal digital assistants (PDAs) are increasingly widespread. As secondary batteries used as a power source for these mobile terminals, lithium ion secondary batteries are frequently used.

In the lithium ion secondary battery, a separator is generally provided to prevent short circuit between a positive electrode and a negative electrode. This separator may be provided with a porous membrane on a separator substrate, if necessary. As an example of such a porous membrane, there has been known a membrane including non-conductive particles such as alumina, and a binder that binds the non-conductive particles. There has also been proposed to provide the aforementioned porous membrane on an electrode plate of an electrode (see Patent Literatures 1 and 2).

In addition, techniques in Patent Literatures 3 to 9 have also been known.

CITATION LIST

Patent Literature

Patent Literature 1: International Publication No. WO2005/029614
Patent Literature 2: International Publication No. WO2011/040474
Patent Literature 3: International Publication No. WO2011/068215
Patent Literature 4: Japanese Patent Application Laid-Open No. 2005-11822 A
Patent Literature 5: Japanese Patent Application Laid-Open No. 2012-104406 A
Patent Literature 6: Japanese Patent Application Laid-Open No. 2013-012357 A
Patent Literature 7: International Publication No. WO2007/088979
Patent Literature 8: International Publication No. WO2013/042720
Patent Literature 9: Japanese Patent Application Laid-Open No. 2010-219335 A

SUMMARY

Technical Problem

A conventional lithium ion secondary battery having a separator or an electrode that is provided with a porous membrane has problems of binding property of the porous membrane to a separator substrate or an electrode plate in an electrolytic solution, and also has problems of low-temperature output property. When the battery is continuously vibrated, the binding property of the porous membrane in the electrolytic solution decreases, and as a result, the porous membrane is separated. Thus, the battery also has a problem of battery safety.

The present invention has been made in view of the aforementioned problems. It is an object of the present invention to provide a porous membrane composition for a lithium ion secondary battery that makes it possible to achieve a lithium ion secondary battery having excellent binding property to a separator substrate or an electrode plate in an electrolytic solution and excellent low-temperature output property, and allows a porous membrane capable of suppressing the separation of the porous membrane in the electrolytic solution to be produced; a separator for a lithium ion secondary battery that makes it possible to achieve the lithium ion secondary battery having excellent binding property of the porous membrane to the separator substrate in the electrolytic solution and excellent low-temperature output property and can suppress the separation of the porous membrane in the electrolytic solution; an electrode for a lithium ion secondary battery that makes it possible to achieve the lithium ion secondary battery having excellent binding property of the porous membrane to the electrode plate in the electrolytic solution and excellent low-temperature output property and can suppress the separation of the porous membrane in the electrolytic solution; and a lithium ion secondary battery having excellent low-temperature output property and excellent safety.

Solution to Problem

The present inventor has intensively studied to solve the aforementioned problems. As a result, the inventor has found out that the use of a porous membrane that is formed from a polymer capable of swelling at a specific swelling degree in an electrolytic solution and contains a particulate polymer having a core-shell structure including a core portion and a shell portion that partially covers the outer surface of the core portion can achieve a lithium ion secondary battery having excellent binding property to a separator substrate and an electrode plate in the electrolytic solution and excellent low-temperature output property. The present invention has thus been accomplished.

Accordingly, the present invention is as follows.

(1) A porous membrane composition for a lithium ion secondary battery, comprising a first particulate polymer, wherein
the first particulate polymer has a core-shell structure including a core portion and a shell portion that partially covers an outer surface of the core portion,
the core portion is formed from a polymer having a swelling degree in an electrolytic solution of 5 times or more and 30 times or less, and
the shell portion is formed from a polymer having a swelling degree in the electrolytic solution of 1 time or more and 4 times or less.

(2) The porous membrane composition for a lithium ion secondary battery according to (1), wherein
the polymer of the core portion has a glass transition temperature of 0° C. or higher and 150° C. or lower, and
the polymer of the shell portion has a glass transition temperature of 50° C. or higher and 200° C. or lower.

(3) The porous membrane composition for a lithium ion secondary battery according to (1) or (2), wherein the shell portion includes particles of the polymer having a swelling degree in the electrolytic solution of more than 1 time and 4 times or less.

(4) A separator for a lithium ion secondary battery, comprising:
a separator substrate; and
a porous membrane that is obtained by applying the porous membrane composition for a lithium ion secondary battery according to any one of (1) to (3) onto the separator substrate.

(5) An electrode for a lithium ion secondary battery, comprising:
an electrode plate; and
a porous membrane that is obtained by applying the porous membrane composition for a lithium ion secondary battery according to any one of (1) to (3) onto the electrode plate.

(6) A lithium ion secondary battery comprising a positive electrode, a negative electrode, an electrolytic solution, and a separator, wherein
the separator is the separator for a lithium ion secondary battery according to (4).

(7) A lithium ion secondary battery comprising a positive electrode, a negative electrode, and an electrolytic solution, wherein
at least one of the positive electrode and the negative electrode is the electrode for a lithium ion secondary battery according to (5).

Advantageous Effects of Invention

With the porous membrane composition for a lithium ion secondary battery of the present invention, it is possible to produce a porous membrane that makes it possible to achieve a lithium ion secondary battery having excellent binding property of the porous membrane to a separator substrate or an electrode plate in an electrolytic solution and excellent low-temperature output property and can suppress the separation of the porous membrane in the electrolytic solution.

The separator for a lithium ion secondary battery of the present invention makes it possible to achieve the lithium ion secondary battery having excellent binding property of the porous membrane to the separator substrate in the electrolytic solution and excellent low-temperature output property and can suppress the separation of the porous membrane in the electrolytic solution.

The electrode for a lithium ion secondary battery of the present invention makes it possible to achieve the lithium ion secondary battery having excellent binding property of the porous membrane to the separator substrate in the electrolytic solution and excellent low-temperature output property and can suppress the separation of the porous membrane in the electrolytic solution.

The lithium ion secondary battery of the present invention has excellent low-temperature output property and excellent safety.

BRIEF DESCRIPTION OF DRAWINGS

FIG. 1 is a cross-sectional view schematically illustrating an example of a first particulate polymer.

DESCRIPTION OF EMBODIMENTS

The present invention will be described hereinbelow in detail by referring to embodiments and examples. However, the present invention is not limited to the following embodiments and examples, which can be optionally modified without departing from the scope of claims and equivalents thereto.

In the following description, (meth)acrylic acid includes acrylic acid and methacrylic acid. Also, (meth)acrylate includes acrylate and methacrylate. Furthermore, (meth)acrylonitrile includes acrylonitrile and methacrylonitrile. Also, (meth)acrylamide includes acrylamide and methacrylamide.

Furthermore, that a substance is water-soluble means that, when 0.5 g of the substance is dissolved in 100 g of water at 25° C., insoluble matter is not less than 0% by weight and less than 1.0% by weight. Also, that a substance is water-insoluble means that, when 0.5 g of the substance is dissolved in 100 g of water at 25° C., insoluble matter is 90% by weight or more and 100% by weight or less.

In a polymer produced by copolymerizing a plurality of types of monomers, the ratio of a structural unit formed by polymerizing a certain monomer relative to the polymer is, unless otherwise stated, usually equals the ratio (charge ratio) of the certain monomer relative to total monomers used for the polymerization of the polymer.

An "electrode plate" includes not only a rigid plate-like member but also a flexible sheet or film.

A "monomer composition" refers to not only a composition containing two or more types of monomers but also one type of monomer.

[1. Porous Membrane Composition for Lithium Ion Secondary Battery]

The porous membrane composition for a lithium ion secondary battery of the present invention (this may be referred to hereinbelow as "porous membrane composition" as appropriate) contains a first particulate polymer.

[1.1. First Particulate Polymer]

FIG. 1 is a cross-sectional view schematically illustrating an example of the first particulate polymer. As shown in FIG. 1, a first particulate polymer 100 has a core-shell structure including a core portion 110 and a shell portion 120. The core portion 110 is a portion that is inside the shell portion 120 in the first particulate polymer 100. The shell portion 120 is a portion that covers an outer surface 110S of the core portion 100, and is usually an outermost portion in the first particulate polymer 100. However, the shell portion 120 does not cover the entire outer surface 110S of the core portion 110, but partially covers the outer surface 110S of the core portion 110.

In the first particulate polymer, the core portion and the shell portion are each formed from a polymer having a specific swelling degree in an electrolytic solution. The porous membrane produced using the porous membrane composition containing the first particulate polymer has excellent binding property of the porous membrane to a separator substrate or an electrode plate in the electrolytic solution. When this porous membrane is provided in a lithium ion secondary battery, low-temperature output property of the lithium ion secondary battery can be improved. Further, the separation of the porous membrane in the electrolytic solution can be suppressed, and battery safety can be enhanced. Further, high-temperature cycle property of the lithium ion secondary battery can be usually improved. A separator for a lithium ion secondary battery having a porous membrane (this may be referred to hereinbelow as "separator" as appropriate) may be stored and transported in a wound shape. Even when the separator having the porous membrane produced using the porous membrane composition of the present invention is wound, blocking is unlikely to occur. The reason why such excellent effects are obtained is not necessarily clear, but the investigation of the present inventor leads to the following inferences. However, the present invention is not limited to the following inferred reasons.

i. Binding Property of Porous Membrane to Separator Substrate or Electrode Plate:

The polymer constituting the shell portion of the first particulate polymer swells in the electrolytic solution. At that time, for example, a functional group in the swelled polymer of the shell portion is activated, and chemically or electrically interacts with a functional group on a surface of the separator substrate or the electrode plate. This interaction and other factors allow the shell portion to be tightly bound to the separator substrate or the electrode plate. That is inferred to be the reason why the binding property of the porous membrane to the separator substrate or the electrode plate in the electrolytic solution can be improved.

ii. Low-Temperature Output Property:

In the lithium ion secondary battery, the porous membrane is generally provided between a positive electrode and a negative electrode. When the conventional lithium ion secondary battery is charged and discharged, an electrode active material (particularly, a negative electrode active material) expands and shrinks, and as a result, a gap may be generated between the porous membrane and the electrode plate. This phenomenon increases a distance between an electrode plate of the positive electrode and an electrode plate of the negative electrode, to increase the internal resistance of the battery or make a reaction field of lithium ions with the electrode active material uneven. Accordingly, the low-temperature output property may deteriorate.

On the other hand, the porous membrane produced using the porous membrane composition according to the present invention exhibits high binding property of the porous membrane to the separator substrate and the electrode plate in a state where the shell portion of the first particulate polymer swells in the electrolytic solution, as described above. Therefore, even charging and discharging are performed, the gap is unlikely to be generated between the porous membrane and the electrode plate.

This leads to low tendency of widening the distance between the electrode plate of the positive electrode and the electrode plate of the negative electrode in the lithium ion secondary battery. Thus, the internal resistance of the battery can be decreased, and the reaction field of lithium ions with the electrode active material is unlikely to be made uneven.

Further, the polymer of the core portion of the first particulate polymer largely swells in the electrolytic solution. In a state where the polymer largely swells in the electrolytic solution, a gap between molecules of the polymer increases, and ions easily pass through the gap between the molecules. The polymer of the core portion of the first particulate polymer is not entirely covered with the shell portion. For this reason, ions easily pass through the core portion in the electrolytic solution. Therefore, the first particulate polymer can exhibit high ion diffusivity. Accordingly, an increase in resistance due to the porous membrane can be suppressed.

It is inferred that by a combination of these factors, the low-temperature output property of the lithium ion secondary battery having the porous membrane produced using the porous membrane composition according to the present invention can be improved.

iii. High-Temperature Cycle Property:

When the lithium ion secondary battery is repeatedly charged and discharged, a gas may be generated by, for example, decomposition of the electrolytic solution and an additive. Further, as described above, when the lithium ion secondary battery is charged and discharged, the electrode active material may expand and shrink. Therefore, when the lithium ion secondary battery is repeatedly charged and discharged, a gap is generated between the porous membrane and the electrode plate. That gradually widens the distance between the electrode plate of the positive electrode and the electrode plate of the negative electrode, and may cause decrease in battery capacity.

On the other hand, the porous membrane containing the first particulate polymer has excellent binding property of the porous membrane to the electrode plate in the electrolytic solution, as described above. Therefore, with the lithium ion secondary battery having the porous membrane, even when charging and discharging are repeated, the gap is unlikely to be generated between the porous membrane and the electrode plate, and the battery capacity is unlikely to decrease. That is inferred to be the reason for the capability of achieving excellent high-temperature cycle property.

iv. Blocking Resistance:

In a state where the polymer of the shell portion does not swell in the electrolytic solution, the polymer does not usually have the binding property. When the polymer swells in the electrolytic solution, the binding property is exhibited. Therefore, in a state where the first particulate polymer does not swell in the electrolytic solution, the particulate polymer does not usually exhibit high binding property. That is inferred to be the reason why the porous membrane containing the first particulate polymer is unlikely to cause blocking even when stacked. Even in a state where the first particulate polymer does not swell in the electrolytic solution, the binding property may be exhibited by heating at a temperature equal to or higher than a certain temperature (for example, 60° C. or higher).

v. Durability of Porous Membrane

When the conventional battery is continuously vibrated, the binding property of the porous membrane in the electrolytic solution may decrease, and as a result, the porous membrane may be separated. The separation of the porous membrane may cause short circuit in the battery. Therefore, the conventional battery has a problem of safety. On the other hand, the first particulate polymer exhibits binding force in the electrolytic solution. Therefore, even when the battery is continuously vibrated, the separation of the porous membrane in the electrolytic solution can be suppressed. That is inferred to be the reason why the battery safety can be improved.

[1.1.1. Core Portion]

The core portion is formed from the polymer having a specific swelling degree in the electrolytic solution. Specifically, the swelling degree of the polymer of the core portion in the electrolytic solution is usually 5 times or more, preferably 6 times or more, and more preferably 7 times or more, and is usually 30 times or less, preferably 25 times or less, and more preferably 20 times or less. When the swelling degree of the polymer of the core portion falls within the aforementioned range, ion diffusivity of the porous membrane can be enhanced. Therefore, low-temperature output property of the lithium ion secondary battery can be improved. When the swelling degree of the polymer of the core portion is equal to or more than the lower limit of the aforementioned range, binding property of the porous membrane to the separator substrate or the electrode plate in the electrolytic solution can be usually enhanced, and separation of the porous membrane in the electrolytic solution can be suppressed. When it is equal to or less than the upper limit thereof, lifetime of the lithium ion secondary battery can be usually extended.

Herein, as an electrolytic solution used in measurement of swelling degree of the polymer of the core portion, a solution in which $LiPF_6$ as a supporting electrolyte is dissolved in a mixed solvent of ethylene carbonate, diethyl carbonate, and vinylene carbonate (volume mixing ratio of ethylene carbonate/diethyl carbonate/vinylene carbonate=68.5/30/1.5; SP value=12.7 $(cal/cm^3)^{1/2}$) at a concentration of 1 mol/L relative to the solvent is used.

The swelling degree of the polymer of the core portion may be specifically measured as follows.

Firstly a polymer of the core portion of the first particulate polymer is prepared. For example, a polymer obtained by the same step as the step of producing the core portion in the method for producing the first particulate polymer is prepared.

From the prepared polymer, a film is then produced. For example, when the polymer is a solid, the polymer is dried under conditions of 25° C. and 48 hours, and molded into a film shape to obtain a film with a thickness of 0.5 mm. For example, when the polymer is a solution or a dispersion such as latex, the solution or dispersion is placed in a polytetrafluoroethylene dish, and dried under conditions of 25° C. and 48 hours to obtain a film with a thickness of 0.5 mm.

The produced film is cut into a 1-cm square piece to obtain a sample piece. The weight of the sample piece is measured, and the weight is defined as $W0$.

The sample piece is immersed in the electrolytic solution at 60° C. for 72 hours, and taken out of the electrolytic solution. The electrolytic solution on the surface of the taken sample piece is wiped off, and weight $W1$ of the sample piece after the immersion test is measured.

The swelling degree $S$ (times) is calculated using the weights $W0$ and $W1$ by $S=W1/W0$.

Examples of the method for adjusting the swelling degree of the polymer of the core portion may include appropriately selecting the type and amount of the monomer for producing the polymer of the core portion in consideration of the SP value of the electrolytic solution. In general, when the SP value of the polymer is close to the SP value of the electrolytic solution, the polymer tends to swell in the electrolytic solution. On the other hand, when the SP value of the polymer is away from the SP value of the electrolytic solution, the polymer is unlikely to swell in the electrolytic solution.

Herein, the SP value means a solubility parameter.

The SP value can be calculated by a method introduced in Hansen Solubility Parameters A User's Handbook, 2nd Ed (CRCPress).

The SP value of an organic compound can be estimated from the molecular structure of the organic compound. Specifically, the SP value can be calculated by a simulation software of calculating an SP value by formulae in SMILEs (for example, "HSPiP" (http://www.hansen-solubility.com)). By the simulation software, the SP value can be determined on the basis of a theory described in Hansen SOLUBILITY PARAMETERS A User's Handbook Second Edition. Charles M. Hansen.

As the monomer used for producing the polymer of the core portion, a monomer with which the swelling degree of the polymer falls within the aforementioned range may be used. Examples of the monomer may include vinyl chloride-based monomers such as vinyl chloride and vinylidene chloride; vinyl acetate-based monomers such as vinyl acetate; aromatic vinyl monomers such as styrene, α-methylstyrene, styrenesulfonic acid, butoxystyrene, and vinylnaphthalene; vinylamine-based monomers such as vinylamine; vinylamide-based monomers such as N-vinylformamide and N-vinylacetamide; (meth)acrylic acid derivatives such as 2-hydroxyethyl methacrylate; (meth)acrylic acid ester monomers such as methyl acrylate, ethyl acrylate, methyl methacrylate, ethyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing acrylate monomers such as 2-(perfluorohexyl)ethyl methacrylate and 2-(perfluorobutyl)ethyl acrylate; maleimide; maleimide derivatives such as phenyl maleimide; and diene-based monomers such as 1,3-butadiene and isoprene. One type of them may be solely used, and two or more types thereof may also be used in combination at any ratio.

Among the aforementioned monomers, the (meth)acrylic acid ester monomer or the (meth)acrylonitrile monomer is preferably used, and the (meth)acrylic acid ester monomers are more preferably used. A (meth)acrylic acid ester monomer unit represents a structural unit having a structure that is formed by polymerization of the (meth)acrylic acid ester monomer. A (meth)acrylonitrile monomer unit represents a structural unit having a structure that is formed by polymerization of (meth)acrylonitrile. With these monomers, swelling degree of the polymer is easily controlled. In addition, ion diffusivity of the porous membrane can be further enhanced.

The ratio of the total of the (meth)acrylic acid ester monomer unit and the (meth)acrylonitrile monomer unit in the polymer of the core portion is preferably 50% by weight or more, more preferably 55% by weight or more, further preferably 60% by weight or more, and particularly preferably 70% by weight or more, and is preferably 99% by weight or less, more preferably 95% by weight or less, and particularly preferably 90% by weight or less. When the ratio of the (meth)acrylic acid ester monomer unit and the (meth)acrylonitrile monomer unit falls within the aforementioned range, the swelling degree is easily controlled within the aforementioned range. Further, ion diffusivity of the porous membrane can be enhanced. Further, low-temperature output property of the lithium ion secondary battery can be improved.

The "total of the (meth)acrylic acid ester monomer unit and the (meth)acrylonitrile monomer unit in the polymer of the core portion" means that it may contain only the (meth) acrylic acid ester monomer unit, only the (meth)acrylonitrile monomer unit, or a combination of the (meth)acrylic acid ester monomer unit and the (meth)acrylonitrile monomer unit.

The polymer of the core portion may contain an acid group-containing monomer unit. As an acid group-containing monomer, the acid group-containing monomer which is the same as one that may be contained in the shell portion is used. In particular, it is preferable that the acid group-containing monomer is a monomer having a carboxylic acid group, preferably a monocarboxylic acid, and more preferably a (meth)acrylic acid.

As the acid group-containing monomer, one type thereof may be solely used, and two or more types thereof may also be used in combination at any ratio.

The ratio of the acid group-containing monomer unit in the polymer of the core portion is preferably 0.1% by mass or more, more preferably 1% by mass or more, and further preferably 3% by mass or more, and is preferably 20% by mass or less, more preferably 10% by mass or less, and further preferably 7% by mass or less. When the ratio of the acid group-containing monomer unit falls within the aforementioned ratio, dispersibility of the polymer of the core portion is enhanced, and the shell portion that partially covers the outer surface of the core portion is easily formed on the outer surface of the polymer of the core portion.

It is preferable that the polymer of the core portion contains a crosslinkable monomer unit. The crosslinkable monomer unit is a structural unit having a structure that is formed by polymerization of a crosslinkable monomer. The crosslinkable monomer is a monomer in which a crosslinking structure may be formed during or after polymerization by heating or irradiation with energy rays. When the polymer contains the crosslinkable monomer unit, swelling degree of the polymer is easily allowed to fall within the aforementioned range.

Examples of the crosslinkable monomer may include a multifunctional monomer having two or more polymerization reactive groups in the molecule. Examples of the multifunctional monomer may include divinyl compounds such as divinylbenzene; di(meth)acrylic acid ester compounds such as ethylene dimethacrylate, diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and ethylenically unsaturated monomers having an epoxy group such as allyl glycidyl ether and glycidyl methacrylate. Among them, the dimethacrylic acid ester compound and the ethylenically unsaturated monomer having an epoxy group are preferable, and the dimethacrylic acid ester compound is more preferable for easy control of the swelling degree of the polymer of the core portion. One type of them may be solely used, and two or more types thereof may also be used in combination at any ratio.

In general, when the ratio of the crosslinkable monomer unit in the polymer is increased, the swelling degree of the polymer in the electrolytic solution tends to decrease. It is therefore preferable that the ratio of the crosslinkable monomer unit is determined with consideration of the type and amount of the monomer to be used. Specifically, the ratio of the crosslinkable monomer unit in the polymer of the core portion is preferably 0.1% by weight or more, more preferably 0.2% by weight or more, and particularly preferably 0.5% by weight or more, and is preferably 5% by weight or less, more preferably 4% by weight or less, and particularly preferably 3% by weight or less. When the ratio of the crosslinkable monomer unit is equal to or more than the lower limit of the aforementioned range, binding property of the porous membrane to the separator substrate or the electrode plate in the electrolytic solution can be enhanced, and separation of the porous membrane in the electrolytic solution can be suppressed. When it is equal to or less than the upper limit thereof, lifetime of the secondary battery can be extended.

The glass transition temperature of the polymer of the core portion is preferably 0° C. or higher, more preferably 10° C. or higher, further preferably 20° C. or higher, even more preferably 30° C. or higher, and particularly preferably 60° C. or higher, and is preferably 150° C. or lower, more preferably 130° C. or lower, further preferably 110° C. or lower, even more preferably 100° C. or lower, particularly preferably 90° C. or lower, and very particularly preferably 80° C. or lower. When the glass transition temperature of the polymer of the core portion is equal to or more than the lower limit of the aforementioned range, binding property of the porous membrane to the separator substrate or the electrode plate in the electrolytic solution can be enhanced, and separation of the porous membrane in the electrolytic solution can be suppressed. When it is equal to or less than the upper limit thereof, lifetime of the lithium ion secondary battery can be extended. When the glass transition temperature of the polymer of the core portion falls within the aforementioned range, low-temperature output property of the lithium ion secondary battery can be usually improved. Herein, the glass transition temperature may be measured in accordance with JIS K7121.

The diameter of the core portion relative to a volume average particle diameter of the first particulate polymer being 100% is preferably 50% or more, more preferably 60% or more, further preferably 70% or more, and particularly preferably 80% or more, and is preferably 99% or less, more preferably 98.5% or less, and particularly preferably 98% or less. When the diameter of the core portion is equal to or more than the lower limit of the aforementioned range, ion conductivity can be enhanced. When it is equal to or less than the upper limit thereof, binding force of the porous membrane to the separator substrate or the electrode plate in the electrolytic solution can be enhanced, and separation of the porous membrane in the electrolytic solution can be suppressed.

The diameter of the core portion may be measured as the volume average particle diameter of the particulate polymer before formation of the shell portion obtained during a process of producing the first particulate polymer (i.e., particulate polymer constituting the core portion). The volume average particle diameter represents a particle diameter at which a cumulative volume calculated from a small-diameter side in a particle diameter distribution measured by a laser diffraction method reaches 50%.

[1.1.2. Shell Portion]

The shell portion is formed from the polymer having a specific swelling degree in the electrolytic solution that is smaller than the swelling degree of the core portion. Specifically, the swelling degree of the polymer of the shell portion in the electrolytic solution is usually more than 1 time, preferably 1.05 times or more, more preferably 1.1 times or more, and further preferably 1.2 times or more, and is usually 4 times or less, preferably 3.5 times or less, and more preferably 3 times or less. When the swelling degree of the polymer of the shell portion falls within the aforementioned range, binding property of the porous membrane to the separator substrate or the electrode plate in the electrolytic solution can be enhanced. Therefore, internal resistance of the lithium ion secondary battery can be decreased. Accordingly, the battery properties can be favorably maintained. When the swelling degree of the polymer of the shell portion is equal to or more than the lower limit of the aforementioned range, low-temperature output property of the lithium ion secondary battery can be usually improved. When it is equal to or less than the upper limit thereof, binding property of the porous membrane to the separator substrate or the electrode plate in the electrolytic solution can be usually enhanced, and separation of the porous membrane in the electrolytic solution can be suppressed.

As the electrolytic solution used for measuring the swelling degree of the polymer of the shell portion, the same electrolytic solution as one used in measurement of the swelling degree of the polymer of the core portion is used.

The swelling degree of the polymer of the shell portion may be specifically measured as follows.

Firstly a polymer of the shell portion of the first particulate polymer is prepared. For example, the polymer is produced in the same manner as in the method for producing the core portion except that a monomer composition used in production of the shell portion is used in place of the monomer composition used in production of the core portion in the method for producing the first particulate polymer.

After that, a film is produced from the polymer of the shell portion, a sample piece is obtained from the film, and the swelling degree S is measured by the same method as the method for measuring the swelling degree of the polymer of the core portion.

Examples of the method for adjusting the swelling degree of the polymer of the shell portion may include appropriately selecting the type and amount of the monomer for producing the polymer of the shell portion in consideration of the SP value of the electrolytic solution.

As the monomer used for producing the polymer of the shell portion, a monomer with which the swelling degree of the polymer falls within the aforementioned range may be used. Examples of such a monomer may include those exemplified by examples of the monomer used for producing the polymer of the core portion. As such a monomer, one type thereof may be solely used, and two or more types thereof may also be used in combination at any ratio.

Among the monomers, an aromatic vinyl monomer is preferable. That is, it is preferable that the polymer of the shell portion contains an aromatic vinyl monomer unit. The aromatic vinyl monomer unit herein represents a structural unit having a structure that is formed by polymerization of an aromatic vinyl monomer. Of the aromatic vinyl monomer, styrene and a styrene derivative such as styrenesulfonic acid are more preferable. When the aromatic vinyl monomer is used, swelling degree of the polymer is easily controlled. In addition, binding force of the porous membrane to the separator substrate or the electrode plate can be further enhanced.

The ratio of the aromatic vinyl monomer unit in the polymer of the shell portion is preferably 20% by weight or more, more preferably 40% by weight or more, further preferably 50% by weight or more, even more preferably 60% by weight or more, and particularly preferably 80% by weight or more, and is preferably 100% by weight or less, more preferably 99.5% by weight or less, and further preferably 99% by weight or less. When the ratio of the aromatic vinyl monomer unit falls within the aforementioned range, swelling degree is easily controlled within the aforementioned range. In addition, binding force of the porous membrane to the separator substrate or the electrode plate in the electrolytic solution can be further enhanced, and separation of the porous membrane in the electrolytic solution can be suppressed.

The polymer of the shell portion may contain an acid group-containing monomer unit. The acid group-containing monomer unit is a structural unit having a structure that is formed by polymerization of a monomer having an acid group. Examples of the acid group-containing monomer may include a monomer having a carboxylic acid group, a monomer having a sulfonic acid group, a monomer having a phosphoric acid group, and a monomer having a hydroxyl group.

Examples of the monomer having a carboxylic acid group may include a monocarboxylic acid and a dicarboxylic acid. Examples of the monocarboxylic acid may include acrylic acid, methacrylic acid, and crotonic acid. Examples of the dicarboxylic acid may include maleic acid, fumaric acid, and itaconic acid.

Examples of the monomer having a sulfonic acid group may include vinylsulfonic acid, methylvinylsulfonic acid, (meth)allylsulfonic acid, ethyl (meth)acrylate-2-sulfonate, 2-acrylamide-2-methylpropanesulfonic acid, and 3-allyloxy-2-hydroxypropanesulfonic acid.

Examples of the monomer having a phosphoric acid group may include 2-(meth)acryloyloxyethyl phosphate, methyl-2-(meth)acryloyloxyethyl phosphate, and ethyl-(meth)acryloyloxyethyl phosphate.

Examples of the monomer having a hydroxyl group may include 2-hydroxyethyl acrylate, 2-hydroxypropyl acrylate, 2-hydroxyethyl methacrylate, and 2-hydroxypropyl methacrylate.

Among them, the monomer having a carboxylic acid group is preferable, a monocarboxylic acid is further preferable, and (meth)acrylic acid is particularly preferable.

As the acid group-containing monomer, one type thereof may be solely used, and two or more types thereof may also be used in combination at any ratio.

The ratio of the acid group-containing monomer unit in the polymer of the shell portion is preferably 0.1% by weight or more, more preferably 1% by weight or more, and further preferably 3% by weight or more, and is preferably 20% by weight or less, more preferably 10% by weight or less, and further preferably 7% by weight or less. When the ratio of the acid group-containing monomer unit falls within the aforementioned range, dispersibility of the first particulate polymer in the porous membrane composition can be improved, and favorable binding property over the entire surface of the porous membrane can be exhibited.

The polymer of the shell portion may contain a crosslinkable monomer unit. Examples of the crosslinkable monomer may include those exemplified as the examples of the crosslinkable monomer used for the polymer of the core portion. As the crosslinkable monomer, one type thereof may be solely used, and two or more types thereof may also be used in combination at any ratio.

The ratio of the crosslinkable monomer unit in the polymer of the shell portion is preferably 0.1% by weight or more, more preferably 0.2% by weight or more, and particularly preferably 0.5% by weight or more, and is preferably 5% by weight or less, more preferably 4% by weight or less, and particularly preferably 3% by weight or less.

The glass transition temperature of the polymer of the shell portion is preferably 50° C. or higher, more preferably 60° C. or higher, and particularly preferably 70° C. or higher, and is preferably 200° C. or lower, more preferably 180° C. or lower, further preferably 150° C. or lower, and particularly preferably 120° C. or lower. When the glass transition temperature of the polymer of the shell portion is equal to or higher than the lower limit of the aforementioned range, blocking of the porous membrane can be suppressed, and low-temperature output property of the lithium ion secondary battery can be further improved. When it is equal to or lower than the upper limit thereof, binding property of the porous membrane to the separator substrate or the electrode plate in the electrolytic solution can be further enhanced, and separation of the porous membrane in the electrolytic solution can be suppressed. When the glass transition temperature of the polymer of the shell portion falls within the aforementioned range, cycle property of the lithium ion secondary battery can be usually improved.

The shell portion partially covers the outer surface of the core portion. That is, the shell portion covers the outer surface of the core portion, but does not cover the entire outer surface of the core portion. Even when the outer surface of a core portion appears to be completely covered with the shell portion, when a pore penetrating the shell portion from the inside to the outside is formed, the shell portion is the shell portion according to the present invention that partially covers the outer surface of the core portion. Therefore, for example, a first particulate polymer having a shell portion having a micropore that penetrates the shell portion from the outer surface of the shell portion (i.e., a circumferential surface of the first particulate polymer) to the outer surface of the core portion is included in the scope of the first particulate polymer according to the present invention.

The average ratio of the outer surface of the core portion that is covered with the shell portion is preferably 10% or more, more preferably 30% or more, further preferably 40% or more, and particularly preferably 60% or more, and is preferably 99.9% or less, more preferably 98% or less, further preferably 95% or less, even more preferably 90% or less, and particularly preferably 85% or less. When the average ratio of the outer surface of the core portion that is covered with the shell portion falls within the aforementioned range, ion diffusivity, and binding property of the porous membrane to the separator substrate or the electrode plate in the electrolytic solution, and suppression of separation of the porous membrane in the electrolytic solution can be well balanced.

The average ratio of the outer surface of the core portion that is covered with the shell portion may be measured from a result of observation of the cross-sectional structure of the first particulate polymer. Specifically, the measurement was performed by the following method.

First, the first particulate polymer is sufficiently dispersed in a normal temperature-setting epoxy resin, and embedded to produce a block piece containing the first particulate polymer. The block piece is cut into a thin section with a thickness of 80 nm to 200 nm by a microtome equipped with a diamond blade, to obtain a sample for measurement. If necessary, the sample for measurement is then subjected to a dyeing treatment using, for example, ruthenium tetroxide or osmium tetraoxide.

Subsequently, this sample for measurement is placed on a transmission electron microscope (TEM) and the cross-sectional structure of the first particulate polymer is photographed. The magnification of the electron microscope is preferably a magnification at which the cross section of one particle of the particulate polymer is set in a visual field, and is specifically about 10,000.

In the cross-sectional structure of the photographed first particulate polymer, a length D1 of circumference corresponding to the outer surface of the core portion, and a length D2 of a portion where the outer surface of the core portion is into contact with the shell portion are measured. The ratio Rc of the outer surface of the core portion that is covered with the shell portion in the first particulate polymer is calculated by the following equation (1) using the measured lengths D1 and D2.

$$\text{Covering ratio } Rc\ (\%) = D2/D1 \times 100 \qquad (1)$$

Covering ratios Rc of 20 or more particles of the first particulate polymer are measured, and the average thereof is calculated as the average ratio of the outer surface of the core portion that is covered with the shell portion.

The covering ratio Rc may be manually calculated from the cross-sectional structure, and may also be calculated by a commercially available image analysis software. As the commercially available image analysis software, for example, "AnalySIS Pro" (manufactured by Olympus Corporation) may be used.

It is preferable that the shell portion has an average thickness falling within a certain range relative to the volume average particle diameter of the first particulate polymer. Specifically, the average thickness of the shell portion relative to the volume average particle diameter of the first particulate polymer is preferably 1% or more, more preferably 2% or more, and particularly preferably 5% or more, and is preferably 30% or less, more preferably 25% or less, and particularly preferably 20% or less. When the average thickness of the shell portion is equal to or more than the lower limit of the aforementioned range, binding force of the porous membrane to the separator substrate or the electrode plate in the electrolytic solution can be further enhanced, and separation of the porous membrane in the electrolytic solution can be suppressed. When it is equal to or less than the upper limit thereof, low-temperature output property of the lithium ion secondary battery can be further enhanced.

The average thickness of the shell portion is determined by observing the cross-sectional structure of the first particulate polymer by the transmission electron microscope (TEM). Specifically, the maximum thickness of the shell portion in the cross-sectional structure of the first particulate polymer is measured. The average of maximum thicknesses of shell portions of randomly selected 20 or more particles of the first particulate polymer is the average thickness of the shell portion. When the shell portion is composed of particles of the polymer and the particles constituting the shell portion form the shell portion in a single layer shape without overlap of the particles in a radial direction of the first particulate polymer, the number average particle diameter of the particles constituting the shell portion is the average thickness of the shell portion.

The shape of the shell portion is not particularly limited, and it is preferable that the shell portion is composed of the particles of the polymer. When the shell portion is composed of the particles of the polymer, the particles constituting the shell portion may be overlapped in layers in the radial direction of the first particulate polymer. However, it is preferable that the particles constituting the shell portion form the shell portion in a single layer shape without overlap of the particles in the radial direction of the first particulate polymer.

The number average particle diameter of the particles constituting the shell portion is preferably 10 nm or more, more preferably 20 nm or more, and particularly preferably 30 nm or more, and is preferably 200 nm or less, more preferably 150 nm or less, and particularly preferably 100 nm or less. When the number average particle diameter falls within the aforementioned range, ion diffusivity, and binding property of the porous membrane to the separator substrate or the electrode plate in the electrolytic solution, and suppression of separation of the porous membrane in the electrolytic solution can be well balanced.

The number average particle diameter of the particles constituting the shell portion is determined by observing the cross-sectional structure of the first particulate polymer by the transmission electron microscope (TEM). Specifically, the longest diameter of the particles constituting the shell portion in the cross-sectional structure of the first particulate polymer is measured. The average of longest diameter of particles constituting the shell portions of randomly selected 20 or more particles of the first particulate polymer is the number average particle diameter of the particles constituting the shell portion.

[1.1.3. Optional Component]

The first particulate polymer may contain an optional component in addition to the core portion and the shell portion as long as the effects of the present invention are not significantly impaired.

For example, the particulate polymer may have a portion in the core portion that is formed from a polymer different from the polymer of the core portion. Specifically, seed particles used in production of the first particulate polymer by a seed polymerization method may remain inside the core portion.

However, from the viewpoint of markedly exerting the effects of the present invention, it is preferable that the first particulate polymer includes only the core portion and the shell portion.

[1.1.4. Size of First Particulate Polymer]

The volume average particle diameter of the first particulate polymer is preferably 0.01 µm or more, more preferably 0.1 µm or more, and particularly preferably 0.3 µm or more, and is preferably 10 µm or less, more preferably 5 µm or less, and particularly preferably 1 µm or less. When the volume average particle diameter of the first particulate polymer is equal to or more than the lower limit of the aforementioned range, dispersibility of the first particulate polymer in the porous membrane composition and the porous membrane can be improved. When it is equal to or less than the upper limit thereof, binding force of the porous membrane to the separator substrate or the electrode plate in the electrolytic solution can be enhanced, low-temperature output property can be enhanced, and separation of the porous membrane in the electrolytic solution can be suppressed.

[1.1.5. Amount of First Particulate Polymer]

It is preferable that the amount of the first particulate polymer in the porous membrane composition is set so that the ratio of the first particulate polymer in the porous membrane falls within the specific range. Specifically, the ratio of the first particulate polymer in the porous membrane is preferably 0.1% by weight or more and 99.9% by weight or less.

In particular, the ratio of the first particulate polymer in the porous membrane is preferably 50% by weight or more, more preferably 55% by weight or more, and particularly preferably 60% by weight or more, and is preferably 99.9% by weight or less, more preferably 99% by weight or less, and particularly preferably 98% by weight or less. In this case, binding force of the porous membrane to the separator substrate or the electrode plate in the electrolytic solution can be enhanced and ion diffusivity can be enhanced.

By the inclusion of the first particulate polymer in the porous membrane, separation of the porous membrane in the electrolytic solution can be suppressed. In this case, the ratio of the first particulate polymer in the porous membrane is preferably 0.1% by weight or more, more preferably 0.5% by weight or more, further preferably 1% by weight or more, and particularly preferably 3% by weight or more. The upper limit thereof is not particularly limited. However, when large binding force of the porous membrane to the separator substrate or the electrode plate in the electrolytic solution is not allowed to be exhibited, the ratio of the first particulate polymer is preferably less than 50% by weight, more preferably 20% by weight or less, and further preferably 10% by weight or less.

[1.1.6. Method for Producing First Particulate Polymer]

The first particulate polymer may be produced by, for example, stepwise polymerization of the monomer of the polymer of the core portion and the monomer of the polymer of the shell portion with alteration of the ratio thereof with the lapse of time. For example, the first particulate polymer may be obtained by continuously performing a multi-step emulsion polymerization method or a multi-step suspension polymerization method, in which a polymer of a prior step is sequentially covered with a polymer of a later step.

One example of a case where the first particulate polymer having a core-shell structure is obtained by the multi-step emulsion polymerization method will be described.

In the polymerization, as an emulsifier, for example, an anionic surfactant such as sodium dodecylbenzenesulfonate or sodium dodecylsulfate, a nonionic surfactant such as polyoxyethylene nonyl phenyl ether or sorbitan monolaurate, or a cationic surfactant such as octadecylamine acetate may be used in accordance with a conventional method. As a polymerization initiator, a peroxide such as tert-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-aminodipropane) hydrochloride may be used.

In the polymerization procedure, the monomer forming the core portion and the emulsifier are first mixed in water as a solvent, and the polymerization initiator is then added to perform emulsion polymerization, to obtain a particulate polymer constituting the core portion. Then, in the presence of this particulate polymer constituting the core portion, the monomer forming the shell portion is polymerized, to obtain the first particulate polymer having a core-shell structure.

From the viewpoint of effecting the partial covering of the outer surface of the core portion with the shell portion, it is preferable that the monomer of the polymer of the shell portion is supplied to a polymerization system as a plurality of divided batches or continuously. When the monomer of the polymer of the shell portion is supplied to the polymerization system as divided batches or continuously, the polymer constituting the shell portion is formed in a particle shape, and the particles are bound to the core portion. Thus, the shell portion with which the core portion is partially covered can be formed.

When the monomer of the polymer of the shell portion is supplied in divided batches, the particle diameter of particles constituting the shell portion and the average thickness of the shell portion can be controlled by the ratio of divided batches of the monomer. When the monomer of the polymer of the shell portion is supplied continuously, the number average particle diameter of particles constituting the shell portion and the average thickness of the shell portion can be controlled by adjusting the supplying amount of the monomer per unit time.

When a monomer having lower affinity to the solvent for polymerization is used as the monomer forming the polymer of the shell portion, the polymerization tends to form the shell portion that partially covers the core portion. When the polymerization solvent is water, it is preferable that the monomer forming the polymer of the shell portion contains a hydrophobic monomer, and particularly preferably contains an aromatic vinyl monomer.

When the amount of the emulsifier to be used is reduced, the polymerization tends to form the shell portion that partially covers the core portion. By appropriately adjusting the amount of the emulsifier, the shell portion that partially covers the core portion can be formed.

The volume average particle diameter of the particulate polymer constituting the core portion, the volume average particle diameter of the first particulate polymer after formation of the shell portion, and the number average particle diameter of the particles constituting the shell portion can be adjusted within desired ranges by, for example, adjusting the amount of the emulsifier, the amounts of the monomers, and the like.

The average ratio of the outer surface of the core portion that is covered with the shell portion can be adjusted within a desired range, for example, by adjusting the amount of the emulsifier and the amount of the monomer of the polymer of the shell portion in accordance with the volume average particle diameter of the particulate polymer constituting the core portion.

[1.2. Second Particulate Polymer]

It is preferable that the porous membrane composition of the present invention contains a second particulate polymer. The second particulate polymer is a particulate polymer, and can function as a binder in the porous membrane. Therefore, the second particulate polymer has an action of binding particles of the first particulate polymer to enhance mechanical strength of the porous membrane. Further, the second particulate polymer has an action of binding the first particulate polymer to the separator substrate or the electrode plate. Therefore, binding property of the porous membrane to the separator substrate or the electrode plate can be enhanced.

As the second particulate polymer, a water-insoluble polymer is preferably used. For example, a styrene-butadiene copolymer, a styrene-acrylonitrile copolymer, a (meth) acrylic acid ester polymer, or the like may be used.

Among them, it is preferable that the second particulate polymer is a (meth)acrylic acid ester polymer. The (meth) acrylic acid ester polymer refers to a polymer containing a (meth)acrylic acid ester monomer unit. The (meth)acrylic acid ester polymer is suitable because of its high ionic conductivity that can improve rate property of the secondary battery, and its electrochemical stability that can improve high-temperature cycle property of the battery.

Examples of the (meth)acrylic acid ester monomer corresponding to the (meth)acrylic acid ester monomer unit may include acrylic acid alkyl esters such as methyl acrylate, ethyl acrylate, n-propyl acrylate, isopropyl acrylate, n-butyl acrylate, tert-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, tert-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One type of them may be solely used, and two or more types thereof may also be used in combination at any ratio. Among them, n-butyl acrylate and 2-ethylhexyl acrylate are preferable in terms of excellent flexibility.

The ratio of the (meth)acrylic acid ester monomer unit in the second particulate polymer is preferably 50% by weight or more, more preferably 70% by weight or more, and particularly preferably 90% by weight or more, and is preferably 99% by weight or less, more preferably 98% by weight or less, and particularly preferably 97% by weight or less. When the ratio of the (meth)acrylic acid ester monomer unit is equal to or more than the aforementioned lower limit, flexibility of the porous membrane can be enhanced and binding property of the porous membrane to another layer can be enhanced. When the ratio of the (meth)acrylic acid ester monomer unit is equal to or less than the aforementioned upper limit, rigidity of the porous membrane can be enhanced, which can also enhance binding property of the porous membrane to the other layer.

It is preferable that the second particulate polymer contains an amide monomer unit. Herein, the amide monomer unit is a structural unit having a structure that is formed by polymerization of an amide monomer. The amide monomer is a monomer having an amido group, and includes not only an amide compound but also an imide compound. The presence of the amide monomer unit allows the second particulate polymer to capture halide ions in the electrolytic solution. Such an action can suppress decomposition of the electrolytic solution and SEI (solid electrolyte interphase) by the halide ions. Therefore, generation of gas caused by charging and discharging can be suppressed. The second particulate polymer can capture transition metal ions in the electrolytic solution. For example, metal ions eluted from the positive electrode can be captured by the second particulate polymer. Therefore, deposition of transition metal on the negative electrode caused by charging and discharging can be suppressed. Accordingly, a degree of decrease in the battery capacity caused by charging and discharging can be made smaller by using the second particulate polymer, and cycle property of the lithium ion secondary battery can be improved.

The generation of gas caused by charging and discharging as described above can be suppressed by using the second particulate polymer. Therefore, the generation of gap between the electrode plate and porous membrane by the gas can be suppressed. Accordingly, low-temperature output property of the lithium ion secondary battery can be further improved.

Herein, the amount of generated gas can be evaluated by change in the volume of cell of the lithium ion secondary battery that is caused by repeated charging and discharging.

Examples of the amide monomer may include a carboxylic acid amide monomer, a sulfonic acid amide monomer, and a phosphoric acid amide monomer.

The carboxylic acid amide monomer is a monomer having an amido group bound to a carboxylic acid group. Examples of the carboxylic acid amide monomer may include unsaturated carboxylic acid amide compounds such as (meth) acrylamide, α-chloroacrylamide, N,N'-methylenebis(meth) acrylamide, N,N'-ethylenebis(meth)acrylamide, N-hydroxymethyl(meth)acrylamide, N-2-hydroxyethyl (meth)acrylamide, N-2-hydroxypropyl(meth)acrylamide, N-3-hydroxypropyl(meth)acrylamide, crotonic acid amide, maleic acid diamide, fumaric acid diamide, and diacetone acrylamide; and N-aminoalkyl derivatives of unsaturated carboxylic acid amides such as N-dimethylaminomethyl (meth)acrylamide, N-2-aminoethyl(meth)acrylamide, N-2-methylaminoethyl(meth)acrylamide, N-2-ethylaminoethyl (meth)acrylamide, N-2-dimethylaminoethyl(meth) acrylamide, N-2-diethylaminoethyl(meth)acrylamide, N-3-aminopropyl(meth)acrylamide, N-3-methylaminopropyl (meth)acrylamide, and N-3-dimethylaminopropyl(meth) acrylamide.

The sulfonic acid amide monomer is a monomer having an amido group bound to a sulfonic acid group. Examples of the sulfonic acid amide monomer may include 2-acrylamide-2-methylpropanesulfonic acid and N-tert-butylacrylamidesulfonic acid.

The phosphoric acid amide monomer is a monomer having an amido group bound to a phosphoric acid group. Examples of the phosphoric acid amide monomer may include acrylamide phosphonic acid and an acrylamide phosphonic acid derivative.

Among the amide monomers, the carboxylic acid amide monomer is preferable from the viewpoints of enhancement of the durability of the porous membrane. Further, the unsaturated carboxylic acid amide compound is more preferable, and (meth)acrylamide and N-hydroxymethyl(meth) acrylamide are particularly preferred.

As the amide monomer and the amide monomer unit, one type thereof may be solely used, and two or more types thereof may also be used in combination at any ratio.

The ratio of the amide monomer unit in the second particulate polymer is preferably 0.1% by weight or more, more preferably 0.2% by weight or more, and particularly preferably 0.5% by weight or more, and is preferably 20% by weight or less, more preferably 15% by weight or less, and particularly preferably 10% by weight or less. When the ratio of the amide monomer unit is equal to or more than the lower limit of the aforementioned range, generation of gas in the lithium ion secondary battery can be effectively suppressed, and transition metal ions in the electrolytic solution can be effectively captured. When it is equal to or less than the upper limit thereof, cycle property of the lithium ion secondary battery can be enhanced.

The second particulate polymer may contain an acid group-containing monomer unit. As the acid group-containing monomer unit, for example, one selected from the same range as described as those used for the first particulate polymer may be used. As the acid group-containing monomer, one type thereof may be solely used, and two or more types thereof may also be used in combination at any ratio.

The ratio of the acid group-containing monomer unit in the second particulate polymer is preferably 0.2% by weight or more, more preferably 0.4% by weight or more, and particularly preferably 0.6% by weight or more, and is preferably 10.0% by weight or less, more preferably 6.0% by weight or less, and particularly preferably 4.0% by weight or less. When the ratio of the acid group-containing monomer unit falls within the aforementioned range, cohesive failure of the porous membrane can be suppressed, and binding force of the porous membrane and an adjacent layer in the electrolytic solution can be improved.

Further, the second particulate polymer may contain a (meth)acrylonitrile monomer unit. In this case, as a (meth) acrylonitrile monomer corresponding to the (meth)acrylonitrile monomer unit, acrylonitrile may be used, methacrylonitrile may also be used, and acrylonitrile and methacrylonitrile may also be used in combination.

The ratio of the (meth)acrylonitrile monomer unit in the second particulate polymer is preferably 0.2% by weight or more, more preferably 0.5% by weight or more, and particularly preferably 1.0% by weight or more, and is preferably 20.0% by weight or less, more preferably 10.0% by weight or less, and particularly preferably 5.0% by weight or less. When the ratio of the (meth)acrylonitrile monomer unit is equal to or more than the aforementioned lower limit, lifetime of the secondary battery can be especially extended. When the ratio of the (meth)acrylonitrile monomer unit is equal to or less than the aforementioned upper limit, mechanical strength of the porous membrane can be enhanced.

The second particulate polymer may contain a crosslinkable monomer unit. Examples of the crosslinkable monomer corresponding to the crosslinkable monomer unit may include those exemplified in the description of the first particulate polymer. N-hydroxymethyl(meth)acrylamide exemplified as the carboxylic acid amide monomer can act as both the amide monomer and the crosslinkable monomer. Therefore, N-hydroxymethyl(meth)acrylamide may be used as the crosslinkable monomer. As the crosslinkable monomer, one type thereof may be solely used, and two or more types thereof may also be used in combination at any ratio.

The ratio of the crosslinkable monomer unit in the second particulate polymer is preferably 0.2% by weight or more, more preferably 0.6% by weight or more, and particularly preferably 1.0% by weight or more, and is preferably 5.0% by weight or less, more preferably 4.0% by weight or less, and particularly preferably 3.0% by weight or less. When the ratio of the crosslinkable monomer unit is equal to or more than the aforementioned lower limit, mechanical strength of the porous membrane can be enhanced. When it is equal to or less than the upper limit thereof, flexibility of the porous membrane can be prevented from deteriorating to be fragile.

The second particulate polymer may contain an optional structural unit in addition to the aforementioned structural units. For example, the second particulate polymer may contain a structural unit having a structure formed by polymerization of styrene (styrene unit), a structural unit having a structure formed by polymerization of butadiene (butadiene unit), and a structural unit having a structure formed by polymerization of acrylonitrile (acrylonitrile unit), in combination with the aforementioned structural units. As the optional structural unit, one type thereof may be solely used, and two or more types thereof may also be used in combination at any ratio.

The glass transition temperature of the second particulate polymer is preferably −100° C. or higher, more preferably −90° C. or higher, and particularly preferably −80° C. or higher, and is preferably 0° C. or lower, more preferably −5° C. or lower, and particularly preferably −10° C. or lower. When the glass transition temperature of the second particulate polymer is equal to or more than the lower limit of the aforementioned range, binding property of the porous membrane to the separator substrate or the electrode plate can be enhanced. When it is equal to or less than the upper limit thereof, flexibility of the porous membrane can be enhanced.

The volume average particle diameter of the second particulate polymer is preferably 0.01 μm or more, more preferably 0.02 μm or more, and particularly preferably 0.05 μm or more, and is preferably 1 μm or less, more preferably 0.9 μm or less, and particularly preferably 0.8 μm or less. When the volume average particle diameter of the second particulate polymer is equal to or more than the lower limit of the aforementioned range, dispersibility of the second particulate polymer in the porous membrane composition and the porous membrane can be enhanced. When it is equal to or less than the upper limit thereof, binding property of the porous membrane to the separator substrate or the electrode plate can be enhanced.

Examples of the method for producing the second particulate polymer may include a solution polymerization method, a suspension polymerization method, and an emulsion polymerization method. Among them, the emulsion polymerization method and the suspension polymerization method are preferable since polymerization can be performed in water and the product as it is can be used as a material for the porous membrane composition. It is preferable that a reaction system for production of the second particulate polymer contains a dispersant. Usually, the second particulate polymer is substantially formed of the polymer that substantially constitutes the second particulate polymer, but may be accompanied with an optional component such as an additive used in polymerization.

The amount of the second particulate polymer relative to 100 parts by weight of the total of the first particulate polymer and the non-conductive particles is preferably 0.1 parts by weight or more, more preferably 0.5 parts by weight or more, and particularly preferably 1 part by weight or more, and is preferably 20 parts by weight or less, more preferably 15 parts by weight or less, and particularly preferably 10 parts by weight or less. When the amount of the second particulate polymer is equal to or more than the lower limit of the aforementioned range, binding force of the porous membrane to the separator substrate or the electrode plate can be enhanced, and separation of the porous membrane can be suppressed. When it is equal to or less than the upper limit thereof, ion diffusivity of the first particulate polymer can be sufficiently exerted.

[1.3. Non-Conductive Fiber]

It is preferable that the porous membrane composition of the present invention contains non-conductive fibers. When the porous membrane composition of the present invention contains the non-conductive fibers, one or more of the following advantages can be usually obtained.

a. Swelling of the porous membrane in an electrolytic solution can be suppressed.

b. Mechanical strength of a porous membrane can be improved.

c. Low-temperature output property of the lithium ion secondary battery can be further improved.

d. High-temperature cycle property of the lithium ion secondary battery can be further improved.

The reason why such excellent effects are obtained is not necessarily clear, but the investigation of the present inventor leads to the following inferences. However, the present invention is not limited to the following inferred reasons.

a. Suppression of Swelling of Porous Membrane in Electrolytic Solution:

When the porous membrane contains non-conductive fibers, the porous membrane is unlikely to be deformed by entanglement of the non-conductive fibers and entanglement of the non-conductive fibers and the first particulate polymer. Therefore, even when the polymer in the porous membrane is swelled during immersion of the porous membrane in an electrolyte, the non-conductive fibers function to suppress the deformation of the porous membrane. That is inferred to be the reason why the porous membrane is unlikely to be swelled in the electrolytic solution.

b. Mechanical Strength of Porous Membrane:

When the porous membrane contains non-conductive fibers, the non-conductive fibers get entangled and the non-conductive fibers and the first particulate polymer get entangled usually in the porous membrane as described above. That is inferred to be the reason why the mechanical strength of the porous membrane is improved.

c. Low-Temperature Output Property:

When the porous membrane is swelled in the electrolytic solution, internal resistance of the battery may increase to decrease low-temperature output property of the lithium ion secondary battery.

In contrast, when the porous membrane contains non-conductive fibers, the porous membrane is usually unlikely to be swelled in the electrolytic solution by an action of the non-conductive fibers. That hinders widening of the distance between the electrode plate of the positive electrode and the electrode plate of the negative electrode in the lithium ion secondary battery, and the internal resistance of the battery can thereby be reduced.

When the porous membrane is unlikely to be swelled, a gap is unlikely to be generated between the porous membrane and the electrode plate. Therefore, the reaction field of lithium ions with the electrode active material is unlikely to be made uneven.

When the porous membrane contains non-conductive fibers, the diffusivity of the electrolytic solution in the porous membrane is usually improved. In particular, when a material having high affinity to the electrolytic solution, such as cellulose, is used as the non-conductive fibers, the diffusivity of the electrolytic solution in the porous membrane can be particularly improved.

In addition, lithium ions easily pass through the porous membrane, the deposition of lithium in the electrolytic solution can be prevented. Therefore, an increase in resistance caused by deposited lithium can be suppressed.

It is inferred that a combination of these factors can further improve the low-temperature output property of the lithium ion secondary battery when the porous membrane composition containing non-conductive fibers is used.

d. High-Temperature Cycle Property:

When the porous membrane contains non-conductive fibers, the deposition of lithium in the electrolytic solution can be usually suppressed, as described above. Therefore, an increase in resistance caused by repeating charging and discharging is unlikely to occur. That is inferred to be the reason why excellent high-temperature cycle property can be achieved when the porous membrane composition containing non-conductive fibers is used.

The non-conductive fibers are fibers having non-conductivity. The non-conductive fibers are not dissolved in the porous membrane composition, and a fiber shape can be maintained. The non-conductive fibers are not dissolved in the electrolytic solution, and the fiber shape can be maintained. Such non-conductive fibers may be formed from an organic material, from an inorganic material, or from a combination of an organic material and an inorganic material. In particular, non-conductive fibers formed from an organic material are preferable since elution of metal does not occur and the organic material is readily available.

It is preferable that the material for the aforementioned non-conductive fibers is a material that has non-conductivity, and is electrochemically stable and stable in the electrolytic solution. From this viewpoint, preferable examples of the material for the non-conductive fibers may include polysaccharides such as cellulose, modified cellulose, chitin, and chitosan, and polymers such as polypropylene, polyester, polyacrylonitrile, polyaramide, polyamideimide, and polyimide. Among them, a polysaccharide is preferable, and cellulose is more preferable since the heat resistance is excellent and the diffusivity of the electrolytic solution is excellent. As the material for the non-conductive fibers, one type thereof may be solely used, and two or more types thereof may also be used in combination at any ratio. In addition to the aforementioned constituent material, the non-conductive fibers may contain an optional additive as a component, if necessary.

The fiber diameter of the non-conductive fibers is usually 0.01 µm or more, preferably 0.015 µm or more, and more preferably 0.02 µm or more, and is usually 1 µm or less, preferably 0.5 µm or less, and more preferably 0.1 µm or less. When non-conductive fibers having a fiber diameter falling within such a range are used, swelling of the porous membrane in the electrolytic solution can be effectively suppressed. When the fiber diameter is equal to or more than the lower limit of the aforementioned range, dispersibility of the non-conductive fibers can be improved. When it is equal to or less than the upper limit thereof, internal resistance of the battery can be decreased.

The fiber diameter of the aforementioned non-conductive fibers represents the fiber thickness of the non-conductive fibers. The aforementioned fiber diameter may be measured by a scanning electron microscope (SEM). Specifically, the non-conductive fibers are photographed as a SEM photograph at a magnification of 50,000, two lines are drawn at arbitrary positions on the photograph so as to cross the photograph, the diameters of all the non-conductive fibers that intersect the lines are each measured, and the average value (n=20 or more) thereof is calculated. Thus, the fiber diameter can be determined. How to draw lines is not particularly limited as long as the number of the fibers that intersect the lines is 20 or more. When the fibers are fibers having a largest fiber diameter of more than 1 μm, the fiber diameter may be calculated from a SEM photograph of a magnification of 5,000.

The fiber length of the non-conductive fibers is preferably 50 μm or more, more preferably 60 μm or more, and particularly preferably 70 μm or more, and is preferably 1,000 μm or less, more preferably 500 μm or less, and particularly preferably 200 μm or less. When the fiber length falls within the aforementioned range, the non-conductive fibers are likely to get entangled and the non-conductive fibers and the first particulate polymer are likely to get entangled. Therefore, mechanical strength of the porous membrane can be improved, and swelling of the porous membrane during immersion in the electrolytic solution can be suppressed, which lead to improvement in low-temperature output property and cycle property of the secondary battery. Herein, the fiber length of the non-conductive fibers represents the length per fiber of the non-conductive fibers.

It is preferable that the amount of the non-conductive fibers is set so that the weight ratio of the first particulate polymer and the non-conductive fibers represented by "first particulate polymer/non-conductive fiber" falls within a specific range. Specifically, the weight ratio "first particulate polymer/non-conductive fiber" is preferably 50/50 or more, more preferably 55/45 or more, and particularly preferably 60/40 or more, and is preferably 99.99/0.01 or less, more preferably 99.9/0.1 or less, and particularly preferably 99/1 or less. When the weight ratio "first particulate polymer/non-conductive fiber" is equal to or less than the lower limit of the aforementioned range, internal resistance of the battery can be decreased. When it is equal to or less than the upper limit thereof, adhesion to the separator and the electrode plate can be improved.

[1.4. Solvent]

The porous membrane composition of the present invention usually contains a solvent. As the solvent, water is preferably used. The first and second particulate polymers are usually water-insoluble. Therefore, when water is used as the solvent, the first and second particulate polymers are dispersed in water in particle shapes. Further, the non-conductive fibers are usually water-insoluble. Therefore, when water is used as the solvent, the non-conductive fibers are dispersed in water in fiber shapes.

As the solvent, water may be used in combination with a solvent other than water. Examples of the solvent to be used in combination with water may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; alcohols such as methanol, ethanol, isopropanol, ethyleneglycol, and ethylenegylcol monomethyl ether; and amides such as N-methylpyrrolidone (NMP), and N,N-dimethylformamide. One type of them may be solely used, and two or more types thereof may also be used in combination at any ratio. However, it is preferable to use water alone as the solvent.

It is preferable that the amount of the solvent in the porous membrane composition is set so that the solid content concentration of the porous membrane composition falls within a specific range. Specifically, the solid content concentration of the porous membrane composition is preferably 10% by weight or more, more preferably 15% by weight or more, and particularly preferably 20% by weight or more, and is preferably 80% by weight or less, more preferably 75% by weight or less, and particularly preferably 70% by weight or less. Herein, the solid content of a composition refers to a substance that remains after drying the composition.

[1.5. Optional Particles]

The porous membrane composition of the present invention may further contain non-conductive particles. When the porous membrane is filled with non-conductive particles, insulating property of the porous membrane can be enhanced, and short circuit in the lithium ion secondary battery can be stably prevented. Further, the non-conductive particles usually have high rigidity, and therefore, the mechanical strength of the porous membrane can be enhanced. Therefore, even when a stress toward shrinking is generated in the separator substrate by heat, the porous membrane can withstand the stress. Therefore, the occurrence of short circuit by shrinking of the separator substrate can be prevented. As such non-conductive particles, inorganic particles may be used, and organic particles may also be used.

The inorganic particles usually have excellent dispersion stability in water, are unlikely to be settled in the porous membrane composition, and can maintain a uniform slurry state for extended periods of time. When the inorganic particles are used, heat resistance of the porous membrane can be usually enhanced.

It is preferable that the material for the non-conductive particles is an electrochemically stable material. From this viewpoint, preferable examples of the inorganic material for the non-conductive particles may include oxide particles such as aluminum oxide (alumina), a hydrate of aluminum oxide (boehmite (AlOOH)), gibbsite (Al(OH)$_3$), silicon oxide, magnesium oxide (magnesia), magnesium hydroxide, calcium oxide, titanium oxide (titania), BaTiO$_3$, ZrO$_2$, and alumina-silica complex oxide; nitride particles such as aluminum nitride and boron nitride; covalent crystal particles such as silicon and diamond; insoluble ionic crystal particles such as barium sulfate, calcium fluoride, and barium fluoride; and clay fine particles such as talc and montmorillonite.

Among them, from the viewpoints of stability in the electrolytic solution and electric potential stability, oxide particles are preferable. In particular, from the viewpoints of low water absorption property and excellent heat resistance (for example, resistance to high temperature of 180° C. or higher), titanium oxide, aluminum oxide, a hydrate of aluminum oxide, magnesium oxide, and magnesium hydroxide are more preferable. Aluminum oxide, a hydrate of aluminum oxide, magnesium oxide, and magnesium hydroxide are further preferred, and aluminum oxide is particularly preferred.

As the organic particles, polymer particles are usually used. In the organic particles, when the type and amount of functional group on a surface of the organic particles are adjusted, affinity to water can be controlled, and further the moisture amount contained in the porous membrane can be controlled. The organic particles are usually excellent in small amount of metal ion elution.

As a polymer forming the non-conductive particles, a polymer other than the aforementioned first and second particulate polymers may be used. Examples thereof may include a variety of types of polymer compounds such as polystyrene, polyethylene, a melamine resin, and a phenolic resin. As the polymer compounds forming the particles, for example, a mixture, a modified product, a derivative, a random copolymer, an alternating copolymer, a graft copolymer, a block copolymer, a crosslinked product, or the like may also be used. The organic particles may be formed from a mixture of two or more types of polymer compounds.

The volume average particle diameter of the non-conductive particles is preferably 0.01 μm or more, more preferably 0.05 μm or more, and particularly preferably 0.1 μm or more, and is preferably 20 μm or less, more preferably 15 μm or less, and particularly preferably 10 μm or less. When the volume average particle diameter of the non-conductive particles is equal to or more than the lower limit of the aforementioned range, permeability of the electrolytic solution can be enhanced. When it is equal to or less than the upper limit thereof, thickness of the porous membrane can be decreased.

The amount of the non-conductive particles relative to 100 parts by weight of the first particulate polymer is preferably 0.1 parts by weight or more, more preferably 1 part by weight or more, and particularly preferably 5 parts by weight or more, and is preferably 99 parts by weight or less, more preferably 50 parts by weight or less, further preferably 40 parts by weight or less, and particularly preferably 30 parts by weight or less. When the amount of the non-conductive particles is equal to or more than the lower limit of the aforementioned range, heat resistance of the porous membrane can be enhanced. When it is equal to or less than the upper limit thereof, cracking of the porous membrane can be prevented.

[1.6. Water-Soluble Polymer]

The porous membrane composition of the present invention may further contain a water-soluble polymer. The water-soluble polymer usually functions as a viscosity modifier in the porous membrane composition. In particular, when the porous membrane composition contains water as the solvent, a part of the water-soluble polymer in the porous membrane composition exists as a free form in the solvent, and another part of the water-soluble polymer is adsorbed on the surfaces of the first and second particulate polymers. Thus, the surfaces of the first and second particulate polymers are covered with a layer of the water-soluble polymer. Therefore, dispersibility of the first and second particulate polymers in water can be improved.

Examples of the water-soluble polymer may include cellulose-based polymers such as carboxymethyl cellulose, methyl cellulose, and hydroxypropyl cellulose, and ammonium salts and alkali metal salts thereof; (modified) poly (meth)acrylic acid and ammonium salts and alkali metal salts thereof; polyvinyl alcohol compounds such as (modified) polyvinyl alcohol, a copolymer of acrylic acid or acrylic acid salt and vinyl alcohol, and a copolymer of maleic anhydride, maleic acid, or fumaric acid and vinyl alcohol; polyethylene glycol, polyethylene oxide, polyvinylpyrrolidone, modified polyacrylic acid, oxide starch, phosphoric acid starch, casein, and a variety of starches. Herein, "(modified) poly-" includes both "unmodified poly-" and "modified poly-."

The amount of the water-soluble polymer relative to 100 parts by weight of the total of the first particulate polymer and the non-conductive particles is preferably 0.1 parts by weight or more, more preferably 0.2 parts by weight or more, and particularly preferably 0.5 part by weight or more, and is preferably 15 parts by weight or less, more preferably 10 parts by weight or less, and particularly preferably 5 parts by weight or less. When the porous membrane composition contains the non-conductive fibers, the amount of the water-soluble polymer relative to 100 parts by weight of the total of the first particulate polymer and the non-conductive fibers is preferably 0.01 parts by weight or more, and more preferably 0.1 parts by weight or more, and is preferably 10 parts by weight or less, and more preferably 5 parts by weight or less. When the amount of the water-soluble polymer is equal to or more than the lower limit of the aforementioned range, dispersibility of the porous membrane composition can be enhanced. When it is equal to or less than the upper limit thereof, ion diffusivity of the first particulate polymer can be sufficiently exerted.

[1.7. Optional Component]

The porous membrane composition may contain an optional component in addition to the first particulate polymer, the second particulate polymer, the non-conductive fibers, the solvent, the non-conductive particles, and the water-soluble polymer. As such an optional component, one that does not excessively exert undesired effects on a battery reaction may be used. As the optional component, one type thereof may be solely used, and two or more types thereof may also be used in combination at any ratio.

For example, the porous membrane composition may contain an isothiazoline-based compound, a chelate compound, a pyrithione compound, a dispersant, a leveling agent, an antioxidant, a thickener, an antifoaming agent, a wetting agent, and an electrolytic solution additive having a function of suppressing decomposition of electrolytic solution.

[1.8. Properties of Porous Membrane Composition]

The porous membrane composition of the present invention is usually a fluid slurry composition. In the porous membrane composition of the present invention, each component contained in the porous membrane composition has high dispersibility. Therefore, the viscosity of the porous membrane composition of the present invention can be usually decreased with ease. Specifically, it is preferable that the viscosity of the porous membrane composition is 10 mPa·s to 2,000 mPa·s from the viewpoint of improving application property during production of the porous membrane. Herein, the aforementioned viscosity is a value measured at 25° C. and a rotation speed of 60 rpm with an E type viscometer.

The non-conductive fibers exert an effect of improving dispersion stability of the porous membrane composition depending on the type of the material for the non-conductive fibers. For example, use of cellulose fibers as the non-conductive fibers can exert an effect of suppressing a change of the porous membrane composition with the lapse of time even at high concentration of the porous membrane composition. Therefore, the porous membrane composition containing the non-conductive fibers usually has excellent dispersion stability.

[1.9. Method for Producing Porous Membrane Composition]

The method for producing the porous membrane composition is not particularly limited. Usually, the porous membrane composition is obtained by mixing the aforementioned components.

The order of mixing the respective components is not particularly limited. The mixing method therefor is not either particularly limited. As a mixer, a disperser is usually used for mixing in order to rapidly disperse the particles.

It is preferable that the disperser is a device capable of uniformly dispersing and mixing the aforementioned components. Examples thereof may include a ball mill, a sand mill, a pigment disperser, a grinder, an ultrasonic disperser, a homogenizer, and a planetary mixer. Among them, high dispersion devices such as a bead mill, a roll mill, and FILMIX are particularly preferred since they are capable of applying high dispersion share.

[2. Porous Membrane for Lithium Ion Secondary Battery]

The porous membrane composition of the present invention may be applied onto an appropriate substrate, and, if necessary, dried to produce a porous membrane for a lithium ion secondary battery (this may be referred to hereinbelow as "porous membrane" as appropriate) as a membrane formed from a solid content of the porous membrane composition. For example, the porous membrane can be produced by a production method including steps of applying the porous membrane composition onto a substrate to obtain a layer of the porous membrane composition, and, if necessary, drying the layer to remove the solvent such as water from the layer.

The thus obtained porous membrane contains the first particulate polymer, and has a number of micropores. The first particulate polymer exhibits binding property by swelling of the shell portion in the electrolytic solution. Therefore, the porous membrane can be tightly bound to the separator substrate or the electrode plate. Since the core portion of the first particulate polymer has high ion diffusivity, an increase in the resistance by the porous membrane according to the present invention is small. Further, since the shell portion of the first particulate polymer does not largely swell to excessively lose the rigidity, the first particulate polymer has appropriate rigidity. Therefore, the porous membrane containing the first particulate polymer has excellent rigidity. Accordingly, in a separator having the porous membrane, shrinking of the separator substrate by heat can be suppressed and damage of the separator substrate by a foreign substance can be prevented. In an electrode for a lithium ion secondary battery having this porous membrane (this may be referred to hereinbelow as "electrode" as appropriate), the porous membrane may be provided on an electrode active material layer. In this case, separation of particles of the electrode active material and the like from the electrode active material layer and detachment of the electrode active material layer from a current collector can be prevented by the porous membrane. In addition, even when the battery is continuously vibrated, separation of the porous membrane in the electrolytic solution can be suppressed, and battery safety can be improved. Further, when the porous membrane contains the non-conductive fibers, swelling of the porous membrane in the electrolytic solution can be usually suppressed.

The substrate is a member that is a subject for forming the layer of the porous membrane composition. The substrate is not limited. For example, the layer of the porous membrane composition may be formed on a surface of a release film, the solvent may be removed from the layer to form the porous membrane, and the porous membrane may be separated from the release film. However, a constituent element of the battery is usually used as the substrate since the production efficiency is enhanced by omission of the step of separating the porous membrane. Examples of such a constituent element of the battery may include a separator substrate and an electrode plate.

Examples of the application method may include a doctor blade method, a dip method, a reverse roll method, a direct roll method, a gravure method, an extrusion method, and a brush application method. Among them, the dip method and the gravure method are preferable since a uniform porous membrane can be obtained.

Examples of the drying method may include drying by air including warm air, hot air, and low humid air; vacuum drying; and a drying method by irradiation of infrared ray, far infrared ray, or electron beam.

The temperature during drying is preferably 40° C. or higher, more preferably 45° C. or higher, and particularly preferably 50° C. or higher, and is preferably 90° C. or lower, more preferably 80° C. or lower, and particularly preferably 70° C. or lower. When the drying temperature is equal to or higher than the lower limit of the aforementioned range, the solvent and a low molecular compound can be efficiency removed from the porous membrane composition. When it is equal to or lower than the upper limit thereof, deformation of the substrate by heat can be suppressed.

The drying time is preferably 5 seconds or more, more preferably 10 seconds or more, and particularly preferably 15 seconds or more, and is preferably 3 minutes or less, more preferably 2 minutes or less, and particularly preferably 1 minute or less. When the drying time is equal to or more than the lower limit of the aforementioned range, the solvent can be sufficiently removed from the porous membrane composition. Therefore, output property of the battery can be improved. When it is equal to or less than the upper limit thereof, production efficiency can be enhanced.

In the method for producing the porous membrane, an optional operation other than the aforementioned operations may be performed.

For example, the porous membrane may be subjected to a pressurization treatment by a press method such as metal mold press and roll press. By the pressurization treatment, binding property of the substrate to the porous membrane can be improved. However, it is preferable that a pressure and a pressurization time are appropriately controlled so that they are not excessively large in order to keep the porosity of the porous membrane within a preferable range.

In order to remove residual water, for example, drying under vacuum and drying in a drying room are preferable.

Further, a heating treatment is also preferable. By the heating treatment, a thermal crosslinking group contained in the polymer component can be crosslinked to enhance the binding force.

The thickness of the porous membrane is preferably 0.1 µm or more, more preferably 0.2 µm or more, and particularly preferably 0.3 µm or more, and is preferably 20 µm or less, more preferably 15 µm or less, and particularly preferably 10 µm or less. When the thickness of the porous membrane is equal to or more than the lower limit of the aforementioned range, heat resistance of the porous membrane can be enhanced. When it is equal to or less than the upper limit thereof, decrease in the ion conductivity by the porous membrane can be suppressed.

[3. Separator for Lithium Ion Secondary Battery]

The separator of the present invention has a separator substrate and the porous membrane. Since the separator of the present invention has the porous membrane according to the present invention, the porous membrane is tightly bound to the separator substrate and the electrode plate in the lithium ion secondary battery having the separator. Since the porous membrane according to the present invention has excellent ion diffusivity, an increase in the internal resistance by the separator of the present invention is small. In addition, even when the battery is continuously vibrated, the porous membrane of the present invention can suppress separation of the porous membrane in the electrolytic solution, and improve battery safety.

[3.1. Separator Substrate]

As the separator substrate, for example, a porous substrate having fine pores may be used. When such a separator substrate is used, short circuit in the secondary battery can be prevented without preventing charging and discharging of the battery. Specific examples of the separator substrate may include microporous membranes and non-woven fabrics that contain a polyolefin resin such as a polyethylene resin and a polypropylene resin, and an aromatic polyamide resin.

The thickness of the separator substrate is preferably 0.5 µm or more, and more preferably 1 µm or more, and is preferably 40 µm or less, more preferably 30 µm or less, and particularly preferably 10 µm or less. When the thickness falls within this range, an increase in the internal resistance by the separator substrate in the secondary battery is reduced, and workability during production of the battery is superior.

[3.2. Porous Membrane in Separator for Lithium Ion Secondary Battery]

The separator of the present invention has the aforementioned porous membrane on the separator substrate. Specifically, the separator of the present invention has the separator substrate and the porous membrane that is obtained by applying the porous membrane composition onto the separator substrate and if necessary, drying the composition. Such a separator can be produced by, for example, the aforementioned method for producing the porous membrane using the separator substrate as the substrate. At this time, the porous membrane may be provided on one side of the separator substrate, or on both sides.

[4. Electrode for Lithium Ion Secondary Battery]

An electrode for a lithium ion secondary battery of the present invention (this may be referred to hereinbelow as "electrode" as appropriate) has the electrode plate and the porous membrane. The electrode plate usually has the current collector and the electrode active material layer. Since the electrode of the present invention has the porous membrane according to the present invention, the porous membrane is tightly bound to the separator substrate or the electrode plate in the lithium ion secondary battery having the electrode. Since the porous membrane according to the present invention has excellent ion diffusivity, internal resistance of the electrode can be reduced. Since the porous membrane of the present invention can function as a separator, internal short circuit of the lithium ion secondary battery can be prevented. In addition, even when the battery is continuously vibrated, the porous membrane of the present invention can suppress separation of the porous membrane in the electrolytic solution, and battery safety can be improved.

<4.1. Current Collector>

As the material of the current collector, a material having electrical conductivity and electrochemical durability may be used. As this material of the current collector, a metal material is usually used. Examples of the metal material may include iron, copper, aluminum, nickel, stainless steel, titanium, tantalum, gold, and platinum. Among these, aluminum is preferable as the current collector for positive electrodes, and copper is preferable as the current collector for negative electrodes. One type of the aforementioned materials may be solely used, and two or more types thereof may also be used in combination at any ratio.

The shape of the current collector is not particularly limited, but is preferably a sheet-like shape having a thickness of approximately 0.001 mm to 0.5 mm.

It is preferable that the surface of the current collector is previously subjected to a roughening treatment for increasing adhesion strength with the electrode active material layer. Examples of the roughening method may include a mechanical polishing method, an electrolytic polishing method, and a chemical polishing method. In the mechanical polishing method, for example, coated abrasives including fixed abrasive particles, grindstone, emery wheel, and wire brush with steel wire are used. In addition, for increasing adhesion strength and conductivity of the electrode active material layer, an intermediate layer may be formed on the surface of the current collector.

[4.2. Electrode Active Material Layer]

The electrode active material layer is a layer provided on the current collector, and contains the electrode active material.

As the electrode active material of the lithium ion secondary battery, one in which lithium ions can be reversely intercalated or deintercalated by application of electrical potential in the electrolytic solution may be used.

A positive electrode active material is classified into a material formed of an inorganic compound and a material formed of an organic compound. Examples of the positive electrode active materials formed of an inorganic compound may include a transition metal oxide, a complex oxide of lithium and transition metal, and a transition metal sulfide. As the aforementioned transition metal, for example, Fe, Co, Ni, Mn, or the like is used. Specific examples of the inorganic compound used for the positive electrode active material may include lithium-containing metal complex oxides such as $LiCoO_2$, $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O—P_2O_5$, $MoO_3$, $V_2O_5$, and $V_6O_{13}$. Examples of the positive electrode active material formed of an organic compound may include conductive polymers such as polyacetylene and poly-p-phenylene.

Further, a positive electrode active material formed of a composite material including a combination of an inorganic compound and an organic compound may also be used.

Further, for example, an iron-based oxide may be subjected to reduction firing in the presence of a carbon source substance to produce a composite material covered with a carbon material, and this composite material may be used as the positive electrode active material. The iron-based oxide tends to have poor electroconductivity, but can be used as a high-performance positive electrode active material by forming the composite material as described above.

Further, a material obtained by partial substitution of the aforementioned compound with an element may also be used as the positive electrode active material.

As the positive electrode active material, one type thereof may be solely used, and two or more types thereof may also be used in combination at any ratio. In addition, a mixture of the inorganic compound and the organic compound described above may also be used as the positive electrode active material.

The particle diameter of the positive electrode active material may be selected considering other constituents of the lithium ion secondary battery. From the viewpoints of improvement of battery properties such as load property and cycle property, the volume average particle diameter of the positive electrode active material is preferably 0.1 µm or more, and more preferably 1 µm or more, and is preferably 50 µm or less, and more preferably 20 µm or less. When the volume average particle diameter of the positive electrode active material falls within this range, a battery having a large charging and discharging capacity can be obtained, and the positive electrode active material is easily handled during production of a slurry composition for an electrode and the electrode.

The ratio of the positive electrode active material in the electrode active material layer is preferably 90% by weight or more, and more preferably 95% by weight or more, and is preferably 99.9% by weight or less, and more preferably 99% by weight or less. When the amount of the positive electrode active material falls within the aforementioned range, capacity of the lithium ion secondary battery can be increased, and flexibility of the positive electrode and the binding property of the current collector to the positive electrode active material layer can be improved.

Examples of the negative electrode active material may include carbonaceous materials such as amorphous carbon, graphite, natural graphite, mezo carbon micro beads, and pitch-based carbon fibers; and conductive polymers such as polyacene. Further examples thereof may include metals such as silicon, tin, zinc, manganese, iron, and nickel, and alloys thereof; oxides of the aforementioned metals or alloys; and sulfates of the aforementioned metals or alloys. Further, metal lithium; lithium alloys such as Li—Al, Li—Bi—Cd, and Li—Sn—Cd; a lithium transition metal nitride; silicon or the like may be used. As the electrode active material, a material having a surface in which a conductive material is attached by a mechanical modifying method may also be used. As the negative electrode active material, one type thereof may be solely used, and two or more types thereof may also be used in combination at any ratio.

The particle diameter of the negative electrode active material is appropriately selected considering other constituents of the lithium ion secondary battery. From the viewpoints of improvement in battery properties such as initial efficiency, load property, and cycle property, the volume average particle diameter of the negative electrode active material is preferably 0.1 µm or more, more preferably 1 µm or more, and further preferably 5 µm or more, and is preferably 100 µm or less, more preferably 50 µm or less, and further preferably 20 µm or less.

The specific surface area of the negative electrode active material is, from the viewpoint of improved power density, preferably 2 $m^2/g$ or more, more preferably 3 $m^2/g$ or more, and further preferably 5 $m^2/g$ or more, and is preferably 20 $m^2/g$ or less, more preferably 15 $m^2/g$ or less, and further preferably 10 $m^2/g$ or less. The specific surface area of the negative electrode active material can be measured by, for example, a BET method.

The ratio of the negative electrode active material in the electrode active material layer is preferably 85% by weight or more, and more preferably 88% by weight or more, and is preferably 99% by weight or less, and more preferably 97% by weight or less. When the amount of the negative electrode active material falls within the aforementioned range, a negative electrode that exhibits high capacity and excellent flexibility and binding property can be achieved.

In addition to the electrode active material, it is preferable that the electrode active material layer contains a binder for an electrode. When the electrode active material layer contains the binder for an electrode, binding property of the electrode active material layer are improved, and strength against mechanical force applied at a step of winding the electrode or the like is increased. Further, since the electrode active material layer is unlikely to be separated from the current collector and the porous membrane, risk of short circuit caused by separated materials decreases.

As the binder for an electrode, for example, a polymer may be used. Examples of the polymer to be used as the binder for an electrode may include polymers selected from the same range as the ranges of the polymers described in the description section of the second particulate polymer and in the description section of the water-soluble polymer.

Further, particles of a soft polymer exemplified in the following may also be used as the binder for an electrode. Examples of the soft polymer may include:

(i) acrylic-based soft polymers which are acrylic acid or methacrylic acid derivative homopolymers or copolymers of acrylic acid or methacrylic acid derivative homopolymer and a monomer copolymerizable therewith, such as polybutyl acrylate, polybutyl methacrylate, polyhydroxyethyl methacrylate, polyacrylamide, polyacrylonitrile, a butyl acrylate.styrene copolymer, a butyl acrylate.acrylonitrile copolymer, and a butyl acrylate.acrylonitrileycidyl methacrylate copolymer;

(ii) isobutylene-based soft polymers such as polyisobutylene, an isobutylene.isoprene rubber, and an isobutylene.styrene copolymer;

(iii) diene-based soft polymers such as polybutadiene, polyisoprene, a butadiene.styrene random copolymer, an isoprene.styrene random copolymer, an acrylonitrile.butadiene copolymer, an acrylonitrile.butadiene.styrene copolymer, a butadiene.styrene.block copolymer, a styrene.butadiene.styrene.block copolymer, an isoprene.styrene.block copolymer, and a styrene.isoprene.styrene.block copolymer;

(iv) silicon-containing soft polymers such as dimethylpolysiloxane, diphenylpolysiloxane, and dihydroxypolysiloxane;

(v) olefin-based soft polymers such as liquid polyethylene, polypropylene, poly-1-butene, an ethylene.α-olefin copolymer, a propylene.α-olefin copolymer, an ethylene.propylene.diene copolymer (EPDM), and an ethylene.propylene.styrene copolymer;

(vi) vinyl-based soft polymers such as polyvinyl alcohol, polyvinyl acetate, polyvinyl stearate, and a vinyl acetate.styrene copolymer;

(vii) epoxy-based soft polymers such as polyethylene oxide, polypropylene oxide, and an epichlorohydrin rubber;

(viii) fluorine-containing soft polymers such as a vinylidene fluoride-based rubber and a tetrafluoroethylene-propylene rubber; and (ix) other soft polymers such as natural rubber, polypeptide, protein, a polyester-based thermoplastic elastomer, a vinyl chloride-based thermoplastic elastomer, and a polyamide-based thermoplastic elastomer. Among these, diene-based soft polymers and acrylic-based soft polymers are preferable. Furthermore, these soft polymers may have a crosslinked structure or may be modified to introduce a functional group.

As the binder for an electrode, one type thereof may be solely used, and two or more types thereof may also be used in combination at any ratio.

The amount of the binder for an electrode in the electrode active material layer relative to 100 parts by weight of the electrode active material is preferably 0.1 parts by weight or more, more preferably 0.2 parts by weight or more, and particularly preferably 0.5 parts by weight or more, and is preferably 5 parts by weight or less, and more preferably 3 parts by weight or less. When the amount of the binder for an electrode falls within the aforementioned range, separation of the electrode active material from the electrode can be prevented without inhibiting the battery reaction.

In addition to the electrode active material and the binder for an electrode, the electrode active material layer may contain an optional component as long as the effects of the present invention are not significantly impaired. Examples of the component may include conductive materials and reinforcement materials. As the optional component, one type thereof may be solely used, and two or more types thereof may also be used in combination at any ratio.

Examples of the conductive material may include conductive carbon such as acetylene black, ketjen black, carbon black, graphite, vapor grown carbon fibers, and carbon nanotube; carbon powder such as graphite; and fibers and foils of a variety of metals. The use of the conductive material can improve electric contact between the electrode active materials, and battery properties such as cycle property can be improved.

The specific surface area of the conductive material is preferably 50 m$^2$/g or more, more preferably 60 m$^2$/g or more, and particularly preferably 70 m$^2$/g or more, and is preferably 1500 m$^2$/g or less, more preferably 1200 m$^2$/g or less, and particularly preferably 1000 m$^2$/g or less. When the specific surface area of the conductive material is equal to or more than the lower limit of the aforementioned range, the lithium ion secondary battery can have improved low temperature output property. Also, when the specific surface area thereof is equal to or less than the upper limit value, binding property between the electrode active material layer and the current collector can be enhanced.

As the reinforcement material, for example, a variety of inorganic or organic fillers in a spherical shape, a plate shape, a rod shape, or a fiber shape may be used. The use of the reinforcement material can provide a tough and flexible electrode, and impart excellent long-term cycle property.

The amounts of the conductive material and the reinforcement material to be used relative to 100 parts by weight of the electrode active material are each usually 0 part by weight or more, and preferably 1 part by weight or more, and are each preferably 20 parts by weight or less, and more preferably 10 parts by weight or less.

In both the positive electrode and the negative electrode, the thickness of the electrode active material layer is preferably 5 µm or more, and more preferably 10 µm or more, and is preferably 300 µm or less, and more preferably 250 µm or less.

The method for producing the electrode active material layer is not particularly limited. The electrode active material layer may be produced, for example, by applying a slurry composition for an electrode containing the electrode active material, a solvent, and if necessary, the binder for an electrode and an optional component onto the current collector, followed by drying. As the solvent, either water or an organic solvent may be used.

[4.3. Porous Membrane Electrode for Lithium Ion Secondary Battery Includes]

The electrode of the present invention includes the aforementioned porous membrane on the aforementioned electrode plate. Specifically, the electrode of the present invention includes the electrode plate and the porous membrane that is obtained by applying the porous membrane composition onto the electrode plate and if necessary, drying the composition. Such an electrode can be produced by, for example, the aforementioned method for producing the porous membrane using the electrode plate as the substrate. At this time, the porous membrane may be provided on one side of the electrode plate, or on both sides. However, the porous membrane is usually provided on the electrode active material layer. Therefore, the electrode of the present invention has the current collector, the electrode active material layer, and the porous membrane in this order.

[5. Lithium Ion Secondary Battery]

The lithium ion secondary battery of the present invention includes the positive electrode, the negative electrode, and the electrolytic solution. The secondary battery of the present invention satisfies the following requirement (A), requirement (B), or both requirements (A) and (B).

(A) At least one of the positive electrode and the negative electrode of the lithium ion secondary battery of the present invention is the electrode of the present invention.

(B) The lithium ion secondary battery of the present invention is provided with a separator, and the separator is the separator of the present invention.

Since the lithium ion secondary battery of the present invention includes the porous membrane according to the present invention, the battery has excellent low-temperature output property. The lithium ion secondary battery of the present invention usually has excellent high-temperature cycle property.

[5.1. Electrode]

In principle, the lithium ion secondary battery of the present invention includes the electrode of the present invention as one or both of the positive electrode and the negative electrode. However, when the lithium ion secondary battery of the present invention includes the separator of the present invention as a separator, an electrode other than the electrode of the present invention may be provided as both the positive electrode and the negative electrode.

[5.2. Separator]

In principle, the lithium ion secondary battery of the present invention includes the separator of the present invention as a separator. However, when the secondary battery of the present invention includes the electrode of the present invention as at least one of the positive electrode and the negative electrode, a separator other than the separator of the present invention may be provided as a separator. Since the porous membrane provided to the electrode of the present invention functions as a separator, the separator may be omitted in the secondary battery including the electrode of the present invention.

[5.3. Electrolytic Solution]

As the electrolytic solution, one that allows the polymer of the core portion and the polymer of the shell portion of the first particulate polymer to be swelled at a swelling degree falling within the aforementioned specific range may be used. As such an electrolytic solution, an organic electrolytic solution containing an organic solvent and a supporting electrolyte that is dissolved in the organic solvent is preferably used.

As the supporting electrolyte, for example, a lithium salt is used. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$, and $CF_3SO_3Li$ are preferable since they are soluble in a solvent and exhibit high dissociation degree. As the supporting electrolyte, one type thereof may be solely used, and two or more types thereof may also be used in combination at any ratio. The use of a supporting electrolyte having high dissociation degree tends to increase the lithium ion conductivity. Therefore, the lithium ion conductivity can be adjusted by the type of supporting electrolyte.

The concentration of the supporting electrolyte in the electrolytic solution is preferably 1% by weight or more, and more preferably 5% by weight or more, and is preferably 30% by weight or less, and more preferably 20% by weight or less. Further, the supporting electrolyte is used preferably at a concentration of 0.5 mol/L to 2.5 mol/L depending on the type of supporting electrolyte. When the amount of the supporting electrolyte falls within this range, the ion conductivity can be increased. Therefore, the charging property and discharging property of the lithium ion secondary battery can be improved.

As the organic solvent used for the electrolytic solution, an organic solvent in which the supporting electrolyte can be dissolved may be used. Suitable examples of the organic solvent may include carbonate compounds such as dimethyl carbonate (DMC), ethylene carbonate (EC), diethyl carbonate (DEC), propylene carbonate (PC), butylene carbonate (BC), methylethyl carbonate (MEC), and vinylene carbonate (VC); ester compounds such as γ-butyrolactone and methyl formate; ether compounds such as 1,2-dimethoxyethane and tetrahydrofuran; and sulfur-containing compounds such as sulfolane and dimethyl sulfoxide. One type of them may be solely used, and two or more types thereof may also be used in combination at any ratio. Among them, a carbonate compound is preferable since the compound has high permittivity and a stable potential area over a wide range. As the viscosity of the used solvent is lower, the lithium ion conductivity tends to be higher. Therefore, the lithium ion conductivity can be adjusted depending on the type of the solvent.

The electrolytic solution may contain an additive, if necessary. As the additive, one type thereof may be solely used, and two or more types thereof may also be used in combination at any ratio.

In the aforementioned electrolytic solution, a solvent having a desired SP value is preferably used as the solvent for the electrolytic solution since the degrees of swelling of the polymer of the core portion and the polymer of the shell portion of the first particulate polymer are easily controlled. Specifically, the SP value of the solvent for the electrolytic solution is preferably 8 $(cal/cm^3)^{1/2}$ or more, and more preferably 9 $(cal/cm^3)^{1/2}$ or more, and is preferably 15 $(cal/cm^3)^{1/2}$ or less, and more preferably 14 $(cal/cm^3)^{1/2}$ or less. Examples of the solvent having an SP value falling within the aforementioned range may include cyclic ester compounds such as ethylene carbonate and propylene carbonate; and linear ester compounds such as ethyl methyl carbonate and diethyl carbonate.

<5.4. Method for Manufacturing Lithium Ion Secondary Battery>

The method for manufacturing the lithium ion secondary battery according to the present invention is not particularly limited. For example, the aforementioned negative electrode and positive electrode may be stacked via a separator, and the obtained product may be, for example, wound or folded into a battery shape, and placed in a battery container. Then, an electrolytic solution may be injected into the battery container, and the battery container may be sealed. Furthermore, expanded metal; an overcurrent prevention element such as fuse and PTC element; lead wire plates; and the like may be put in the battery container to prevent pressure increase inside the battery and excessive charging and discharging. Examples of the shape of the battery may include a laminate cell type, a coin type, a button type, a sheet type, a cylindrical type, a rectangle type, and a flat type.

EXAMPLES

The present invention will be specifically described hereinbelow with reference to Examples. However, the present invention is not limited to the following Examples, which can be optionally modified without departing from the scope of claims and equivalents thereto.

In the following description, "%" and "parts" both indicating quantity are based on weight, unless otherwise stated. Furthermore, the operations in the following explanation were performed under the condition of normal temperature and normal pressure, unless otherwise stated.

[I. Description of Examples and Comparative Examples of Group 1]

Examples and Comparative Examples of Group 1 will be described hereinbelow. Examples and Comparative Examples of Group 1 are Examples and Comparative Examples about a porous membrane composition not containing non-conductive fibers.

[Evaluation Method in Examples and Comparative Examples of Group 1]

[I-1. Method for Measuring Volume Change of Cell Before and after High-Temperature Cycle Test]

A lithium ion secondary battery of 800-mAh wound-type cell produced in each of Examples and Comparative Examples was allowed to stand for 24 hours in an environment of 25° C. After that, a charging and discharging operation in which the lithium ion secondary battery was charged to 4.35 V at 0.1 C and discharged to 2.75 V at 0.1 C was performed in an environment of 25° C. This wound-type cell was immersed in liquid paraffin, and the volume X0 of the cell was measured.

The charging and discharging operation was repeated for 1,000 cycles in an environment of 60° C. under the same conditions as described above. The wound-type cell after the 1,000 cycle operations was immersed in liquid paraffin, and the volume X1 of the cell was measured.

The volume change ratio ΔX of the cell before and after a high-temperature cycle test in which the charging and discharging were repeated for 1,000 cycles was calculated by ΔX (%)=(X1−X0)/X0×100. Smaller value of this voltage change ratio ΔX of the cell is indicative of better ability of suppressing the generation of gas.

[I-2. Method for Measuring Peel Strength between Separator Substrate and Porous Membrane]

A separator provided with a porous membrane produced in each of Examples I-1 to I-23 and I-25 to I-34 and Comparative Examples I-1 to I-6 was cut into a rectangle having a length of 100 mm and a width of 10 mm as a sample piece. This sample piece was immersed in an electrolytic solvent (solvent: EC/DEC/VC=68.5/30/1.5 (by volume), electrolyte: $LiPF_6$ in a concentration of 1 M) for 3 days. The sample piece was taken out of the electrolytic solution, and the electrolytic solution attached to the surface of the porous membrane was wiped off. A cellophane tape was then attached to the surface of the porous membrane with the surface of the porous membrane on which the electrolytic solution was wiped off facing downward. As the cellophane tape, the one defined by JIS Z1522 was used. The cellophane tape was fixed on a horizontal test board. The stress at which the cellophane tape was peeled by pulling an end of a separator substrate vertically upward at a tensile speed of 50 mm/min was then measured. This measurement was repeated 3 times, and the average value of the stresses was calculated and taken as peel strength P. Larger value of the measured peel strength P is indicative of larger binding force of the separator substrate to the porous membrane. That is, larger value of the measured peel strength P is indicative of larger binding strength.

[I-3. Method for Measuring Peel Strength between Electrode Plate and Porous Membrane]

An electrode produced in Example I-24 was cut into a rectangle having a length of 100 mm and a width of 10 mm as a sample piece. This sample piece was immersed in an electrolytic solvent (solvent: EC/DEC/VC=68.5/30/1.5 (by volume), electrolyte: $LiPF_6$ in a concentration of 1 M) for 3 days. The sample piece was taken out of the electrolytic solution, and the electrolytic solution attached to the surface of the porous membrane was wiped off. A cellophane tape was then attached to the surface of the porous membrane with the surface of the porous membrane on which the electrolytic solution was wiped off facing downward. As the cellophane tape, the one defined by JIS Z1522 was used. The cellophane tape was fixed on a horizontal test board. The stress at which the cellophane tape was peeled by pulling an end of a current collector vertically upward at a tensile speed of 50 mm/min was then measured. This measurement was repeated 3 times, and the average value of the stresses was calculated and taken as peel strength P. Larger value of the measured peel strength P is indicative of larger binding force of the electrode plate to the porous membrane. That is, larger value of the measured peel strength P is indicative of larger binding strength.

[I-4. Method for Evaluating High-Temperature Cycle Property]

The lithium ion secondary battery of 800-mAh wound-type cell produced in each of Examples and Comparative Examples was allowed to stand for 24 hours in an environment of 25° C. After that, a charging and discharging operation in which the lithium ion secondary battery was charged to 4.35 V at 0.1 C and discharged to 2.75 V at 0.1 C was performed in an environment of 25° C., and initial capacity C0 was measured.

Further, the charging and discharging operation was repeated for 1,000 cycles in an environment of 60° C. under the same conditions as described above, and capacity C1 after the 1,000 cycle operations was measured.

The capacity keeping ratio $\Delta C$ was calculated by $\Delta C = C1/C0 \times 100 (\%)$. Higher value of this capacity keeping ratio $\Delta C$ is indicative of better high-temperature cycle property of the lithium ion secondary battery, and longer lifetime of the battery.

[I-5. Method for Evaluating Blocking Resistance]

The separator produced in each of Examples and Comparative Examples was cut into a square having a width of 5 cm and a length of 5 cm and a square having a width of 4 cm and a length of 4 cm as sample pieces. A sample in which the sample pieces were stacked (non-pressed sample) and a sample in which the sample pieces were stacked and pressurized at 40° C. under a pressure of 10 g/cm² (pressed sample) were prepared. The samples were each left for 24 hours. The binding state (blocking state) between the separators in each sample after the leaving for 24 hours was visually observed, and evaluated in accordance with the following criteria.

A: In a pressed sample, blocking of separators does not occur.

B: In a pressed sample, blocking of separators occurs, but the separators are peeled.

C: In a pressed sample, blocking of separators occurs, and the separators are not peeled.

D: In a non-pressed sample, blocking of separators occurs.

[I-6. Method for Evaluating Low-Temperature Output Property]

The 800-mAh wound-type lithium ion secondary battery produced in each of Examples and Comparative Examples was allowed to stand for 24 hours in an environment of 25° C. After that, the battery was charged at a charging rate of 0.1 C in an environment of 25° C. for 5 hours, and voltage V0 after the charging was measured. The battery was then discharged at a discharging rate of 1 C under an environment of −10° C. Fifteen seconds after initiation of discharging, voltage V1 was measured.

The voltage change $\Delta V$ was calculated by $\Delta V = V0 - V1$. Smaller value of the voltage change $\Delta V$ is indicative of better low-temperature output property.

[I-7. Method for Measuring Swelling Degree of Polymer of Core Portion]

An aqueous dispersion liquid containing a polymer constituting a core portion of a first particulate polymer was produced in the same manner as the method for producing an aqueous dispersion liquid containing a polymer constituting a core portion in Examples and Comparative Examples. This aqueous dispersion liquid was placed in a polytetrafluoroethylene dish, and dried under conditions of 25° C. and 48 hours to produce a film with a thickness of 0.5 mm.

This film was cut into a 1-cm square piece to obtain a sample piece. The weight of this sample piece W0 was measured.

The aforementioned sample piece was immersed in an electrolytic solution at 60° C. for 72 hours. The sample piece was then taken out of the electrolytic solution, and the electrolytic solution on the surface of the sample piece was wiped off, and the weight of the sample piece after the immersion test W1 was measured.

The swelling degree S (times) was calculated using the weights W0 and W1 by $S = W1/W0$.

At that time, as the electrolytic solution, a solution in which $LiPF_6$ as a supporting electrolyte was dissolved in a mixed solvent of ethylene carbonate, diethyl carbonate, and vinylene carbonate (volume mixing ratio EC/DEC/VC=68.5/30/1.5; SP value=12.7 $(cal/cm^3)^{1/2}$) at a concentration of 1 mol/L relative to the solvent was used.

[I-8. Method for Measuring Swelling Degree of Polymer of Shell Portion]

An aqueous dispersion liquid containing a particulate polymer including a polymer constituting a shell portion was produced in the same manner as a method for producing an aqueous dispersion liquid containing a first particulate polymer in Examples and Comparative Examples except that the monomer composition used in production of the shell portion was used in place of the monomer composition used in production of the core portion. The swelling degree S of the polymer of the shell portion was measured in the same manner as the method for measuring the swelling degree of the polymer of the core portion except that the aqueous dispersion liquid containing the particulate polymer including the polymer constituting the shell portion was used as an aqueous dispersion liquid for production of the sample piece.

[I-9. Method for Measuring Average Ratio of Outer Surface of Core Portion Covered with Shell Portion in First Particulate Polymer]

The first particulate polymer was sufficiently dispersed in visible light-curable resin ("D-800" available from JEOL Ltd.), and embedded to produce a block piece containing the first particulate polymer. The block piece was then cut into a thin section with a thickness of 100 nm by a microtome equipped with a diamond blade, to produce a sample for measurement. The sample for measurement was then subjected to a dyeing treatment using ruthenium tetroxide.

Subsequently, the dyed sample for measurement was placed on a transmission electron microscope ("JEM-3100F" manufactured by JEOL Ltd.) and the cross-sectional structure of the first particulate polymer was photographed at an accelerating voltage of 80 kV. The magnification of the electron microscope was set to a magnification at which a cross section of one particle of the first particulate polymer was set in a visual field.

In the cross-sectional structure of the photographed first particulate polymer, a length D1 of circumference of the core portion, and a length D2 of a portion where the outer surface of the core portion was into contact with the shell portion were measured. A ratio Rc of the outer surface of the core portion covered with the shell portion in the first particulate polymer was calculated by the following equation (1).

$$\text{Covering ratio } Rc\ (\%) = D2/D1 \times 100 \tag{1}$$

The aforementioned covering ratios Rc of randomly selected 20 particles of the first particulate polymer were measured, and the average thereof was calculated as the average ratio of the outer surface of the core portion covered with the shell portion.

[I-10. Method for Measuring Volume Average Particle Diameter of First Particulate Polymer]

The volume average particle diameter of the first particulate polymer was defined as a particle diameter at which a cumulative volume calculated from a small-diameter side in a particle diameter distribution measured by a laser diffraction particle diameter distribution measurement device ("SALD-3100" manufactured by Shimadzu Corporation) reached 50%.

[I-11. Method for Measuring Core Shell Ratio]

The average thickness of the shell portion of the first particulate polymer was measured by the following procedure.

When the shell portion was composed of polymer particles, the cross-sectional structure of the first particulate polymer was observed by a transmission electron microscope in the same manner as described in the section of the method for measuring the average ratio of the outer surface of the core portion covered with the shell portion. From the observed cross-sectional structure of the first particulate polymer, the longest diameter of the polymer particles constituting the shell portion was measured. The longest diameters of particles of the polymer constituting the shell portion in randomly selected 20 particles of the first particulate polymer were measured by the aforementioned method. The average thereof was taken as the average thickness of the shell portion.

When the shell portion had a shape other than particle shape, the cross-sectional structure of the first particulate polymer was observed by a transmission electron microscope in the same manner as described in the section of the method for measuring the average ratio of the outer surface of the core portion covered with the shell portion. From the observed cross-sectional structure of the first particulate polymer, the maximum thickness of the shell portion was measured. The maximum thicknesses of shell portions in randomly selected 20 particles of the first particulate polymer were measured by the aforementioned method, and the average of the maximum thicknesses was taken as the average thickness of the shell portion.

The core shell ratio was then calculated by dividing the measured average thickness of the shell portion by the volume average particle diameter of the first particulate polymer.

[I-12. Method for Evaluating Deposition of Metal on Negative Electrode]

The lithium ion secondary battery of 800-mAh wound-type cell produced in each of Examples and Comparative Examples was allowed to stand for 24 hours in an environment of 25° C. After that, a charging and discharging operation in which the lithium ion secondary battery was charged to 4.35 V at 0.1 C and discharged to 2.75 V at 0.1 C was performed in an environment of 25° C. The charging and discharging operation was repeated for 1,000 cycles in an environment of 60° C. under the same conditions as described above. Subsequently, the battery was disassembled and the negative electrode was taken out, for evaluating the deposition of metal on the negative electrode.

The deposition of metal on the negative electrode was evaluated on the basis of the ratio of cobalt based on weight in the negative electrode by an ICP optical emission spectrophotometer "SPS3000" (manufactured by SII NanoTechnology Inc.).

Large weight of cobalt in the negative electrode is indicative of occurrence of deposition of metal on the negative electrode.

[I-13. Method for Evaluating Durability of Porous Membrane]

The separator provided with a porous membrane was cut into 5 cm×5 cm to obtain a sample piece of the separator. The weight of this sample piece was measured. The weight M0 of the porous membrane was calculated by subtracting the weight of a separator substrate included in the sample piece from the weight of the sample piece.

Subsequently, the sample piece cut as described above was immersed in a non-aqueous electrolytic solution (solvent: EC/DEC/VC=68.5/30/1.5 (by volume), electrolyte: $LiPF_6$ in a concentration of 1 M) at 60° C., and subjected to ultrasonic vibration of 30 kHz for 10 minutes. The sample piece was then taken out and dried in an atmosphere of 60° C. for 10 hours. After the drying, the weight of the sample piece was measured. The weight M1 of the dried porous membrane was determined by subtracting the weight of the separator substrate included in the sample piece from the weight of the sample piece.

The vibration separation ratio ΔM was calculated by an equation of $\Delta M\ (\%) = ((M0 - M1)/M0) \times 100$, and evaluated as follows. Lower value of the variation separation ratio ΔM is indicative of better durability.

A: Vibration separation ratio ΔM is less than 20%.

B: Vibration separation ratio ΔM is 20% or more and less than 40%.

C: Vibration separation ratio ΔM is 40% or more and less than 60%.

D: Vibration separation ratio ΔM is 60% or more.

[I-14. Method for Measuring Glass Transition Temperature]

10 mg of measurement sample was weighed in an aluminum pan, and a DSC curve thereof was determined by a differential thermal analysis device ("EXSTAR DSC6220" manufactured by SII NanoTechnology Inc.) at a measurement temperature range of −100° C. to 500° C. and a temperature increasing rate of 10° C./min under normal temperature and normal humidity. At this time, an empty aluminum pan was used as a reference. As a glass transition point, the intersection of a baseline immediately before an endothermic peak of the DSC curve in which a differential signal (DDSC) was 0.05 mW/min/mg or more during the temperature increasing process and a tangent line of the DSC curve at an inflection point that firstly appeared after the endothermic peak was determined.

Example I-1

(I-1-1. Production of First Particulate Polymer)

In a 5-MPa pressure-resistant container equipped with a stirrer, 75 parts of methyl methacrylate, 4 parts of methacrylic acid, and 1 part of ethylene dimethacrylate as a monomer composition used in production of a core portion; 1 part of sodium dodecylbenzenesulfonate as an emulsifier; 150 parts of ion-exchanged water; and 0.5 parts of potassium persulfate as a polymerization initiator were charged, and sufficiently stirred. After that, the mixture was heated to 60° C. to initiate polymerization. The polymerization was continued until the polymerization conversion ratio reached 96%. Thus, an aqueous dispersion liquid containing a particulate polymer constituting the core portion was obtained.

Subsequently, this aqueous dispersion liquid was heated to 70° C. 20 parts of styrene as a monomer composition used in production of a shell portion was continuously supplied to the aforementioned aqueous dispersion liquid, and the polymerization was continued. When the polymerization conversion ratio reached 96%, the reaction was stopped by cooling. Thus, an aqueous dispersion liquid containing a first particulate polymer was produced. The volume average particle diameter D50 of the obtained first particulate polymer was 0.45 μm. A cross section of the obtained first particulate polymer was observed, and it was found that the shell portion was composed of particles of the polymer. It was also found that in the shell portion, the particles of the polymer constituting the shell portion were not stacked in a radial direction of the first particulate polymer, and constituted the shell portion in a single layer shape. The number average particle diameter of the particles of the polymer constituting the shell particles was 45 nm. Regarding the obtained first particulate polymer, a core shell ratio and the average ratio of the outer surface of the core portion covered with the shell portion were measured by the aforementioned methods.

(I-1-2. Production of Second Particulate Polymer)

To a reaction vessel equipped with a stirrer, 70 parts of ion-exchanged water, 0.15 parts of sodium laurylsulfate (product name "EMAL 2F" available from Kao Chemicals), and 0.5 parts of ammonium persulfate were each supplied, a gas phase was replaced with nitrogen gas, and the temperature was increased to 60° C.

In another container, 50 parts of ion-exchanged water, 0.5 parts of sodium dodecylbenzenesulfonate as a dispersant, and 93 parts of butyl acrylate, 2 parts of acrylonitrile, 2 parts of methacrylic acid, 1 part of allyl methacrylate, and 2 parts of acrylamide as polymerizable monomers were mixed to obtain a monomer mixture. This monomer mixture was continuously added to the aforementioned reaction vessel over 4 hours, to perform polymerzation. During the addition, the reaction was performed at 60° C. After completion of the addition, the mixture was further stirred at 70° C. for 3 hours, and the reaction was terminated. Thus, an aqueous dispersion liquid containing a second particulate polymer was produced.

The volume average particle diameter D50 of the obtained second particulate polymer was 0.3 μm. The glass transition temperature was −40° C.

(I-1-3. Production of Porous Membrane Composition)

As a water-soluble polymer, carboxymethyl cellulose having a etherification degree of 0.8 to 1.0 (product name "D1200" available from Daicel FineChem Ltd.) was prepared. The viscosity of the aqueous solution of 1% water-soluble polymer was 10 mPa·s to 20 mPa·s.

100 parts in terms of solid content of the aqueous dispersion liquid containing the first particulate polymer and 1.5 parts of the water-soluble polymer were mixed. To the mixture, ion-exchanged water was added so that the solid content concentration was 40% by weight. Then, the first particulate polymer was dispersed. To the mixture, 6 parts in terms of solid content of the aqueous dispersion liquid containing the second particulate polymer and 0.2 parts of a polyethylene glycol-based surfactant (product name "SN WET 366" available from SAN NOPCO Limited) as a leveling agent were added to produce a porous membrane composition in a slurry form.

(I-1-4. Production of Separator)

An organic porous substrate made of polyethylene (thickness: 16 μm, Gurley value: 210 s/100 cc) was prepared as a separator substrate. The aforementioned porous membrane composition was applied onto both faces of the prepared separator substrate, and dried at 50° C. for 1 minute. Thus, a separator having a porous membrane with a thickness of 2 μm per layer on both faces was obtained.

The measurement of peel strength and the evaluation of blocking resistance of this separator were performed by the aforementioned methods.

(I-1-5. Production of Particulate Binder for Negative Electrode)

In a 5-MPa pressure-resistant container equipped with a stirrer, 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of ion-exchanged water, and 0.5 parts of potassium persulfate as a polymerization initiator were charged, sufficiently stirred, and then heated to 50° C. to initiate polymerization. When the polymerization conversion ratio reached 96%, the reaction was stopped by cooling. Thus, a mixture containing a particulate binder (SBR) was obtained. To the aforementioned mixture containing the particulate binder, a 5% sodium hydroxide aqueous solution was added to adjust the pH to 8. After that, unreacted monomers were removed from the aforementioned mixture by distillation under heating and reduced pressure, and the residue was cooled to 30° C. or lower to obtain an aqueous dispersion liquid containing the desired particulate binder.

(I-1-6. Production of Slurry for Negative Electrode)

100 parts of artificial graphite (volume average particle diameter: 15.6 μm) and 1 part in terms of solid content of a 2% aqueous solution of sodium carboxymethyl cellulose salt ("MAC350HC" available from Nippon Paper Industries Co., Ltd.) as a thickener were mixed. To the mixture, ion-exchanged water was further added to adjust the solid content concentration to 68%. The mixture was mixed at 25° C. for 60 minutes. To the thus obtained mixture, ion-exchanged water was added to adjust the solid content concentration to 62%. The mixture was further mixed at 25° C. for 15 minutes. To this mixture, 1.5 parts in terms of solid content of the aforementioned aqueous dispersion liquid containing the particulate binder was added, and ion-exchanged water was further added to adjust the final solid content concentration to 52%. The mixture was further mixed for 10 minutes. This mixture was defoamed under reduced pressure to obtain a slurry for a negative electrode having good fluidity.

(I-1-7. Production of Negative Electrode)

The aforementioned slurry for a negative electrode was applied onto copper foil having a thickness of 20 μm as a current collector by a comma coater so that a film thickness after drying was about 150 μm, and dried. This drying was performed by conveying the copper foil at a speed of 0.5 m/min in an oven at 60° C. over 2 minutes. The copper foil was then heat-treated at 120° C. for 2 minutes to obtain an unpressed raw material for a negative electrode. The unpressed raw material for a negative electrode was rolled by a roll press to obtain a pressed negative electrode having a negative electrode active material layer with a thickness of 80 μm.

(I-1-8. Production of Slurry for Positive Electrode)

100 Parts of $LiCoO_2$ having a volume average particle diameter of 12 μm as a positive electrode active material, 2 parts of acetylene black (product name "HS-100" available from Denki Kagaku Kogyo Kabushiki Kaisha) as a conductive material, and 2 parts in terms of solid content of polyvinylidene fluoride as a binder for a positive electrode (product name "#7208" available from Kureha Corporation) were mixed. To the mixture, N-methylpyrrolidone was added to adjust the total solid content concentration to 70%. The mixture was mixed by a planetary mixer to obtain a slurry for a positive electrode.

(I-1-9. Production of Positive Electrode)

The aforementioned slurry for a positive electrode was applied onto aluminum foil having a thickness of 20 μm as a current collector by a comma coater so that a film thickness after drying was about 150 μm, and dried. This drying was performed by conveying the aluminum foil at a speed of 0.5 m/min in an oven at 60° C. over 2 minutes. The aluminum foil was then heat-treated at 120° C. for 2 minutes to obtain an unpressed raw material for a positive electrode. The unpressed raw material for a positive electrode was rolled by a roll press to obtain a positive electrode.

(I-1-10. Production of Lithium Ion Secondary Battery)

The pressed positive electrode was cut into 49×5 cm². The separator was cut into 55×5.5 cm², and disposed on a positive electrode active material layer of the cut positive electrode. The pressed negative electrode was cut into a rectangle of 50×5.2 cm², and the cut negative electrode was disposed on the aforementioned separator on an opposite side of the positive electrode so that the surface on the negative electrode active material layer side faces to the separator. This stacked body was wound by a winding device to obtain a wound body. This wound body was pressed at 60° C. and 0.5 MPa to form a flat body. This flat body was packaged with an outer package made of an aluminum packing material as an outer package of a battery. An electrolytic solution (solvent: EC/DEC/VC=68.5/30/1.5 (by volume), electrolyte: $LiPF_6$ in a concentration of 1 M) was injected thereinto so as not to include remaining air therein. The aluminum outer package was closed by heat sealing at 150° C. so as to seal an opening of the aluminum packing material. Thus, a 800-mAh wound-type lithium ion secondary battery was produced.

Regarding the thus obtained lithium ion secondary battery, the volume change of cell before and after the high-temperature cycle test, the high-temperature cycle property, the low-temperature output property, and the deposition of metal on the negative electrode were evaluated by the aforementioned methods.

Example I-2

In the monomer composition used in production of the core portion in the aforementioned step (I-1-1), the amount of methyl methacrylate was changed to 75.85 parts and the amount of ethylene dimethacrylate was changed to 0.15 parts.

A lithium ion secondary battery was produced and evaluated in the same manner as in Example I-1 except for the aforementioned matters.

Example I-3

In the monomer composition used in production of the core portion in the aforementioned step (I-1-1), the amount of methyl methacrylate was changed to 71.5 parts and the amount of ethylene dimethacrylate was changed to 4.5 parts.

A lithium ion secondary battery was produced and evaluated in the same manner as in Example I-1 except for the aforementioned matters.

Example I-4

In the monomer composition used in production of the core portion in the aforementioned step (I-1-1), the amount of methyl methacrylate was changed to 75.95 parts and the amount of ethylene dimethacrylate was changed to 0.05 parts.

A lithium ion secondary battery was produced and evaluated in the same manner as in Example I-1 except for the aforementioned matters.

Example I-5

In the monomer composition used in production of the core portion in the aforementioned step (I-1-1), a combination of 55 parts of methyl methacrylate and 20 parts of 2-ethylhexyl acrylate was used in place of 75 parts of methyl methacrylate.

A lithium ion secondary battery was produced and evaluated in the same manner as in Example I-1 except for the aforementioned matters.

Example I-6

In the monomer composition used in production of the core portion in the aforementioned step (I-1-1), 75 parts of acrylonitrile was used in place of 75 parts of methyl methacrylate.

A lithium ion secondary battery was produced and evaluated in the same manner as in Example I-1 except for the aforementioned matter.

Example I-7

In the monomer composition used in production of the core portion in the aforementioned step (I-1-1), a combination of 65 parts of acrylonitrile and 10 parts of 2-ethylhexyl acrylate was used in place of 75 parts of methyl methacrylate.

A lithium ion secondary battery was produced and evaluated in the same manner as in Example I-1 except for the aforementioned matters.

Example I-8

In the monomer composition used in production of the core portion in the aforementioned step (I-1-1), 72 parts of acrylonitrile was used in place of 75 parts of methyl methacrylate and the amount of ethylene dimethacrylate was changed to 4.0 parts.

A lithium ion secondary battery was produced and evaluated in the same manner as in Example I-1 except for the aforementioned matters.

Example I-9

In the monomer composition used in production of the shell portion in the aforementioned step (I-1-1), a combination of 10 parts of styrene and 10 parts of acrylonitrile was used in place of 20 parts of styrene.

A lithium ion secondary battery was produced and evaluated in the same manner as in Example I-1 except for the aforementioned matters.

Example I-10

In the monomer composition used in production of the shell portion in the aforementioned step (I-1-1), a combination of 5 parts of styrene and 15 parts of acrylonitrile was used in place of 20 parts of styrene.

A lithium ion secondary battery was produced and evaluated in the same manner as in Example I-1 except for the aforementioned matters.

Example I-11

In the monomer composition used in production of the shell portion in the aforementioned step (I-1-1), 20 parts of sodium salt of styrenesulfonic acid was used in place of 20 parts of styrene.

A lithium ion secondary battery was produced and evaluated in the same manner as in Example I-1 except for the aforementioned matter.

Example I-12

In the monomer composition used in production of the shell portion in the aforementioned step (I-1-1), a combination of 15 parts of sodium salt of styrenesulfonic acid and 5 parts of acrylonitrile was used in place of 20 parts of styrene.

A lithium ion secondary battery was produced and evaluated in the same manner as in Example I-1 except for the aforementioned matters.

Example I-13

In the monomer composition used in production of the core portion in the aforementioned step (I-1-1), the amount of methyl methacrylate was changed to 72.5 parts and the amount of ethylene dimethacrylate was changed to 3.5 parts.

A lithium ion secondary battery was produced and evaluated in the same manner as in Example I-1 except for the aforementioned matters.

Example I-14

In the monomer composition used in production of the core portion in the aforementioned step (I-1-1), the amount of methyl methacrylate was changed to 90 parts.

Furthermore, in the monomer composition used in production of the shell portion in the aforementioned step (I-1-1), the amount of styrene was changed to 5 parts.

A lithium ion secondary battery was produced and evaluated in the same manner as in Example I-1 except for the aforementioned matters.

Example I-15

In the monomer composition used in production of the core portion in the aforementioned step (I-1-1), the amount of methyl methacrylate was changed to 52.5 parts and the amount of ethylene dimethacrylate was changed to 3.5 parts.

Furthermore, in the monomer composition used in production of the shell portion in the aforementioned step (I-1-1), the amount of styrene was changed to 40 parts.

A lithium ion secondary battery was produced and evaluated in the same manner as in Example I-1 except for the aforementioned matters.

Example I-16

In the aforementioned step (I-1-1), the amount of sodium dodecylbenzenesulfonate as the emulsifier was changed to 2 parts.

A lithium ion secondary battery was produced and evaluated in the same manner as in Example I-1 except for the aforementioned matter.

Example I-17

In the aforementioned step (I-1-1), the amount of sodium dodecylbenzenesulfonate as the emulsifier was changed to 0.5 parts.

A lithium ion secondary battery was produced and evaluated in the same manner as in Example I-1 except for the aforementioned matter.

Example I-18

In the aforementioned step (I-1-2), 2 parts of N-methylolacrylamide was used in place of 2 parts of acrylamide.

A lithium ion secondary battery was produced and evaluated in the same manner as in Example I-1 except for the aforementioned matter.

Example I-19

In the aforementioned step (I-1-2), 2 parts of methacrylamide was used in place of 2 parts of acrylamide.

A lithium ion secondary battery was produced and evaluated in the same manner as in Example I-1 except for the aforementioned matter.

Example I-20

In the aforementioned step (I-1-2), 2 parts of N,N-dimethylaminoethylacrylamide was used in place of 2 parts of acrylamide.

A lithium ion secondary battery was produced and evaluated in the same manner as in Example I-1 except for the aforementioned matter.

Example I-21

In the aforementioned step (I-1-2), 2 parts of N,N-dimethylaminopropylacrylamide was used in place of 2 parts of acrylamide.

A lithium ion secondary battery was produced and evaluated in the same manner as in Example I-1 except for the aforementioned matter.

Example I-22

In the aforementioned step (I-1-2), the amount of butyl acrylate was changed to 94.5 parts and the amount of acrylamide was changed to 0.5 parts.

A lithium ion secondary battery was produced and evaluated in the same manner as in Example I-1 except for the aforementioned matters.

Example I-23

In the aforementioned step (I-1-2), the amount of butyl acrylate was changed to 86.5 parts and the amount of acrylamide was changed to 8.5 parts.
A lithium ion secondary battery was produced and evaluated in the same manner as in Example I-1 except for the aforementioned matters.

Example I-24

An electrode plate having the same configuration as that of the pressed negative electrode produced in the step (I-1-7) in Example I-1 was prepared. The porous membrane composition obtained in the step (I-1-3) in Example I-1 was applied onto a negative electrode active material layer of this electrode plate by a gravure coater so that the application amount after drying was 6 mg/cm$^2$, and dried. This drying was performed by conveying the electrode plate at a speed of 20 m/min in an oven at 100° C. over 1 minute. Thus, a negative electrode having the electrode plate and a porous membrane was obtained.
The peel strength of this negative electrode was measured by the aforementioned method.
A lithium ion secondary battery was produced in the same manner as in the step (I-1-10) in Example I-1 except that an organic porous substrate made of polyethylene without a porous membrane (thickness: 16 μm, Gurley value: 210 s/100 cc) was used as the separator and the negative electrode having the porous membrane produced in Example I-24 was used as the negative electrode.
Regarding the thus obtained lithium ion secondary battery, the volume change of cell before and after the high-temperature cycle test, the high-temperature cycle property, the low-temperature output property, and the deposition of metal on the negative electrode were evaluated by the aforementioned methods.

Example I-25

In the step (I-1-3), a combination of 50 parts in terms of solid content of the aqueous dispersion liquid containing the first particulate polymer and 50 parts of alumina particles (volume average particle diameter: 0.8 μm) was used in place of 100 parts in terms of solid content of the aqueous dispersion liquid containing the first particulate polymer.
A lithium ion secondary battery was produced and evaluated in the same manner as in Example I-1 except for the aforementioned matters.

Example I-26

In the step (I-1-3), a combination of 90 parts in terms of solid content of the aqueous dispersion liquid containing the first particulate polymer and 50 parts of polystyrene particles (volume average particle diameter: 0.5 μm) was used in place of 100 parts in terms of solid content of the aqueous dispersion liquid containing the first particulate polymer.
A lithium ion secondary battery was produced and evaluated in the same manner as in Example I-1 except for the aforementioned matters.

Example I-27

In the monomer composition used in production of the shell portion in the aforementioned step (I-1-1), a combination of 19 parts of styrene and 1 part of methacrylic acid was used in place of 20 parts of styrene.
A lithium ion secondary battery was produced and evaluated in the same manner as in Example I-1 except for the aforementioned matters.

Example I-28

In the aforementioned step (I-1-3), the amount of the polyethylene glycol-based surfactant (product name "SN WET 366" available from SAN NOPCO Limited) as the leveling agent was changed to 0.05 parts.
A lithium ion secondary battery was produced and evaluated in the same manner as in Example I-1 except for the aforementioned matter.

Example I-29

In the aforementioned step (I-1-3), the amount of the polyethylene glycol-based surfactant (product name "SN WET 366" available from SAN NOPCO Limited) as the leveling agent was changed to 1.0 part.
A lithium ion secondary battery was produced and evaluated in the same manner as in Example I-1 except for the aforementioned matter.

Example I-30

In the aforementioned step (I-1-6), a combination of 90 parts of artificial graphite and 10 parts of silicon oxide ("KSC-1064" available from Shin-Etsu Chemical Co., Ltd.) was used in place of 100 parts of artificial graphite.
A lithium ion secondary battery was produced and evaluated in the same manner as in Example I-1 except for the aforementioned matters.

Example I-31

In the aforementioned step (I-1-6), a combination of 70 parts of artificial graphite and 30 parts of silicon oxide ("KSC-1064" available from Shin-Etsu Chemical Co., Ltd.) was used in place of 100 parts of artificial graphite. A lithium ion secondary battery was produced and evaluated in the same manner as in Example I-1 except for the aforementioned matters.

Example I-32

In the monomer composition used in production of the core portion in the aforementioned step (I-1-1), 79 parts of acrylonitrile was used in place of 75 parts of methyl methacrylate and 4 parts of methacrylic acid.
A lithium ion secondary battery was produced and evaluated in the same manner as in Example I-1 except for the aforementioned matters.

Example I-33

In the aforementioned step (I-1-3), a combination of 1 part in terms of solid content of the aqueous dispersion liquid containing the first particulate polymer and 99 parts of alumina particles (volume average particle diameter: 0.8 μm) was used in place of 100 parts in terms of solid content of the aqueous dispersion liquid containing the first particulate polymer.

Furthermore, in Example I-33, the volume change ratio ΔX of the cell was not measured, but the durability of the porous membrane was evaluated.

A lithium ion secondary battery was produced and evaluated in the same manner as in Example I-1 except for the aforementioned matters.

Example I-34

In the aforementioned step (I-1-3), a combination of 10 parts in terms of solid content of the aqueous dispersion liquid containing the first particulate polymer and 90 parts of alumina particles (volume average particle diameter: 0.8 μm) was used in place of 100 parts in terms of solid content of the aqueous dispersion liquid containing the first particulate polymer.

Furthermore, in Example I-34, the volume change ratio ΔX of the cell was not measured, but the durability of the porous membrane was evaluated.

A lithium ion secondary battery was produced and evaluated in the same manner as in Example I-1 except for the aforementioned matters.

Comparative Example I-1

In the aforementioned step (I-1-2), the amount of butyl acrylate was changed to 95 parts and acrylamide was not used.

Furthermore, in the aforementioned step (I-1-3), the aqueous dispersion liquid containing the first particulate polymer was not used, and 100 parts of alumina particles as in Example I-25 was used instead.

A lithium ion secondary battery was produced and evaluated in the same manner as in Example I-1 except for the aforementioned matters.

Comparative Example I-2

In the aforementioned step (I-1-2), the amount of butyl acrylate was changed to 80 parts and the amount of acrylamide was changed to 15 parts.

Furthermore, in the aforementioned step (I-1-3), the aqueous dispersion liquid containing the first particulate polymer was not used, and 100 parts of alumina particles as in Example I-25 was used instead.

A lithium ion secondary battery was produced and evaluated in the same manner as in Example I-1 except for the aforementioned matters.

Comparative Example I-3

In the aforementioned step (I-1-2), the amount of butyl acrylate was changed to 95 parts and acrylamide was not used.

Furthermore, in the aforementioned step (I-1-3), the aqueous dispersion liquid containing the first particulate polymer was not used, and 100 parts of polymethyl methacrylate particles (volume average particle diameter: 0.5 μm, swelling degree: 2.5 times) was used instead.

A lithium ion secondary battery was produced and evaluated in the same manner as in Example I-1 except for the aforementioned matters.

Comparative Example I-4

As the monomer composition used in production of the core portion in the aforementioned step (I-1-1), 60 parts of 2-ethylhexyl acrylate, 15 parts of styrene, and 5 parts of methacrylic acid were used in place of 75 parts of methyl methacrylate, 4 parts of methacrylic acid, and 1 part of ethylene dimethacrylate.

A lithium ion secondary battery was produced and evaluated in the same manner as in Example I-1 except for the aforementioned matters.

Comparative Example I-5

As the monomer composition used in production of the core portion in the aforementioned step (I-1-1), 50 parts of methyl methacrylate, 25 parts of acrylonitrile, and 5 parts of methacrylic acid were used in place of 75 parts of methyl methacrylate, 4 parts of methacrylic acid, and 1 part of ethylene dimethacrylate.

A lithium ion secondary battery was produced and evaluated in the same manner as in Example I-1 except for the aforementioned matters.

Comparative Example I-6

As the monomer composition used in production of the core portion in the aforementioned step (I-1-1), 50 parts of methyl methacrylate, 25 parts of 2-ethylhexyl acrylate, and 5 parts of methacrylic acid were used in place of 75 parts of methyl methacrylate, 4 parts of methacrylic acid, and 1 part of ethylene dimethacrylate.

Furthermore, in the monomer composition used in production of the shell portion in the aforementioned step (I-1-1), 20 parts of acrylonitrile was used in place of 20 parts of styrene.

A lithium ion secondary battery was produced and evaluated in the same manner as in Example I-1 except for the aforementioned matters.

Comparative Example I-7

In a 5-MPa pressure-resistant container equipped with a stirrer, 75 parts of methyl methacrylate, 4 parts of methacrylic acid, and 1 part of ethylene dimethacrylate as a monomer composition; 1 part of sodium dodecylbenzenesulfonate as an emulsifier; 150 parts of ion-exchanged water; and 0.5 parts of potassium persulfate as a polymerization initiator were charged, and sufficiently stirred. After that, the mixture was heated to 60° C. to initiate polymerization. The polymerization was continued until the polymerization conversion ratio reached 96%. Thus, an aqueous dispersion liquid containing a particulate polymer was obtained. The obtained particulate polymer was the same as the particulate polymer constituting the core portion in Example I-1. This particulate polymer is referred to hereinbelow as a core polymer as appropriate. The volume average particle diameter of the particulate core polymer was 0.405 μm.

In another 5-MPa pressure-resistant container equipped with a stirrer, 1 part of sodium dodecylbenzenesulfonate as an emulsifier; 150 parts of ion-exchanged water; and 0.5 parts of potassium persulfate as a polymerization initiator were charged, and sufficiently stirred. The reaction liquid in the pressure-resistant container was heated to 60° C., and 20 parts of styrene was continuously supplied as a monomer composition over 30 minutes, to thereby perform polymerization. The polymerization was continued until the polymerization conversion ratio reached 96%. Thus, an aqueous dispersion liquid containing a particulate polymer was obtained. The obtained particulate polymer was a particulate polymer composed of the same polymer as the polymer of the shell portion in Example I-1. This particulate polymer is referred to hereinbelow as shell polymer as appropriate. The number average particle diameter of the particulate shell polymer was 45 nm.

The total amount of the aqueous dispersion liquid containing the particulate core polymer and the total amount of the aqueous dispersion liquid containing the particulate shell polymer were mixed to obtain a mixed dispersion liquid.

The lithium ion secondary battery was produced and evaluated in the same manner as in Example I-1 except that this mixed dispersion liquid was used in place of the aqueous dispersion liquid containing the first particulate polymer.

[Results]

Results in Examples and Comparative Examples of Group 1 described above are shown in the following Tables. Abbreviations in the following Tables mean as follows. In the following Tables, each value written next to the abbreviation of each monomer in a section of the monomer represents the amount of the monomer by parts by weight.
"EDMA": ethylene dimethacrylate
"MMA": methyl methacrylate
"MAA": methacrylic acid
"2-EHA": 2-ethylhexyl acrylate
"AN": acrylonitrile
"PMMA": polymethyl methacrylate
"Tg": glass transition temperature
"ST": styrene
"NaSS": sodium salt of styrenesulfonic acid
"Core shell ratio": ratio of average thickness of shell portion relative to volume average particle diameter of first particulate polymer
"Average covering ratio": average ratio of outer surface of core portion covered with the shell portion
"BA": butyl acrylate
"AMA": allyl methacrylate
"AAm": acrylamide
"NMA": N-methylolacrylamide
"MAAm": methacrylamide
"DMAEAA": N,N-dimethylaminoethylacrylamide
"DMAPAA": N,N-dimethylaminopropylacrylamide
"CMC": carboxymethyl cellulose
"Sepa": separator substrate
"PST": polystyrene

TABLE 1

Results of Examples I-1 to I-4

|  |  | Ex. I-1 | Ex. I-2 | Ex. I-3 | Ex. I-4 |
|---|---|---|---|---|---|
| Negative electrode active material |  | Graphite | Graphite | Graphite | Graphite |
| First particulate polymer |  |  |  |  |  |
| Cross-linkable monomer | Type | EDMA | EDMA | EDMA | EDMA |
|  | Ratio | 1 wt % | 0.15 wt % | 4.5 wt % | 0.05 wt % |
| Core layer | Swelling degree | 9.6 times | 19.5 times | 5.2 times | 28.5 times |
|  | Monomer | MMA 75 | MMA 75.85 | MMA 71.5 | MMA 75.95 |
|  |  | MAA 4 | MAA 4 | MAA 4 | MAA 4 |
|  |  | EDMA 1 | EDMA 0.15 | EDMA 4.5 | EDMA 0.05 |
|  | Tg | 70° C. | 71° C. | 69° C. | 71° C. |
| Shell layer | Swelling degree | 1.3 times | 1.3 times | 1.3 times | 1.3 times |
|  | Monomer | ST 20 | ST 20 | ST 20 | ST 20 |
|  | Tg | 100° C. | 100° C. | 100° C. | 100° C. |
| Core shell ratio |  | 10% | 10% | 10% | 10% |
| Volume average particle diameter |  | 0.45 μm | 0.45 μm | 0.45 μm | 0.45 μm |
| Average covering ratio |  | 65% | 64% | 64% | 61% |
| Shell portion constitution |  | Fine particles | Fine particles | Fine particles | Fine particles |
| Using amount (parts) |  | 100 | 100 | 100 | 100 |
| Second particulate polymer |  |  |  |  |  |
| Monomer |  | BA 93 | BA 93 | BA 93 | BA 93 |
|  |  | AN 2 | AN 2 | AN 2 | AN 2 |
|  |  | MAA 2 | MAA 2 | MAA 2 | MAA 2 |
|  |  | AMA 1 | AMA 1 | AMA 1 | AMA 1 |
| Amide monomer | Type | AAm | AAm | AAm | AAm |
|  | Ratio | 2% | 2% | 2% | 2% |
| Tg |  | −40° C. | −40° C. | −40° C. | −40° C. |
| Volume average particle diameter |  | 0.3 μm | 0.3 μm | 0.3 μm | 0.3 μm |
| Using amount |  | 6 parts | 6 parts | 6 parts | 6 parts |
| Water-soluble polymer | Type | CMC | CMC | CMC | CMC |
|  | Amount | 1.5 parts | 1.5 parts | 1.5 parts | 1.5 parts |
| Optional particle | Type | — | — | — | — |
|  | Amount |  |  |  |  |
| Surfactant |  | 0.2 part | 0.2 part | 0.2 part | 0.2 part |
| Forming subject |  | Sepa | Sepa | Sepa | Sepa |
| Binding property | P (N/m) | 5.1 | 4.8 | 4.9 | 4.1 |
| Blocking resistance |  | A | A | A | A |
| High-temperature cycle property | ΔC | 83.50% | 83% | 84.50% | 82.00% |
| Cell volume change | ΔX | 25% | 25% | 26% | 25% |
| Low-temperature output property | ΔV (mV) | 390 | 410 | 415 | 455 |

TABLE 1-continued

Results of Examples I-1 to I-4

|  |  | Ex. I-1 | Ex. I-2 | Ex. I-3 | Ex. I-4 |
|---|---|---|---|---|---|
| Deposition of metal on negative electrode | (%) | 0.08 | 0.09 | 0.09 | 0.09 |

TABLE 2

Results of Examples I-5 to I-8

|  |  | Ex. I-5 | Ex. I-6 | Ex. I-7 | Ex. I-8 |
|---|---|---|---|---|---|
| Negative electrode active material |  | Graphite | Graphite | Graphite | Graphite |
| First particulate polymer |  |  |  |  |  |
| Cross-linkable monomer | Type | EDMA | EDMA | EDMA | EDMA |
|  | Ratio | 1 wt % | 1 wt % | 1 wt % | 4.0 wt % |
| Core layer | Swelling degree | 6.5 times | 8.8 times | 7.1 times | 4.4 times |
|  | Monomer | MMA 55<br>2-EHA 20<br>MAA 4<br>EDMA 1 | AN 75<br>MAA 4<br>EDMA 1 | AN 65<br>2-EHA 10<br>MAA 4<br>EDMA 1 | AN 72<br>MAA 4<br>EDMA 4.0 |
|  | Tg | 35° C. | 55° C. | 47° C. | 43° C. |
| Shell layer | Swelling degree | 1.3 times | 1.3 times | 1.3 times | 1.3 times |
|  | Monomer | ST 20 | ST 20 | ST 20 | ST 20 |
|  | Tg | 100° C. | 100° C. | 100° C. | 100° C. |
| Core shell ratio |  | 10% | 10% | 10% | 10% |
| Volume average particle diameter |  | 0.45 μm | 0.45 μm | 0.45 μm | 0.45 μm |
| Average covering ratio |  | 55% | 56% | 58% | 58% |
| Shell portion constitution |  | Fine particles | Fine particles | Fine particles | Fine particles |
| Using amount (parts) |  | 100 | 100 | 100 | 100 |
| Second particulate polymer |  |  |  |  |  |
| Monomer |  | BA 93<br>AN 2<br>MAA 2<br>AMA 1 | BA 93<br>AN 2<br>MAA 2<br>AMA 1 | BA 93<br>AN 2<br>MAA 2<br>AMA 1 | BA 93<br>AN 2<br>MAA 2<br>AMA 1 |
| Amide monomer | Type | AAm | AAm | AAm | AAm |
|  | Ratio | 2% | 2% | 2% | 2% |
| Tg |  | −40° C. | −40° C. | −40° C. | −40° C. |
| Volume average particle diameter |  | 0.3 μm | 0.3 μm | 0.3 μm | 0.3 μm |
| Using amount |  | 6 parts | 6 parts | 6 parts | 6 parts |
| Water-soluble polymer | Type | CMC | CMC | CMC | CMC |
|  | Amount | 1.5 parts | 1.5 parts | 1.5 parts | 1.5 parts |
| Optional particle | Type | — | — | — | — |
|  | Amount |  |  |  |  |
| Surfactant |  | 0.2 part | 0.2 part | 0.2 part | 0.2 part |
| Forming subject |  | Sepa | Sepa | Sepa | Sepa |
| Binding property | P (N/m) | 5.1 | 5.2 | 4.4 | 3.3 |
| Blocking resistance |  | A | A | A | B |
| High-temperature cycle property | ΔC | 81.50% | 82.00% | 82.00% | 81.00% |
| Cell volume change | ΔX | 25% | 25% | 26% | 27% |
| Low-temperature output property | ΔV (mV) | 410 | 390 | 340 | 330 |
| Deposition of metal on negative electrode | (%) | 0.10 | 0.11 | 0.11 | 0.10 |

TABLE 3

Results of Examples I-9 to I-12

| | | Ex. I-9 | Ex. I-10 | Ex. I-11 | Ex. I-12 |
|---|---|---|---|---|---|
| Negative electrode active material | | Graphite | Graphite | Graphite | Graphite |
| First particulate polymer | | | | | |
| Cross-linkable monomer | Type | EDMA | EDMA | EDMA | EDMA |
| | Ratio | 1 wt % | 1 wt % | 1 wt % | 1 wt % |
| Core layer | Swelling degree | 9.6 times | 9.6 times | 9.6 times | 9.6 times |
| | Monomer | MMA 75 MAA 4 EDMA 1 | MMA 75 MAA 4 EDMA 1 | MMA 75 MAA 4 EDMA 1 | MMA 75 MAA 4 EDMA 1 |
| | Tg | 70° C. | 70° C. | 70° C. | 70° C. |
| Shell layer | Swelling degree | 2.7 times | 3.5 times | 1.7 times | 2.1 times |
| | Monomer | ST 10 AN 10 | ST 5 AN 15 | NaSS 20 | NaSS 15 AN 5 |
| | Tg | 101° C. | 102° C. | 80° C. | 82° C. |
| Core shell ratio | | 10% | 10% | 10% | 10% |
| Volume average particle diameter | | 0.45 μm | 0.45 μm | 0.45 μm | 0.45 μm |
| Average covering ratio | | 61% | 60% | 35% | 42% |
| Shell portion constitution | | Fine particles | Fine particles | Fine particles | Fine particles |
| Using amount (parts) | | 100 | 100 | 100 | 100 |
| Second particulate polymer | | | | | |
| Monomer | | BA 93 AN 2 MAA 2 AMA 1 | BA 93 AN 2 MAA 2 AMA 1 | BA 93 AN 2 MAA 2 AMA 1 | BA 93 AN 2 MAA 2 AMA 1 |
| Amide monomer | Type | AAm | AAm | AAm | AAm |
| | Ratio | 2% | 2% | 2% | 2% |
| Tg | | −40° C. | −40° C. | −40° C. | −40° C. |
| Volume average particle diameter | | 0.3 μm | 0.3 μm | 0.3 μm | 0.3 μm |
| Using amount | | 6 parts | 6 parts | 6 parts | 6 parts |
| Water-soluble polymer | Type | CMC | CMC | CMC | CMC |
| | Amount | 1.5 parts | 1.5 parts | 1.5 parts | 1.5 parts |
| Optional particle | Type | — | — | — | — |
| | Amount | | | | |
| Surfactant | | 0.2 part | 0.2 part | 0.2 part | 0.2 part |
| Forming subject | | Sepa | Sepa | Sepa | Sepa |
| Binding property | P (N/m) | 6.3 | 5.5 | 4.1 | 3.7 |
| Blocking resistance | | A | A | B | B |
| High-temperature cycle property | ΔC | 84.5% | 83.20% | 82% | 81% |
| Cell volume change | ΔX | 26% | 27% | 25% | 26% |
| Low-temperature output property | ΔV (mV) | 420 | 430 | 410 | 410 |
| Deposition of metal on negative electrode | (%) | 0.11 | 0.12 | 0.12 | 0.11 |

TABLE 4

Results of Examples I-13 to I-16

| | | Ex. I-13 | Ex. I-14 | Ex. I-15 | Ex. I-16 |
|---|---|---|---|---|---|
| Negative electrode active material | | Graphite | Graphite | Graphite | Graphite |
| First particulate polymer | | | | | |
| Cross-linkable monomer | Type | EDMA | EDMA | EDMA | EDMA |
| | Ratio | 3.5 wt % | 1 wt % | 3.5 wt % | 1 wt % |
| Core layer | Swelling degree | 6.5 times | 13.5 times | 4.1 times | 9.6 times |
| | Monomer | MMA 72.5 MAA 4 EDMA 3.5 | MMA 90 MAA 4 EDMA 1 | MMA 52.5 MAA 4 EDMA 3.5 | MMA 75 MAA 4 EDMA 1 |
| | Tg | 68° C. | 78° C. | 53° C. | 70° C. |
| Shell layer | Swelling degree | 1.3 times | 1.3 times | 1.3 times | 1.3 times |
| | Monomer | ST 20 | ST 5 | ST 40 | ST 20 |
| | Tg | 100° C. | 100° C. | 100° C. | 100° C. |
| Core shell ratio | | 10% | 1.50% | 28% | 26% |

TABLE 4-continued

Results of Examples I-13 to I-16

|  |  | Ex. I-13 | Ex. I-14 | Ex. I-15 | Ex. I-16 |
|---|---|---|---|---|---|
| Volume average particle diameter |  | 0.45 μm | 0.45 μm | 0.45 μm | 0.05 μm |
| Average covering ratio |  | 61% | 25% | 87% | 78% |
| Shell portion constitution |  | Fine particles | Fine particles | Fine particles | Fine particles |
| Using amount (parts) |  | 100 | 100 | 100 | 100 |
| Second particulate polymer |  |  |  |  |  |
| Monomer |  | BA 93 AN 2 MAA 2 AMA 1 | BA 93 AN 2 MAA 2 AMA 1 | BA 93 AN 2 MAA 2 AMA 1 | BA 93 AN 2 MAA 2 AMA 1 |
| Amide monomer | Type | AAm | AAm | AAm | AAm |
|  | Ratio | 2% | 2% | 2% | 2% |
| Tg |  | −40° C. | −40° C. | −40° C. | −40° C. |
| Volume average particle diameter |  | 0.3 μm | 0.3 μm | 0.3 μm | 0.3 μm |
| Using amount |  | 6 parts | 6 parts | 6 parts | 6 parts |
| Water-soluble polymer | Type | CMC | CMC | CMC | CMC |
|  | Amount | 1.5 parts | 1.5 parts | 1.5 parts | 1.5 parts |
| Optional particle | Type | — | — | — | — |
|  | Amount |  |  |  |  |
| Surfactant |  | 0.2 part | 0.2 part | 0.2 part | 0.2 part |
| Forming subject |  | Sepa | Sepa | Sepa | Sepa |
| Binding property | P (N/m) | 6.3 | 3.8 | 8.5 | 5.5 |
| Blocking resistance |  | B | A | A | B |
| High-temperature cycle property | ΔC | 80% | 83.2% | 83% | 83.20% |
| Cell volume change | ΔX | 27% | 23% | 24% | 26% |
| Low-temperature output property | ΔV (mV) | 360 | 390 | 410 | 410 |
| Deposition of metal on negative electrode | (%) | 0.11 | 0.11 | 0.09 | 0.12 |

TABLE 5

Results of Examples I-17 to I-20

|  |  | Ex. I-17 | Ex. I-18 | Ex. I-19 | Ex. I-20 |
|---|---|---|---|---|---|
| Negative electrode active material |  | Graphite | Graphite | Graphite | Graphite |
| First particulate polymer |  |  |  |  |  |
| Cross-linkable monomer | Type | EDMA | EDMA | EDMA | EDMA |
|  | Ratio | 1 wt % | 1 wt % | 1 wt % | 1 wt % |
| Core layer | Swelling degree | 9.6 times | 9.6 times | 9.6 times | 9.6 times |
|  | Monomer | MMA 75 MAA 4 EDMA 1 | MMA 75 MAA 4 EDMA 1 | MMA 75 MAA 4 EDMA 1 | MMA 75 MAA 4 EDMA 1 |
|  | Tg | 70° C. | 70° C. | 70° C. | 70° C. |
| Shell layer | Swelling degree | 1.3 times | 1.3 times | 1.3 times | 1.3 times |
|  | Monomer | ST 20 | ST 20 | ST 20 | ST 20 |
|  | Tg | 100° C. | 100° C. | 100° C. | 100° C. |
| Core shell ratio |  | 2% | 10% | 10% | 10% |
| Volume average particle diameter |  | 0.85 μm | 0.45 μm | 0.45 μm | 0.45 μm |
| Average covering ratio |  | 21% | 65% | 65% | 65% |
| Shell portion constitution |  | Fine particles | Fine particles | Fine particles | Fine particles |
| Using amount (parts) |  | 100 | 100 | 100 | 100 |
| Second particulate polymer |  |  |  |  |  |
| Monomer |  | BA 93 AN 2 MAA 2 AMA 1 | BA 93 AN 2 MAA 2 AMA 1 | BA 93 AN 2 MAA 2 AMA 1 | BA 93 AN 2 MAA 2 AMA 1 |
| Amide monomer | Type | AAm | NMA | MAAm | DMAEAA |
|  | Ratio | 2% | 2% | 2% | 2% |
| Tg |  | −40° C. | −35° C. | −30° C. | −28° C. |
| Volume average particle diameter |  | 0.3 μm | 0.3 μm | 0.3 μm | 0.3 μm |
| Using amount |  | 6 parts | 6 parts | 6 parts | 6 parts |
| Water-soluble | Type | CMC | CMC | CMC | CMC |

TABLE 5-continued

Results of Examples I-17 to I-20

|  |  | Ex. I-17 | Ex. I-18 | Ex. I-19 | Ex. I-20 |
| --- | --- | --- | --- | --- | --- |
| polymer | Amount | 1.5 parts | 1.5 parts | 1.5 parts | 1.5 parts |
| Optional particle | Type | — | — | — | — |
|  | Amount |  |  |  |  |
| Surfactant |  | 0.2 part | 0.2 part | 0.2 part | 0.2 part |
| Forming subject |  | Sepa | Sepa | Sepa | Sepa |
| Binding property | P (N/m) | 3.5 | 4.4 | 4.5 | 5.3 |
| Blocking resistance |  | B | A | A | A |
| High-temperature cycle property | $\Delta C$ | 81.50% | 82.50% | 82.20% | 82.80% |
| Cell volume change | $\Delta X$ | 28% | 28% | 27% | 28% |
| Low-temperature output property | $\Delta V$ (mV) | 420 | 410 | 410 | 400 |
| Deposition of metal on negative electrode | (%) | 0.13 | 0.10 | 0.11 | 0.12 |

TABLE 6

Results of Examples I-21 to I-24

|  |  | Ex. I-21 | Ex. I-22 | Ex. I-23 | Ex. I-24 |
| --- | --- | --- | --- | --- | --- |
| Negative electrode active material |  | Graphite | Graphite | Graphite | Graphite |
| First particulate polymer |  |  |  |  |  |
| Cross-linkable monomer | Type | EDMA | EDMA | EDMA | EDMA |
|  | Ratio | 1 wt % | 1 wt % | 1 wt % | 1 wt % |
| Core layer | Swelling degree | 9.6 times | 9.6 times | 9.6 times | 9.6 times |
|  | Monomer | MMA 75 MAA 4 EDMA 1 | MMA 75 MAA 4 EDMA 1 | MMA 75 MAA 4 EDMA 1 | MMA 75 MAA 4 EDMA 1 |
|  | Tg | 70° C. | 70° C. | 70° C. | 70° C. |
| Shell layer | Swelling degree | 1.3 times | 1.3 times | 1.3 times | 1.3 times |
|  | Monomer | ST 20 | ST 20 | ST 20 | ST 20 |
|  | Tg | 100° C. | 100° C. | 100° C. | 100° C. |
| Core shell ratio |  | 10% | 10% | 10% | 10% |
| Volume average particle diameter |  | 0.45 μm | 0.45 μm | 0.45 μm | 0.45 μm |
| Average covering ratio |  | 65% | 65% | 65% | 65% |
| Shell portion constitution |  | Fine particles | Fine particles | Fine particles | Fine particles |
| Using amount (parts) |  | 100 | 100 | 100 | 100 |
| Second particulate polymer |  |  |  |  |  |
| Monomer |  | BA 93 AN 2 MAA 2 AMA 1 | BA 94.5 AN 2 MAA 2 AMA 1 | BA 86.5 AN 2 MAA 2 AMA 1 | BA 93 AN 2 MAA 2 AMA 1 |
| Amide monomer | Type | DMAPAA | AAm | AAm | AAm |
|  | Ratio | 2% | 0.5% | 8.5% | 2% |
| Tg |  | −24° C. | −43° C. | −33° C. | −40° C. |
| Volume average particle diameter |  | 0.3 μm | 0.3 μm | 0.3 μm | 0.3 μm |
| Using amount |  | 6 parts | 6 parts | 6 parts | 6 parts |
| Water-soluble polymer | Type | CMC | CMC | CMC | CMC |
|  | Amount | 1.5 parts | 1.5 parts | 1.5 parts | 1.5 parts |
| Optional particle | Type | — | — | — | — |
|  | Amount |  |  |  |  |
| Surfactant |  | 0.2 part | 0.2 part | 0.2 part | 0.2 part |
| Forming subject |  | Sepa | Sepa | Sepa | Electrode plate |
| Binding property | P (N/m) | 5.1 | 5.2 | 5.7 | 6.5 |
| Blocking resistance |  | A | A | A | — |
| High-temperature cycle property | $\Delta C$ | 82.80% | 82.50% | 83.60% | 84.50% |
| Cell volume change | $\Delta X$ | 27% | 27% | 20% | 23% |
| Low-temperature output property | $\Delta V$ (mV) | 405 | 415 | 380 | 400 |
| Deposition of metal on negative electrode | (%) | 0.11 | 0.12 | 0.07 | 0.11 |

TABLE 7

Results of Examples I-25 to I-28

|  |  | Ex. I-25 | Ex. I-26 | Ex. I-27 | Ex. I-28 |
|---|---|---|---|---|---|
| Negative electrode active material |  | Graphite | Graphite | Graphite | Graphite |
| First particulate polymer |  |  |  |  |  |
| Cross-linkable monomer | Type | EDMA | EDMA | EDMA | EDMA |
|  | Ratio | 1 wt % | 1 wt % | 1 wt % | 1 wt % |
| Core layer | Swelling degree | 9.6 times | 9.6 times | 9.6 times | 9.6 times |
|  | Monomer | MMA 75 MAA 4 EDMA 1 | MMA 75 MAA 4 EDMA 1 | MMA 75 MAA 4 EDMA 1 | MMA 75 MAA 4 EDMA 1 |
|  | Tg | 70° C. | 70° C. | 70° C. | 70° C. |
| Shell layer | Swelling degree | 1.3 times | 1.3 times | 1.3 times | 1.3 times |
|  | Monomer | ST 20 | ST 20 | ST 19 MAA 1 | ST 20 |
|  | Tg | 100° C. | 100° C. | 100° C. | 100° C. |
| Core shell ratio |  | 10% | 10% | 10% | 10% |
| Volume average particle diameter |  | 0.45 μm | 0.45 μm | 0.45 μm | 0.45 μm |
| Average covering ratio |  | 65% | 65% | 64% | 65% |
| Shell portion constitution |  | Fine particles | Fine particles | Fine particles | Fine particles |
| Using amount (parts) |  | 50 | 90 | 100 | 100 |
| Second particulate polymer |  |  |  |  |  |
| Monomer |  | BA 93 AN 2 MAA 2 AMA 1 | BA 93 AN 2 MAA 2 AMA 1 | BA 93 AN 2 MAA 2 AMA 1 | BA 93 AN 2 MAA 2 AMA 1 |
| Amide monomer | Type | AAm | AAm | AAm | AAm |
|  | Ratio | 2% | 2% | 2% | 2% |
| Tg |  | −40° C. | −40° C. | −40° C. | −40° C. |
| Volume average particle diameter |  | 0.3 μm | 0.3 μm | 0.3 μm | 0.3 μm |
| Using amount |  | 6 parts | 6 parts | 6 parts | 6 parts |
| Water-soluble polymer | Type | CMC | CMC | CMC | CMC |
|  | Amount | 1.5 parts | 1.5 parts | 1.5 parts | 1.5 parts |
| Optional particle | Type | Al$_2$O$_3$ | PST | — | — |
|  | Amount | 50 parts | 50 parts |  |  |
| Surfactant |  | 0.2 part | 0.2 part | 0.2 part | 0.05 part |
| Forming subject |  | Sepa | Sepa | Sepa | Sepa |
| Binding property | P (N/m) | 3.5 | 4.2 | 5.2 | 4.5 |
| Blocking resistance |  | A | A | A | A |
| High-temperature cycle property | ΔC | 81.50% | 82.50% | 83.0% | 82.0% |
| Cell volume change | ΔX | 32% | 30% | 26% | 26% |
| Low-temperature output property | ΔV (mV) | 520 | 500 | 395 | 420 |
| Deposition of metal on negative electrode | (%) | 0.13 | 0.14 | 0.10 | 0.10 |

TABLE 8

Results of Examples I-29 to I-32

|  |  | Ex. I-29 | Ex. I-30 | Ex. I-31 | Ex. I-32 |
|---|---|---|---|---|---|
| Negative electrode active material |  | Graphite | Graphite/SiOx = 90/10 | Graphite/SiOx = 70/30 | Graphite |
| First particulate polymer |  |  |  |  |  |
| Cross-linkable monomer | Type | EDMA | EDMA | EDMA | EDMA |
|  | Ratio | 1 wt % | 1 wt % | 1 wt % | 1 wt % |
| Core layer | Swelling degree | 9.6 times | 9.6 times | 9.6 times | 10.5 times |
|  | Monomer | MMA 75 MAA 4 EDMA 1 | MMA 75 MAA 4 EDMA 1 | MMA 75 MAA 4 EDMA 1 | AN 79 EDMA 1 |
|  | Tg | 70° C. | 70° C. | 70° C. | 103° C. |
| Shell layer | Swelling degree | 1.3 times | 1.3 times | 1.3 times | 1.3 times |
|  | Monomer | ST 20 | ST 20 | ST 20 | ST 20 |
|  | Tg | 100° C. | 100° C. | 100° C. | 100° C. |

TABLE 8-continued

Results of Examples I-29 to I-32

|  |  | Ex. I-29 | Ex. I-30 | Ex. I-31 | Ex. I-32 |
| --- | --- | --- | --- | --- | --- |
| Core shell ratio |  | 10% | 10% | 10% | 10% |
| Volume average particle diameter |  | 0.45 μm | 0.45 μm | 0.45 μm | 0.45 μm |
| Average covering ratio |  | 65% | 65% | 65% | 58% |
| Shell portion constitution |  | Fine particles | Fine particles | Fine particles | Fine particles |
| Using amount (parts) |  | 100 | 100 | 100 | 100 |
| Second particulate polymer |  |  |  |  |  |
| Monomer |  | BA 93 | BA 93 | BA 93 | BA 93 |
|  |  | AN 2 | AN 2 | AN 2 | AN 2 |
|  |  | MAA 2 | MAA 2 | MAA 2 | MAA 2 |
|  |  | AMA 1 | AMA 1 | AMA 1 | AMA 1 |
| Amide monomer | Type | AAm | AAm | AAm | AAm |
|  | Ratio | 2% | 2% | 2% | 2% |
| Tg |  | −40° C. | −40° C. | −40° C. | −40° C. |
| Volume average particle diameter |  | 0.3 μm | 0.3 μm | 0.3 μm | 0.3 μm |
| Using amount |  | 6 parts | 6 parts | 6 parts | 6 parts |
| Water-soluble polymer | Type | CMC | CMC | CMC | CMC |
|  | Amount | 1.5 parts | 1.5 parts | 1.5 parts | 1.5 parts |
| Optional particle | Type | — | — | — | — |
|  | Amount |  |  |  |  |
| Surfactant |  | 1.0 part | 0.2 part | 0.2 part | 0.2 part |
| Forming subject |  | Sepa | Sepa | Sepa | Sepa |
| Binding property | P (N/m) | 4.3 | 4.3 | 4.0 | 4.3 |
| Blocking resistance |  | A | A | A | A |
| High-temperature cycle property | ΔC | 81.0% | 80.0% | 75.0% | 81.5% |
| Cell volume change | ΔX | 26% | 27% | 29% | 27% |
| Low-temperature output property | ΔV (mV) | 360 | 360 | 350 | 420 |
| Deposition of metal on negative electrode | (%) | 0.12 | 0.10 | 0.13 | 0.12 |

TABLE 9

Results of Examples I-33 and I-34

|  |  | Ex. I-33 | Ex. I-34 |
| --- | --- | --- | --- |
| Negative electrode active material |  | Graphite | Graphite |
| First particulate polymer |  |  |  |
| Cross-linkable monomer | Type | EDMA | EDMA |
|  | Ratio | 1 wt % | 1 wt % |
| Core layer | Swelling degree | 9.6 times | 9.6 times |
|  | Monomer | MMA 75 | MMA 75 |
|  |  | MAA 4 | MAA 4 |
|  |  | EDMA 1 | EDMA 1 |
|  | Tg | 70° C. | 70° C. |
| Shell layer | Swelling degree | 1.3 times | 1.3 times |
|  | Monomer | ST 20 | ST 20 |
|  | Tg | 100° C. | 100° C. |
| Core shell ratio |  | 10% | 10% |
| Volume average particle diameter |  | 0.45 μm | 0.45 μm |
| Average covering ratio |  | 65% | 65% |
| Shell portion constitution |  | Fine particles | Fine particles |
| Using amount (parts) |  | 1 | 10 |
| Second particulate polymer |  |  |  |
| Monomer |  | BA 93 | BA 93 |
|  |  | AN 2 | AN 2 |
|  |  | MAA 2 | MAA 2 |
|  |  | AMA 1 | AMA 1 |
| Amide monomer | Type | AAm | AAm |
|  | Ratio | 2% | 2% |
| Tg |  | −40° C. | −40° C. |
| Volume average particle diameter |  | 0.3 μm | 0.3 μm |
| Using amount |  | 6 parts | 6 parts |
| Water-soluble polymer | Type | CMC | CMC |
|  | Amount | 1.5 parts | 1.5 parts |
| Optional particle | Type | Al$_2$O$_3$ | Al$_2$O$_3$ |
|  | Amount | 99 | 90 |
| Surfactant |  | 0.2 part | 0.2 part |
| Forming subject |  | Sepa | Sepa |
| Binding property | P (N/m) | 3.0 | 3.5 |
| Blocking resistance |  | A | A |
| High-temperature cycle property | ΔC | 81% | 81% |
| Low-temperature output property | ΔV (mV) | 450 | 460 |
| Deposition of metal on negative electrode | (%) | 0.14 | 0.14 |
| Porous membrane durability |  | A | A |

TABLE 10

Results of Comparative Examples I-1 to I-4

| | | Comp. Ex. I-1 | Comp. Ex. I-2 | Comp. Ex. I-3 | Comp. Ex. I-4 |
|---|---|---|---|---|---|
| Negative electrode active material | | Graphite | Graphite | Graphite | Graphite |
| First particulate polymer | | | | | |
| Cross-linkable monomer | Type | None | None | PMMA | — |
| | Ratio | | | Swelling degree 25 times | — |
| Core layer | Swelling degree | | | | 3.8 times |
| | Monomer | | | | 2-EHA 60 ST 15 MAA 5 |
| | Tg | | | | −25° C. |
| Shell layer | Swelling degree | | | | 1.3 times |
| | Monomer | | | | ST 20 |
| | Tg | | | | 100° C. |
| Core shell ratio | | | | | 10% |
| Volume average particle diameter | | | | 0.5 μm | 0.45 μm |
| Average covering ratio | | | | — | 55% |
| Shell portion constitution | | | | — | Fine particles |
| Using amount (parts) | | | | 100 | 100 |
| Second particulate polymer | | | | | |
| Monomer | | BA 95 AN 2 MAA 2 AMA 1 | BA 80 AN 2 MAA 2 AMA 1 | BA 95 AN 2 MAA 2 AMA 1 | BA 93 AN 2 MAA 2 AMA 1 |
| Amide monomer | Type | — | AAm | — | AAm |
| | Ratio | — | 15% | — | 2% |
| Tg | | −45° C. | −13° C. | −45° C. | −40° C. |
| Volume average particle diameter | | 0.3 μm | 0.3 μm | 0.3 μm | 0.3 μm |
| Using amount | | 6 parts | 6 parts | 6 parts | 6 parts |
| Water-soluble polymer | Type | CMC | CMC | CMC | CMC |
| | Amount | 1.5 parts | 1.5 parts | 1.5 parts | 1.5 parts |
| Optional particle | Type | Al₂O₃ | Al₂O₃ | — | — |
| | Amount | 100 parts | 100 parts | | |
| Surfactant | | 0.2 part | 0.2 part | 0.2 part | 0.2 part |
| Forming subject | | Sepa | Sepa | Sepa | Sepa |
| Binding property | P (N/m) | 0.1 | 0.1 | 0.3 | 0.7 |
| Blocking resistance | | C | C | C | C |
| High-temperature cycle property | ΔC | 75.20% | 77.50% | 75.80% | 71.80% |
| Cell volume change | ΔX | 47% | 42% | 49% | 52% |
| Low-temperature output property | ΔV (mV) | 780 | 730 | 890 | 760 |
| Deposition of metal on negative electrode | (%) | 0.35 | 0.38 | 0.47 | 0.44 |

TABLE 11

Results of Comparative Examples I-5 to I-7

| | | Comp. Ex. I-5 | Comp. Ex. I-6 | Comp. Ex. I-7 |
|---|---|---|---|---|
| Negative electrode active material | | Graphite | Graphite | Graphite |
| First particulate polymer | | | | |
| Cross-linkable monomer | Type | — | — | EDMA |
| | Ratio | — | — | 1 wt % |
| Core layer | Swelling degree | 32 times | 10.5 times | 9.6 times |
| | Monomer | MMA 50 AN 25 MAA 5 | MMA 50 2-EHA 25 MAA 5 | MMA 75 MAA 4 EDMA 1 |
| | Tg | 70° C. | 20° C. | 70° C. |
| Shell layer | Swelling degree | 1.3 times | 4.5 times | 1.3 times |
| | Monomer | ST 20 | AN 20 | ST 20 |
| | Tg | 100° C. | 100° C. | 100° C. |
| Core shell ratio | | 10% | 10% | — |
| Volume average particle diameter | | 0.45 μm | 0.45 μm | — |
| Average covering ratio | | 52% | 45% | 2% |
| Shell portion constitution | | Fine particles | Fine particles | — |
| Using amount (parts) | | 100 | 100 | 100 |
| Second particulate polymer | | | | |
| Monomer | | BA 93 AN 2 MAA 2 AMA 1 | BA 93 AN 2 MAA 2 AMA 1 | BA 93 AN 2 MAA 2 AMA 1 |
| Amide monomer | Type | AAm | AAm | AAm |
| | Ratio | 2% | 2% | 2% |
| Tg | | −40° C. | −40° C. | −40° C. |

TABLE 11-continued

Results of Comparative Examples I-5 to I-7

|  |  | Comp. Ex. I-5 | Comp. Ex. I-6 | Comp. Ex. I-7 |
|---|---|---|---|---|
| Volume average particle diameter |  | 0.3 μm | 0.3 μm | 0.3 μm |
| Using amount |  | 6 parts | 6 parts | 6 parts |
| Water-soluble polymer | Type | CMC | CMC | CMC |
|  | Amount | 1.5 parts | 1.5 parts | 1.5 parts |
| Optional particle | Type | — | — | — |
|  | Amount |  |  |  |
| Surfactant |  | 0.2 part | 0.2 part | 0.2 part |
| Forming subject |  | Sepa | Sepa | Sepa |
| Binding property | P (N/m) | 0.7 | 0.3 | 0.1 |
| Blocking resistance |  | C | C | C |
| High-temperature cycle property | ΔC | 72% | 73% | 72.5% |
| Cell volume change | ΔX | 48% | 48% | 48% |
| Low-temperature output property | ΔV (mV) | 710 | 680 | 660 |
| Deposition of metal on negative electrode | (%) | 0.41 | 0.53 | 0.55 |

[Discussion]

In Examples of Group 1, it was confirmed that the porous membrane swelled in the electrolytic solution was tightly bound to the separator substrate or the electrode plate. Therefore, it was confirmed that the porous membrane produced using the porous membrane composition according to the present invention had high binding property to the separator substrate and the electrode plate in the electrolytic solution.

In Examples of Group 1, voltage changes ΔV lower than those in Comparative Examples of Group 1 were obtained. Accordingly, it was confirmed that the lithium ion secondary battery according to the present invention had excellent low-temperature output property.

As clear from the results of Examples and Comparative Examples of Group 1 described above, it was confirmed that the blocking resistance of the porous membrane according to the present invention was excellent, the generation of gas by charging and discharging of the lithium ion secondary battery of the present invention was decreased, and the lithium ion secondary battery of the present invention had excellent high-temperature cycle property.

In particular, from the results of Examples I-33 and I-34, it was confirmed that the separation of the porous membrane in the electrolytic solution was favorably suppressed and the lithium ion secondary battery of the present invention had excellent safety.

[III. Description of Examples and Comparative Examples of Group 2]

Examples and Comparative Examples of Group 2 will be described hereinbelow. Examples and Comparative Examples of Group 2 are Examples and Comparative Examples about a porous membrane composition containing non-conductive fibers.

[Evaluation Method in Examples and Comparative Examples of Group 2]

[II-1. Method for Measuring Peel Strength Between Separator Substrate and Porous Membrane]

A 800-mAh wound-type lithium ion secondary battery produced in each of Examples II-1 to II-18 and Comparative Examples II-1 to II-5 was allowed to stand for 24 hours in an environment of 25° C. After that, a charging and discharging operation in which the lithium ion secondary battery was charged to 4.35 V at 0.1 C and discharged to 2.75 V at 0.1 C was performed in an environment of 25° C. The charging and discharging operation was then repeated for 1,000 cycles in an environment of 60° C. under the same conditions as described above. The battery after the 1,000 cycle operations was disassembled, and the separator provided with a porous membrane was taken out. The electrolytic solution attached to the surface of the taken separator was wiped off. The separator was then cut into a rectangle having a length of 100 mm and a width of 10 mm to obtain a sample piece. A cellophane tape was attached to the surface of the porous membrane with the surface of the porous membrane of this sample piece facing downward. As the cellophane tape, the one defined by JIS Z1522 was used. The cellophane tape was fixed on a horizontal test board. The stress at which the cellophane tape was peeled by pulling an end of a separator substrate vertically upward at a tensile speed of 50 mm/min was then measured. This measurement was repeated 3 times, and the average value of the stresses was calculated and taken as peel strength P. Larger value of the measured peel strength P is indicative of larger binding force of the separator substrate to the porous membrane. That is, larger value of the measured peel strength P is indicative of larger binding strength.

[II-2. Method for Measuring Peel Strength Between Electrode Plate and Porous Membrane]

A 800-mAh wound-type lithium ion secondary battery produced in Example II-19 was allowed to stand for 24 hours in an environment of 25° C. After that, a charging and discharging operation in which the lithium ion secondary battery was charged to 4.35 V at 0.1 C and discharged to 2.75 V at 0.1 C was performed in an environment of 25° C. The charging and discharging operation was then repeated for 1,000 cycles in an environment of 60° C. under the same conditions as described above. The battery after the 1,000 cycle operations was disassembled, and the negative electrode provided with a porous membrane was taken out. The electrolytic solution attached to the surface of the taken negative electrode was wiped off. The negative electrode was then cut into a rectangle having a length of 100 mm and a width of 10 mm to obtain a sample piece. A cellophane tape was attached to the surface of the porous membrane with the surface of the porous membrane of this sample piece facing downward. As the cellophane tape, the one defined by JIS Z1522 was used. The cellophane tape was fixed on a horizontal test board. The stress at which the cellophane tape was peeled by pulling an end of a current collector vertically upward at a tensile speed of 50 mm/min was then measured. The measurement was repeated 3 times, and the average value of the stresses was calculated and taken as peel strength P. Larger value of the measured peel strength P is indicative of larger binding force of the electrode plate to the porous membrane. That is, larger value of the measured peel strength is indicative of larger binding strength.

[II-3. Method for Evaluating High-Temperature Cycle Property]

The capacity keeping ratio ΔC was measured by the same method as described in the section of [I-4. Method for Evaluating High-Temperature Cycle Property] regarding Examples and Comparative Examples of Group 1. Higher value of this capacity keeping ratio ΔC is indicative of better high-temperature cycle property of the lithium ion secondary battery, and longer lifetime of the battery.

[II-4. Method for Measuring Cell Swelling Ratio]

The volume change ratio ΔX of a cell was measured by the same method as described in the section of [I-1. Method for Measuring Volume Change of Cell before and after High-Temperature Cycle Test] regarding Examples and Comparative Examples of Group 1. Smaller value of this volume change ratio ΔV of the cell is indicative of lower tendency of swelling of the porous membrane in the battery, and lower tendency of occurrence of a gap between the electrode and the separator.

[II-5. Method for Measuring Amount of Deposited Lithium Metal]

The wound-type lithium ion secondary battery produced in each of Examples and Comparative Examples was allowed to stand for 24 hours in an environment of 25° C. After that, an operation in which the lithium ion secondary battery was charged to 4.35 V at a charging rate of 1 C was performed in an environment of −10° C. The negative electrode was then taken out at room temperature in an argon environment. The taken negative electrode was observed, and an area S ($cm^2$) where lithium metal was deposited was measured. The measured area was evaluated in accordance with the following evaluation criteria. Smaller area of the lithium metal deposition is indicative of smaller amount of the lithium metal deposited by charging and discharging. This shows that the negative electrode is capable of smoothly accepting lithium ions in the electrolytic solution. That is, smaller area of the lithium metal deposition is indicative of better low-temperature acceptance property.

(Evaluation Criteria of Amount of Deposited Lithium Metal)

A: $0 \leq S < 1$ ($cm^2$)
B: 1 ($cm^2$)$\leq S < 5$ ($cm^2$)
C: 5 ($cm^2$)$\leq S < 10$ ($cm^2$)
D: 10 ($cm^2$)$\leq S < 15$ ($cm^2$)
E: 15 ($cm^2$)$\leq S < 20$ ($cm^2$)
F: 20 ($cm^2$)$\leq S \leq 25$ ($cm^2$)

[II-6. Method for Evaluating Low-Temperature Output Property]

The voltage change ΔV was measured by the same method as described in the section of [I-6. Method for Evaluating Low-Temperature Output Property] regarding Examples and Comparative Examples of Group 1. Smaller value of this voltage change ΔV is indicative of better low-temperature property.

[II-7. Method for Evaluating Blocking Resistance]

The separator produced in each of Examples II-1 to II-18 and Comparative Examples II-1 to II-5 was cut into a square having a width of 5 cm and a length of 5 cm and a square having a width of 4 cm and a length of 4 cm as sample pieces. A sample in which the sample pieces were stacked (non-pressed sample) and a sample in which the sample pieces were stacked and pressurized at 40° C. under a pressure of 10 g/$cm^2$ (pressed sample) were prepared. The samples were each left for 24 hours. The binding state (blocking state) between the separators in each sample after the leaving for 24 hours was visually observed, and evaluated in accordance with the following criteria.

Further the negative electrode produced in Example II-19 was cut into a square having a width of 5 cm and a length of 5 cm and a square having a width of 4 cm and a length of 4 cm as sample pieces. A sample in which the sample pieces were stacked so that the porous membranes were opposed (non-pressed sample) and a sample in which the sample pieces were stacked and pressurized at 40° C. and 10 g/$cm^2$ (pressed sample) were prepared. The samples were each left for 24 hours. The binding state (blocking state) between the negative electrodes in each sample after the leaving for 24 hours was visually observed, and evaluated in accordance with the following criteria.

(Evaluation Criteria of Blocking State)

A: In a pressed sample, blocking of separators or negative electrodes does not occur.
B: In a pressed sample, blocking of separators or negative electrodes occurs, but the separators or the negative electrodes are peeled.
C: In a pressed sample, blocking of separators or negative electrodes occurs, and the separators or the negative electrodes are not peeled.
D: In a non-pressed sample, blocking of separators or negative electrodes occurs.

[II-8. Method for Measuring Swelling Degree of Polymer of Core Portion]

The swelling degree S (times) of a polymer of a core portion was measured by the same method as described in the section of [I-7. Method for Measuring Swelling Degree of Polymer of Core portion] regarding Examples and Comparative Examples of Group 1.

[II-9. Method for Measuring Swelling Degree of Polymer of Shell Portion]

The swelling degree S of a polymer of a shell portion was measured by the same method as described in the section of [I-8. Method for Measuring Swelling Degree of Polymer of Shell portion] regarding Examples and Comparative Examples of Group 1.

[II-10. Method for Measuring Average Ratio of Outer Surface of Core Portion Covered with Shell Portion]

The average ratio of outer surface of the core portion covered with the shell portion was measured by the same method as described in the section of [I-9. Method for Measuring Average Ratio of Outer Surface of Core Portion Covered with Shell Portion of First Particulate Polymer] regarding Examples and Comparative Examples of Group 1.

[II-11. Method for Measuring Volume Average Particle Diameter of Particles]

The particle diameter distribution of sample particles was measured by a laser diffraction particle diameter distribution measurement device ("SALD-3100" manufactured by Shimadzu Corporation). A particle diameter at which a cumulative volume calculated from a small-diameter side in the measured particle diameter distribution reaches 50% was determined as the volume average particle diameter.

[II-12. Method for Measuring Core Shell Ratio]

The core shell ratio was measured by the same method as described in the section of [I-11. Method for Measuring Core Shell Ratio] regarding Examples and Comparative Examples of Group 1.

Example II-1

(II-1-1. Production of First Particulate Polymer)

In a 5-MPa pressure-resistant container equipped with a stirrer, 75 parts of methyl methacrylate, 4 parts of methacrylic acid, and 1 part of ethylene dimethacrylate as a monomer composition used in production of a core portion; 1 part of sodium dodecylbenzenesulfonate as an emulsifier; 150 parts of ion-exchanged water; and 0.5 parts of potassium persulfate as a polymerization initiator were charged, and sufficiently stirred. After that, the mixture was heated to 60° C. to initiate polymerization. The polymerization was continued until the polymerization conversion ratio reached 96%. Thus, an aqueous dispersion liquid containing a particulate polymer constituting the core portion was obtained.

Subsequently, 20 parts of styrene as a monomer composition used in production of a shell portion was continuously supplied to this aqueous dispersion liquid over 30 minutes, and the polymerization was continued by heating at 70° C.

When the polymerization conversion ratio reached 96%, the reaction was stopped by cooling. Thus, an aqueous dispersion liquid containing a first particulate polymer was produced. The volume average particle diameter D50 of the obtained first particulate polymer was 0.45 µm. Regarding the obtained particulate polymer, a core shell ratio and the average ratio of the outer surface of the core portion covered with the shell portion were measured by the aforementioned methods.

(II-1-2. Production of Second Particulate) Polymer

To a reaction vessel equipped with a stirrer, 70 parts of ion-exchanged water, 0.15 parts of sodium laurylsulfate (product name "EMAL 2F" available from Kao Chemicals), and 0.5 parts of ammonium persulfate were each supplied, a gas phase was replaced with nitrogen gas, and the temperature was increased to 60° C.

In another container, 50 parts of ion-exchanged water, 0.5 parts of sodium dodecylbenzenesulfonate as a dispersant, and 93 parts of butyl acrylate, 2 parts of acrylonitrile, 2 parts of methacrylic acid, 1 part of N-methylolacrylamide, and 2 parts of acrylamide as polymerizable monomers were mixed to obtain a monomer mixture. This monomer mixture was continuously added to the aforementioned reaction vessel over 4 hours, to perform polymerzation. During the addition, the reaction was performed at 60° C. After completion of the addition, the mixture was further stirred at 70° C. for 3 hours, and the reaction was terminated. Thus, an aqueous dispersion liquid containing a second particulate polymer formed from a (meth)acrylic polymer was produced.

The volume average particle diameter D50 of the obtained second particulate polymer was 0.36 µm. The glass transition temperature was −45° C.

(II-1-3. Production of Porous Membrane Composition)

As a water-soluble polymer, carboxymethyl cellulose having a etherification degree of 0.8 to 1.0 (product name "D1200" available from Daicel FineChem Ltd.) was prepared. The viscosity of the aqueous solution of 1% water-soluble polymer was 10 mPa·s to 20 mPa·s.

5 parts by weight of cellulose fibers ("CELISH KY-100G" available from Daicel Corporation, fiber diameter: 0.07 µm) as non-conductive fibers, 95 parts by weight in terms of solid content of the aforementioned aqueous dispersion liquid containing the first particulate polymer, and 1 part of the water-soluble polymer were mixed. To the mixture, ion-exchanged water was added to adjust the solid content concentration to 40% by weight, and the mixture was stirred. To the mixture, 6 parts in terms of solid content of the aforementioned aqueous dispersion liquid containing the second particulate polymer and 0.2 parts of a polyethylene glycol-based surfactant (product name "SN WET 366" available from SAN NOPCO Limited) were added to produce a porous membrane composition in a slurry form.

(II-1-4. Production of Separator)

A porous substrate made of polyethylene (thickness: 16 µm, Gurley value: 210 s/100 cc) was prepared as a separator substrate. The aforementioned porous membrane composition was applied onto both faces of the prepared separator substrate, and dried at 50° C. for 3 minutes. Thus, a separator having a porous membrane with a thickness of 3 µm per layer on both faces was obtained.

The blocking resistance of this separator was evaluated by the aforementioned method.

(II-1-5. Production of Particulate Binder for Negative Electrode)

An aqueous dispersion liquid containing a desired particulate binder was produced in the same manner as in the step (I-1-5) in Example I-1.

(II-1-6. Production of Slurry for Negative Electrode)

A slurry for a negative electrode having good fluidity was produced in the same manner as in the step (I-1-6) in Example I-1.

(II-1-7. Production of Negative Electrode)

A negative electrode was produced in the same manner as in the step (I-1-7) in Example I-1.

(II-1-8. Production of Slurry for Positive Electrode)

A slurry for a positive electrode was produced in the same manner as in the step (I-1-8) in Example I-1.

(II-1-9. Production of Positive Electrode)

A positive electrode was produced in the same manner as in the step (I-1-9) in Example I-1.

(II-1-10. Production of Lithium Ion Secondary Battery)

The wound-type lithium ion secondary battery was produced in the same manner as in the step (I-1-10) in Example I-1.

Regarding the thus obtained lithium ion secondary battery, the peel strength, the high-temperature cycle property, the cell swelling ratio, the amount of deposited lithium metal, and the low-temperature output property were evaluated by the aforementioned methods.

Example II-2

In the monomer composition used in production of the core portion in the aforementioned step (II-1-1), the amount of methyl methacrylate was changed to 75.85 parts and the amount of ethylene dimethacrylate was changed to 0.15 parts.

A lithium ion secondary battery was produced and evaluated in the same manner as in Example II-1 except for the aforementioned matters.

Example II-3

In the monomer composition used in production of the core portion in the aforementioned step (II-1-1), the amount of methyl methacrylate was changed to 71.5 parts and the amount of ethylene dimethacrylate was changed to 4.5 parts.

A lithium ion secondary battery was produced and evaluated in the same manner as in Example II-1 except for the aforementioned matters.

Example II-4

In the monomer composition used in production of the core portion in the aforementioned step (II-1-1), the amount of methyl methacrylate was changed to 75.95 parts and the amount of ethylene dimethacrylate was changed to 0.05 parts.

A lithium ion secondary battery was produced and evaluated in the same manner as in Example II-1 except for the aforementioned matters.

Example II-5

In the monomer composition used in production of the core portion in the aforementioned step (II-1-1), a combination of 55 parts of methyl methacrylate and 20 parts of 2-ethylhexyl acrylate was used in place of 75 parts of methyl methacrylate.

A lithium ion secondary battery was produced and evaluated in the same manner as in Example II-1 except for the aforementioned matters.

Example II-6

In the monomer composition used in production of the core portion in the aforementioned step (II-1-1), acrylonitrile was used in place of methyl methacrylate.

A lithium ion secondary battery was produced and evaluated in the same manner as in Example II-1 except for the aforementioned matter.

Example II-7

In the monomer composition used in production of the core portion in the aforementioned step (II-1-1), a combination of 65 parts of acrylonitrile and 10 parts of 2-ethylhexyl acrylate was used in place of 75 parts of methyl methacrylate.

A lithium ion secondary battery was produced and evaluated in the same manner as in Example II-1 except for the aforementioned matters.

Example II-8

In the monomer composition used in production of the core portion in the aforementioned step (II-1-1), 72 parts of acrylonitrile was used in place of 75 parts of methyl methacrylate and the amount of ethylene dimethacrylate was changed to 4.0 parts.

A lithium ion secondary battery was produced and evaluated in the same manner as in Example II-1 except for the aforementioned matters.

Example II-9

In the monomer composition used in production of the shell portion in the aforementioned step (II-1-1), a combination of 10 parts of styrene and 10 parts of acrylonitrile was used in place of 20 parts of styrene.

A lithium ion secondary battery was produced and evaluated in the same manner as in Example II-1 except for the aforementioned matters.

Example II-10

In the monomer composition used in production of the shell portion in the aforementioned step (II-1-1), a combination of 5 parts of styrene and 15 parts of acrylonitrile was used in place of 20 parts of styrene.

A lithium ion secondary battery was produced and evaluated in the same manner as in Example II-1 except for the aforementioned matters.

Example II-11

In the monomer composition used in production of the shell portion in the aforementioned step (II-1-1), sodium salt of styrenesulfonic acid was used in place of styrene.

A lithium ion secondary battery was produced and evaluated in the same manner as in Example II-1 except for the aforementioned matter.

Example II-12

In the monomer composition used in production of the shell portion in the aforementioned step (II-1-1), a combination of 15 parts of sodium salt of styrenesulfonic acid and 5 parts of acrylonitrile was used in place of 20 parts of styrene.

A lithium ion secondary battery was produced and evaluated in the same manner as in Example II-1 except for the aforementioned matters.

Example II-13

In the monomer composition used in production of the core portion in the aforementioned step (II-1-1), the amount of methyl methacrylate was changed to 72.5 parts and ethylene dimethacrylate was not used.

Furthermore, in the monomer composition used in production of the shell portion in the aforementioned step (II-1-1), 3.5 parts of ethylene dimethacrylate was used in addition to 20 parts of styrene.

A lithium ion secondary battery was produced and evaluated in the same manner as in Example II-1 except for the aforementioned matters.

Example II-14

In the monomer composition used in production of the core portion in the aforementioned step (II-1-1), the amount of methyl methacrylate was changed to 90 parts.

Furthermore, in the monomer composition used in production of the shell portion in the aforementioned step (II-1-1), the amount of styrene was changed to 5 parts.

A lithium ion secondary battery was produced and evaluated in the same manner as in Example II-1 except for the aforementioned matters.

Example II-15

In the monomer composition used in production of the core portion in the aforementioned step (II-1-1), the amount of methyl methacrylate was changed to 52.5 parts and the amount of ethylene dimethacrylate was changed to 3.5 parts.

Furthermore, in the monomer composition used in production of the shell portion in the aforementioned step (II-1-1), the amount of styrene was changed to 40 parts. A lithium ion secondary battery was produced and evaluated in the same manner as in Example II-1 except for the aforementioned matters.

Example II-16

In the aforementioned step (II-1-3), cellulose fibers ("BiNFIs-cellulose" available from Sugino Machine Limited, fiber diameter: 0.02 µm) was used in place of "CELISH KY-100G" available from Daicel Corporation as the nonconductive fibers.

A lithium ion secondary battery was produced and evaluated in the same manner as in Example II-1 except for the aforementioned matter.

Example II-17

In the aforementioned step (II-1-3), the amount of the cellulose fibers was changed to 0.5 parts, and the amount of the aqueous dispersion liquid containing the first particulate polymer was changed to 99.5 parts by weight in terms of solid content.

A lithium ion secondary battery was produced and evaluated in the same manner as in Example II-1 except for the aforementioned matters.

Example II-18

In the aforementioned step (II-1-3), the amount of the cellulose fibers was changed to 45 parts, and the amount of the aqueous dispersion liquid containing the first particulate polymer was changed to 55 parts by weight in terms of solid content.

A lithium ion secondary battery was produced and evaluated in the same manner as in Example II-1 except for the aforementioned matters.

Example II-19

An electrode plate having the same configuration as that of the pressed negative electrode obtained in the step (II-1-7) in Example II-1 was prepared. The porous membrane composition obtained in the step (II-1-3) in Example II-1 was applied onto both faces of this electrode plate by a gravure coater so that the application amount after drying was 6 mg/cm², and dried. This drying was performed by conveying the electrode plate at a speed of 20 m/min in an oven at 100° C. over 1 minute. Thus, a negative electrode having a porous membrane, a current collector, a negative electrode active material layer, and a porous membrane in this order was obtained.

The blocking resistance of this negative electrode was evaluated by the aforementioned method.

In the aforementioned step (II-1-10), a porous substrate made of polyethylene (thickness: 16 μm, Gurley value: 210 s/100 cc) without a porous membrane was used as the separator.

Furthermore, in the aforementioned step (II-1-10), the negative electrode having a porous membrane produced in Example II-19 was used as the negative electrode.

A lithium ion secondary battery was produced and evaluated in the same manner as in Example II-1 except for the aforementioned matters.

Comparative Example II-1

In the aforementioned step (II-1-3), 95 parts of polystyrene particles (volume average particle diameter: 0.5 μm) was used in place of the aqueous dispersion liquid containing the first particulate polymer.

A lithium ion secondary battery was produced and evaluated in the same manner as in Example II-1 except for the aforementioned matter.

Comparative Example II-2

In a 5-MPa pressure-resistant container equipped with a stirrer, 70 parts of methyl methacrylate, 25 parts of acrylonitrile, and 5 part of methacrylic acid as a monomer composition; 1 part of sodium dodecylbenzenesulfonate as an emulsifier; 150 parts of ion-exchanged water; and 0.5 parts of potassium persulfate as a polymerization initiator were charged, and sufficiently stirred. After that, the mixture was heated to 60° C. to initiate polymerization. The polymerization was continued until the polymerization conversion ratio reached 96%. Thus, an aqueous dispersion liquid containing a particulate polymer having no core-shell structure was obtained.

In the aforementioned step (II-1-3), the aqueous dispersion liquid containing a particulate polymer having no core-shell structure produced in Comparative Example II-2 was used in place of the aqueous dispersion liquid containing the first particulate polymer.

A lithium ion secondary battery was produced and evaluated in the same manner as in Example II-1 except for the aforementioned matter.

Comparative Example II-3

In the monomer composition used in production of the core portion in the aforementioned step (II-1-1), 60 parts of 2-ethylhexyl acrylate, 15 parts of styrene, and 5 parts of methacrylic acid were used in place of 75 parts of methyl methacrylate, 4 parts of methacrylic acid, and 1 part of ethylene dimethacrylate.

A lithium ion secondary battery was produced and evaluated in the same manner as in Example II-1 except for the aforementioned matters.

Comparative Example II-4

In the monomer composition used in production of the core portion in the aforementioned step (II-1-1), 50 parts of methyl methacrylate, 25 parts of acrylonitrile, and 5 parts of methacrylic acid were used in place of 75 parts of methyl methacrylate, 4 parts of methacrylic acid, and 1 part of ethylene dimethacrylate.

A lithium ion secondary battery was produced and evaluated in the same manner as in Example II-1 except for the aforementioned matters.

Comparative Example II-5

In the monomer composition used in production of the core portion in the aforementioned step (II-1-1), 50 parts of methyl methacrylate, 25 parts of 2-ethylhexyl acrylate, and 5 parts of methacrylic acid were used in place of 75 parts of methyl methacrylate, 4 parts of methacrylic acid, and 1 part of ethylene dimethacrylate.

Furthermore, in the monomer composition used in production of the shell portion in the aforementioned step (II-1-1), acrylonitrile was used in place of styrene.

A lithium ion secondary battery was produced and evaluated in the same manner as in Example II-1 except for the aforementioned matters.

[Results]

Results in Examples and Comparative Examples of Group 2 described above are shown in the following Tables. Abbreviations in the following Tables mean as follows. In the following Tables, each value written next to the abbreviation of each monomer in a section of the monomer represents the amount of the monomer by parts by weight.

"EDMA": ethylene dimethacrylate
"MMA": methyl methacrylate
"MAA": methacrylic acid
"2-EHA": 2-ethylhexyl acrylate
"AN": acrylonitrile
"ST": styrene
"PST": polystyrene
"Tg": glass transition temperature
"NaSS": sodium salt of styrenesulfonic acid
"Core shell ratio": ratio of average thickness of shell portion relative to volume average particle diameter of first particulate polymer
"Covering ratio": average ratio of outer surface of core portion covered with the shell portion
"D50": volume average particle diameter
"KY-100G": cellulose fibers ("CELISH KY-100G" available from Daicel Corporation)
"BiNFIs": cellulose fibers ("BiNFIs-cellulose" available from Sugino Machine Limited)
"Particles:fibers": weight ratio of first particulate polymer and non-conductive fibers
"CMC-Na": sodium salt of carboxymethylcellulose
"Sepa": separator substrate

TABLE 12

Results of Examples II-1 to II-5

| | | Ex. II-1 | Ex. II-2 | Ex. II-3 | Ex. II-4 | Ex. II-5 |
|---|---|---|---|---|---|---|
| First particulate polymer | | | | | | |
| Cross-linkable monomer | Type | EDMA | EDMA | EDMA | EDMA | EDMA |
| | Amount | 1 wt % | 0.15 wt % | 4.5 wt % | 0.05 wt % | 1 wt % |
| Core portion | Swelling degree | 9.6 times | 19.5 times | 5.2 times | 28.5 times | 6.5 times |
| | Monomer | MMA 75 MAA 4 EDMA 1 | MMA 75.85 MAA 4 EDMA 0.15 | MMA 71.5 MAA 4 EDMA 4.5 | MMA 75.95 MAA 4 EDMA 0.05 | MMA 55 2-EHA 20 MAA 4 EDMA 1 |
| | Tg | 70° C. | 71° C. | 69° C. | 71° C. | 35° C. |
| Shell portion | Swelling degree | 1.3 times | 1.3 times | 1.3 times | 1.3 times | 1.3 times |
| | Monomer | ST 20 | ST 20 | ST 20 | ST 20 | ST 20 |
| | Tg | 100° C. | 100° C. | 100° C. | 100° C. | 100° C. |
| Core shell ratio | | 10% | 10% | 10% | 10% | 10% |
| Covering ratio | | 65% | 64% | 64% | 61% | 55% |
| D50 | | 0.45 μm | 0.45 μm | 0.45 μm | 0.45 μm | 0.45 μm |
| Non-conductive fiber | Type | KY-100G | KY-100G | KY-100G | KY-100G | KY-100G |
| | Fiber diameter | 0.07 μm | 0.07 μm | 0.07 μm | 0.07 μm | 0.07 μm |
| Particles:fibers | | 95:5 | 95:5 | 95:5 | 95:5 | 95:5 |
| Water-soluble polymer | Type | CMC-Na | CMC-Na | CMC-Na | CMC-Na | CMC-Na |
| | amount | 1 part | 1 part | 1 part | 1 part | 1 part |
| Applying subject | | Sepa | Sepa | Sepa | Sepa | Sepa |
| Peel strength | P (N/m) | 45.6 | 48.5 | 44 | 41 | 42 |
| Blocking resistance | | A | A | A | A | A |
| Low-temperature output property | ΔV (mV) | 175 | 180 | 180 | 185 | 175 |
| Li deposition amount | | A | A | A | A | A |
| Cell volume swell | ΔX | 25% | 27% | 26% | 26% | 27% |
| Cycle property | ΔC | 87.50% | 86.50% | 86% | 86% | 85% |

TABLE 13

Results of Examples II-6 to II-10

| | | Ex. II-6 | Ex. II-7 | Ex. II-8 | Ex. II-9 | Ex. II-10 |
|---|---|---|---|---|---|---|
| First particulate polymer | | | | | | |
| Cross-linkable monomer | Type | EDMA | EDMA | EDMA | EDMA | EDMA |
| | Amount | 1 wt % | 1 wt % | 4.0 wt % | 1 wt % | 1 wt % |
| Core portion | Swelling degree | 8.8 times | 7.1 times | 4.4 times | 9.6 times | 9.6 times |
| | Monomer | AN 75 MAA 4 EDMA 1 | AN 65 2-EHA 10 MAA 4 EDMA 1 | AN 72 MAA 4 EDMA 4.0 | MMA 75 MAA 4 EDMA 1 | MMA 75 MAA 4 EDMA 1 |
| | Tg | 55° C. | 47° C. | 43° C. | 70° C. | 70° C. |
| Shell portion | Swelling degree | 1.3 times | 1.3 times | 1.3 times | 2.7 times | 3.5 times |
| | Monomer | ST 20 | ST 20 | ST 20 | ST 10 AN 10 | ST 5 AN 15 |
| | Tg | 100° C. | 100° C. | 100° C. | 101° C. | 102° C. |
| Core shell ratio | | 10% | 10% | 10% | 10% | 10% |
| Covering ratio | | 56% | 58% | 58% | 61% | 60% |
| D50 | | 0.45 μm | 0.45 μm | 0.45 μm | 0.45 μm | 0.45 μm |
| Non-conductive fiber | Type | KY-100G | KY-100G | KY-100G | KY-100G | KY-100G |
| | Fiber diameter | 0.07 μm | 0.07 μm | 0.07 μm | 0.07 μm | 0.07 μm |
| Particles:fibers | | 95:5 | 95:5 | 95:5 | 95:5 | 95:5 |
| Water-soluble polymer | Type | CMC-Na | CMC-Na | CMC-Na | CMC-Na | CMC-Na |
| | amount | 1 part | 1 part | 1 part | 1 part | 1 part |
| Applying subject | | Sepa | Sepa | Sepa | Sepa | Sepa |
| Peel strength | P (N/m) | 44 | 42 | 41 | 38 | 38 |
| Blocking resistance | | A | A | A | A | A |
| Low-temperature output property | ΔV (mV) | 180 | 180 | 185 | 175 | 180 |

TABLE 13-continued

Results of Examples II-6 to II-10

|  | Ex. II-6 | Ex. II-7 | Ex. II-8 | Ex. II-9 | Ex. II-10 |
| --- | --- | --- | --- | --- | --- |
| Li deposition amount | A | A | A | A | A |
| Cell volume swell ΔX | 27% | 26% | 26% | 26% | 25% |
| Cycle property   ΔC | 85% | 84.50% | 84% | 86% | 86% |

TABLE 14

Results of Examples II-11 to II-15

|  |  | Ex. II-11 | Ex. II-12 | Ex. II-13 | Ex. II-14 | Ex. II-15 |
| --- | --- | --- | --- | --- | --- | --- |
| First particulate polymer |  |  |  |  |  |  |
| Cross-linkable monomer | Type | EDMA | EDMA | EDMA | EDMA | EDMA |
|  | Amount | 1 wt % | 1 wt % | 3.5 wt % | 1 wt % | 3.5 wt % |
| Core portion | Swelling degree | 9.6 times | 9.6 times | 27.5 times | 13.5 times | 4.1 times |
|  | Monomer | MMA 75 MAA 4 EDMA 1 | MMA 75 MAA 4 EDMA 1 | MMA 72.5 MAA 4 | MMA 90 MAA 4 EDMA 1 | MMA 52.5 MAA 4 EDMA 3.5 |
|  | Tg | 70° C. | 70° C. | 68° C. | 78° C. | 53° C. |
| Shell portion | Swelling degree | 1.7 times | 2.1 times | 1.2 times | 1.3 times | 1.3 times |
|  | Monomer | NaSS 20 | NaSS 15 AN 5 | ST 20 EDMA 3.5 | ST 5 | ST 40 |
|  | Tg | 80° C. | 82° C. | 103° C. | 100° C. | 100° C. |
| Core shell ratio |  | 10% | 10% | 10% | 1.50% | 28% |
| Covering ratio |  | 35% | 42% | 61% | 25.00% | 87% |
| D50 |  | 0.45 μm | 0.45 μm | 0.45 μm | 0.45 μm | 0.45 μm |
| Non-conductive fiber | Type | KY-100G | KY-100G | KY-100G | KY-100G | KY-100G |
|  | Fiber diameter | 0.07 μm | 0.07 μm | 0.07 μm | 0.07 μm | 0.07 μm |
| Particles:fibers |  | 95:5 | 95:5 | 95:5 | 95:5 | 95:5 |
| Water-soluble polymer | Type | CMC-Na | CMC-Na | CMC-Na | CMC-Na | CMC-Na |
|  | amount | 1 part | 1 part | 1 part | 1 part | 1 part |
| Applying subject |  | Sepa | Sepa | Sepa | Sepa | Sepa |
| Peel strength | P (N/m) | 37 | 37 | 39 | 35 | 49 |
| Blocking resistance |  | A | A | A | A | A |
| Low-temperature output property | ΔV (mV) | 175 | 175 | 180 | 175 | 195 |
| Li deposition amount |  | A | A | A | A | A |
| Cell volume swell ΔX |  | 25% | 26% | 25% | 26% | 26% |
| Cycle property   ΔC |  | 86.50% | 85.50% | 85% | 84% | 83% |

TABLE 15

Results of Examples II-16 to II-19

|  |  | Ex. II-16 | Ex. II-17 | Ex. II-18 | Ex. II-19 |
| --- | --- | --- | --- | --- | --- |
| First particulate polymer |  |  |  |  |  |
| Cross-linkable monomer | Type | EDMA | EDMA | EDMA | EDMA |
|  | Amount | 1 wt % | 1 wt % | 1 wt % | 1 wt % |
| Core portion | Swelling degree | 9.6 times | 9.6 times | 9.6 times | 9.6 times |
|  | Monomer | MMA 75 MAA 4 EDMA 1 | MMA 75 MAA 4 EDMA 1 | MMA 75 MAA 4 EDMA 1 | MMA 75 MAA 4 EDMA 1 |
|  | Tg | 70° C. | 70° C. | 70° C. | 70° C. |
| Shell portion | Swelling degree | 1.3 times | 1.3 times | 1.3 times | 1.3 times |
|  | Monomer | ST 20 | ST 20 | ST 20 | ST 20 |
|  | Tg | 100° C. | 100° C. | 100° C. | 100° C. |
| Core shell ratio |  | 10% | 10% | 10% | 10% |
| Covering ratio |  | 65% | 65% | 65% | 65% |
| D50 |  | 0.45 μm | 0.45 μm | 0.45 μm | 0.45 μm |
| Non-conductive | Type | BiNFIs | KY-100G | KY-100G | KY-100G |

TABLE 15-continued

Results of Examples II-16 to II-19

|  |  | Ex. II-16 | Ex. II-17 | Ex. II-18 | Ex. II-19 |
|---|---|---|---|---|---|
| fiber | Fiber diameter | 0.02 μm | 0.07 μm | 0.07 μm | 0.07 μm |
| Particles:fibers |  | 95:5 | 99.5:0.5 | 55:45 | 95:5 |
| Water-soluble polymer | Type amount | CMC-Na 1 part | CMC-Na 1 part | CMC-Na 1 part | CMC-Na 1 part |
| Applying subject |  | Sepa | Sepa | Sepa | Electrode plate |
| Peel strength | P (N/m) | 46 | 35 | 67 | 41.5 |
| Blocking resistance |  | A | A | A | A |
| Low-temperature output property | ΔV (mV) | 165 | 185 | 120 | 155 |
| Li deposition amount |  | A | B | A | A |
| Cell volume swell | ΔX | 21% | 27% | 25% | 25% |
| Cycle property | ΔC | 85.80% | 84.50% | 85.50% | 86.50% |

TABLE 16

Results of Comparative Examples II-1 to II-5

|  |  | Comp. Ex. II-1 | Comp. Ex. II-2 | Comp. Ex. II-3 | Comp. Ex. II-4 | Comp. Ex. II-5 |
|---|---|---|---|---|---|---|
| First particulate polymer |  |  |  |  |  |  |
| Cross-linkable monomer | Type Amount | PST | — 0 wt % | — 0 wt % | — 0 wt % | — 0 wt % |
| Core portion | Swelling degree |  | 32 times | 3.8 times | 32 times | 10.5 times |
|  | Monomer |  | MMA 70 AN 25 MAA 5 | 2-EHA 60 ST 15 MAA 5 | MMA 50 AN 25 MAA 5 | MMA 50 2-EHA 25 MAA 5 |
|  | Tg |  |  | −20° C. | 104° C. | 20° C. |
| Shell portion | Swelling degree |  |  | 1.3 times | 1.3 times | 4.5 times |
|  | Monomer |  |  | ST 20 | ST 20 | AN 20 |
|  | Tg |  | 110° C. | 100° C. | 100° C. | 105° C. |
| Core shell ratio |  |  | — | 10% | 10% | 10% |
| Covering ratio |  |  | — | 67% | 58% | 62% |
| D50 |  | 0.45 μm | 0.45 μm | 0.45 μm | 0.45 μm | 0.45 μm |
| Non-conductive fiber | Type Fiber diameter | KY-100G 0.07 μm | KY-100G 0.07 μm | KY-100G 0.07 μm | KY-100G 0.07 μm | KY-100G 0.07 μm |
| Particles:fibers |  | 95:5 | 95:5 | 95:5 | 95:5 | 95:5 |
| Water-soluble polymer | Type amount | CMC-Na 1 part | CMC-Na 1 part | CMC-Na 1 part | CMC-Na 1 part | CMC-Na 1 part |
| Applying subject |  | Sepa | Sepa | Sepa | Sepa | Sepa |
| Peel strength | P (N/m) | 21.8 | 12.5 | 18.5 | 12.2 | 17.2 |
| Blocking resistance |  | A | A | C | B | B |
| Low-temperature output property | ΔV (mV) | 255 | 310 | 275 | 300 | 260 |
| Li deposition amount |  | C | C | C | C | C |
| Cell volume swell | ΔX | 41.50% | 40.50% | 37.50% | 39% | 36.50% |
| Cycle property | ΔC | 75.50% | 71% | 76% | 72% | 77% |

[Discussion]

As shown from Examples and Comparative Examples of Group 2 described above, the porous membrane produced using the porous membrane composition of the present invention has excellent binding property to the separator substrate and the electrode plate in the electrolytic solution. Further, when the porous membrane composition contains the non-conductive fibers, the swelling of the porous membrane produced using the porous membrane composition in the electrolytic solution can be suppressed. The lithium ion secondary battery of the present invention thus has excellent low-temperature output property.

REFERENCE SIGNS LIST

100 First particulate polymer
110 Core portion
110S Outer surface of core portion
120 Shell portion

The invention claimed is:

1. A porous membrane composition for a lithium ion secondary battery, comprising a first particulate polymer, wherein
   the first particulate polymer has a core-shell structure including a core portion and a shell portion that partially covers an outer surface of the core portion, the core portion is formed from a polymer having a swelling degree in an electrolytic solution of 5 times or more and 30 times or less, the shell portion is formed from a polymer having a swelling degree in the electrolytic solution of 1 time or more and 4 times or less, each of the swelling degrees represents a ratio (W1/W0) of W1 with respect to W0, W0 represents a weight of a 1-cm square piece of a film having a thickness of 0.5 mm that is produced from the polymer of the core portion or the polymer of the shell portion, W1 represents a weight of the 1-cm square piece that has been immersed in the electrolytic solution at 60° C. for 72 hours, and the electrolytic solution consists of a mixed solvent of ethylene carbonate, diethyl carbonate and vinylene carbonate (volume mixing ratio of ethylene carbonate/diethyl carbonate/vinylene carbonate=68.5/30/1.5) and 1 mol/L of $LiPF_6$.

2. The porous membrane composition for a lithium ion secondary battery according to claim 1, wherein the polymer of the core portion has a glass transition temperature of 0° C. or higher and 150° C. or lower, and the polymer of the shell portion has a glass transition temperature of 50° C. or higher and 200° C. or lower.

3. The porous membrane composition for a lithium ion secondary battery according to claim 1, wherein the shell portion includes particles of the polymer having a swelling degree in the electrolytic solution of more than 1 time and 4 times or less.

4. The porous membrane composition for a lithium ion secondary battery according to claim 1, wherein the porous membrane composition contains a second particulate polymer that comprises a water-insoluble polymer.

5. The porous membrane composition for a lithium ion secondary battery according to claim 4, wherein the porous membrane composition contains non-conductive particles, and the amount of the second particulate polymer is 0.1 parts by weight or more and 20 parts by weight or less relative to 100 parts by weight of the total of the first particulate polymer and the non-conductive particles.

6. An electrode for a lithium ion secondary battery, comprising:

an electrode plate; and a porous membrane that is obtained by applying the porous membrane composition for a lithium ion secondary battery according to claim 1 onto the electrode plate.

7. A lithium ion secondary battery comprising a positive electrode, a negative electrode, and an electrolytic solution, wherein at least one of the positive electrode and the negative electrode is the electrode for a lithium ion secondary battery according to claim 6.

8. A separator for a lithium ion secondary battery, comprising:

a separator substrate; and a porous membrane that is obtained by applying the porous membrane composition for a lithium ion secondary battery according to claim 1 onto the separator substrate.

9. A lithium ion secondary battery comprising a positive electrode, a negative electrode, an electrolytic solution, and a separator, wherein the separator is the separator for a lithium ion secondary battery according to claim 8.

* * * * *